(12) United States Patent
Matsui et al.

(10) Patent No.: US 8,512,462 B2
(45) Date of Patent: Aug. 20, 2013

(54) AZO COMPOUNDS, INK COMPOSITIONS, AND COLORED BODIES

(75) Inventors: Takahiko Matsui, Tokyo (JP); Takashi Yoshimoto, Tokyo (JP); Hiroaki Ohno, Tokyo (JP); Koji Hirota, Tokyo (JP); Takashi Yoneda, Tokyo (JP); Akira Kawaguchi, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 29 days.

(21) Appl. No.: 13/498,431

(22) PCT Filed: Sep. 21, 2010

(86) PCT No.: PCT/JP2010/066295
§ 371 (c)(1),
(2), (4) Date: Mar. 27, 2012

(87) PCT Pub. No.: WO2011/043184
PCT Pub. Date: Apr. 14, 2011

(65) Prior Publication Data
US 2012/0202019 A1 Aug. 9, 2012

(30) Foreign Application Priority Data
Oct. 8, 2009 (JP) ................................ 2009-234225

(51) Int. Cl.
*C09D 11/02* (2006.01)
*C09B 33/18* (2006.01)
*B41J 2/01* (2006.01)

(52) U.S. Cl.
USPC .................. 106/31.48; 534/796; 347/100

(58) Field of Classification Search
USPC ... 106/31.48; 534/796; 347/100; 428/195.1
See application file for complete search history.

(56) References Cited

U.S. PATENT DOCUMENTS

| | | | |
|---|---|---|---|
| 7,427,319 B2 * | 9/2008 | Yoneda et al. | 106/31.48 |
| 2010/0118067 A1 * | 5/2010 | Morita et al. | 347/100 |
| 2011/0052885 A1 * | 3/2011 | Morita et al. | 534/797 |
| 2011/0216117 A1 * | 9/2011 | Morita et al. | 534/797 |
| 2012/0213930 A1 * | 8/2012 | Teramoto et al. | 106/31.5 |
| 2013/0101811 A1 * | 4/2013 | Kawaguchi et al. | 428/195.1 |

FOREIGN PATENT DOCUMENTS

| | | |
|---|---|---|
| JP | 2002-332426 | 11/2002 |
| JP | 2005-298636 | 10/2005 |
| JP | 2009-084345 | 4/2009 |
| WO | WO 2006/001274 A1 | 1/2006 |
| WO | WO 2008/142989 A1 | 11/2008 |

* cited by examiner

*Primary Examiner* — Helene Klemanski
(74) *Attorney, Agent, or Firm* — Knobbe Martens Olson & Bear LLP

(57) ABSTRACT

Azo compounds represented by general formula (1) or salts thereof are provided as highly water-soluble colorants which have hues of yellow, orange, brown or red, and excellent color development properties and which, when used in various recording processes, particularly in an inkjet recording process, ensure various excellent fastnesses such as light fastness, ozone fastness, and fading balance. Ink compositions containing the colorants are also provided. In general formula (1), $R^1$ to $R^8$ are each independently a hydrogen atom, C1-4 alkyl, C1-4 alkoxy, or the like; and X is C1-8 alkylenediamino, xylylenediamino, or the like.

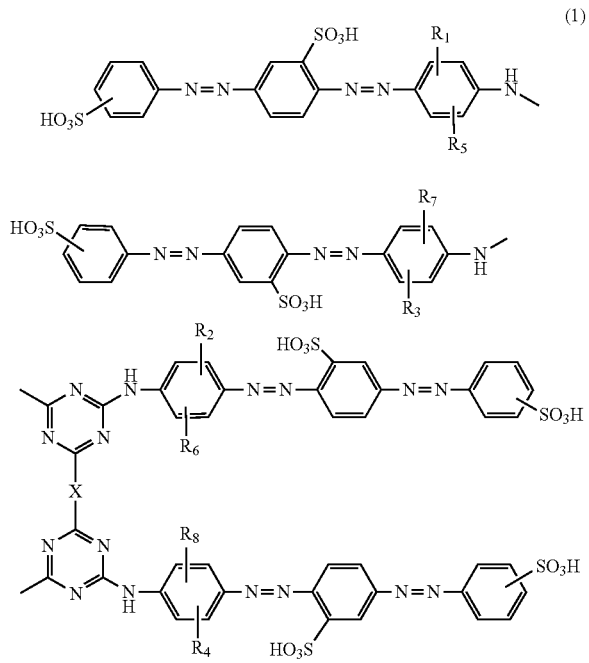

18 Claims, No Drawings

AZO COMPOUNDS, INK COMPOSITIONS, AND COLORED BODIES

This application is the U.S. National Phase under 35 U.S.C. §371 of International Application PCT/JP2010/066295, filed Sep. 21, 2010, designating the U.S., and published in Japanese as WO 2011/043184 on Apr. 14, 2011, which claims priority to Japanese Patent Application No. 2009-234225, filed Oct. 8, 2009, the entire contents of which are incorporated herein by reference.

TECHNICAL FIELD

The present invention relates to a novel azo compound or a salt thereof, an ink composition containing the compound, an ink jet recording method using the ink composition, and a colored body colored by the compound, by the ink composition or by the recording method.

BACKGROUND ART

One of the representative methods for various color recording methods may be a recording method using an ink jet printer, that is, an ink jet recording method. This recording method involves producing small droplets of ink, and attaching these small droplets to various record-receiving materials (paper, film, clothes and the like) to perform recording. In this method, the method is characterized in that since the recording head and the record-receiving material are not brought into direct contact, the process is quiet with less noise generation, and size reduction or an increased speed can easily be achieved. Therefore, the method has rapidly become popular in recent years, and an extensive growth in use of the method is expected.

Conventionally, aqueous inks prepared by dissolving a water-soluble coloring matter in an aqueous medium have been used as the inks for fountain pens, felt pens and the like and as the inks for ink jet recording. In these aqueous inks, water-soluble organic solvents are generally added so as to prevent clogging of the inks at the pen tips or ink discharge nozzles. Furthermore, these inks are required to have advantages such as the production of recorded images of sufficient densities (high print density), no occurrence of clogging at the pent tips or nozzles, satisfactory drying properties on record-receiving materials, less bleeding, and excellent storage stability. Also, the water-soluble coloring matters used therein is required to have high solubility particularly in water, and high solubility in the water-soluble organic solvents that are added to the ink. In addition, the recorded images thus formed are required to have image fastness properties such as water resistance, light fastness, ozone fastness, and moisture resistance.

The above-described term ozone fastness is a resistance to the phenomenon that ozone gas present in air and having an oxidizing action acts on the coloring matter on a recording paper or within a recording paper and changes the color of an image recorded thereon. In addition to ozone gas, examples of oxidizing gases having this kind of action include NOx and SOx. However, among these oxidizing gases, ozone gas is considered as a main causative substance which accelerates the phenomenon of discoloration of ink jet recorded images.

Exclusive ink jet paper, which can give photographic image quality, is generally provided on the surface with an ink-receiving layer. In this ink-receiving layer, materials such as porous white inorganic substances are frequently used in order to reduce bleeding of the coloring matter for the purpose of speeding up drying of the ink and obtaining high image quality. In such an exclusive ink jet paper, significant discoloration of the recorded image due to ozone gas is observed. Since the phenomenon of discoloration due to an oxidizing gas, particularly ozone gas, is characteristic to ink jet recorded images, an enhancement of ozone fastness has been one of the most important problems to be solved in the ink jet recording method.

In order to expand the field of use of the ink jet recording method in those recording (printing) methods using ink in the future, it is strongly desired to further enhance various fastness properties such as light fastness, ozone fastness, moisture resistance and water resistance in the ink composition used in ink jet recording and the colored body colored by the ink composition.

Inks of various colors have been prepared from various coloring matters; however, while it is needless to say natural to use coloring matters having hues ranging from yellow to orange to brown to red, etc. for the expression of single colors, it is also one of the important coloring matters to be used to express different hues by being mixed with coloring matters of other colors, that is, to be used as coloring matters for color adjusting. For this reason, it is required to have high print density and to be excellent in various fastness properties, as well as to be excellent in the color fading balance between various hues such as yellow, magenta and black, etc. upon discoloration occurring at the time of exposure to light or the like. When coloring matters having poor color fading balance are used, only some specific hues are emphasized in a discolored recorded image, so that the color tone of the image as a whole is largely changed, and thereby the image quality is markedly impaired. Therefore, being excellent in this color fading balance is also one of the important performances of the coloring matter.

Patent Document 1 discloses a triazine dye that is incorporated into aqueous black ink compositions.

Furthermore, Patent Documents 2 and 3 disclose azo compounds having a hue ranging from yellow to red, or brown, and ink compositions containing these azo compounds.

Also, Patent Documents 4 and 5 disclose water-soluble azo compounds which are coloring matters of yellow color having crosslinking groups.

However, a coloring matter that satisfies the demands of the market has not yet been found.

Patent Document 1: Japanese Unexamined Patent Application, Publication No. 2002-332426
Patent Document 2: WO 2006/001274
Patent Document 3: Japanese Unexamined Patent Application, Publication No. 2005-298636
Patent Document 4: WO 2008/142989
Patent Document 5: Japanese Unexamined Patent Application, Publication No. 2009-84345

DISCLOSURE OF THE INVENTION

Problems to be Solved by the Invention

An object of the present invention is to provide a coloring matter having a hue ranging from yellow to orange to brown to red, which produces recorded images having high print density and excellent light fastness, and an ink composition containing the coloring matter.

Means for Solving the Problems

The inventors of the present invention repeatedly conducted thorough investigations so as to solve such problems described above, and as a result, the inventors found that a particular water-soluble azo compound represented by the following formula (1), or a salt thereof, can solve the problems described above, thus completing the present invention.

Specifically, the present invention relates to the following:

1) an azo compound represented by the following formula (1), or a salt thereof:

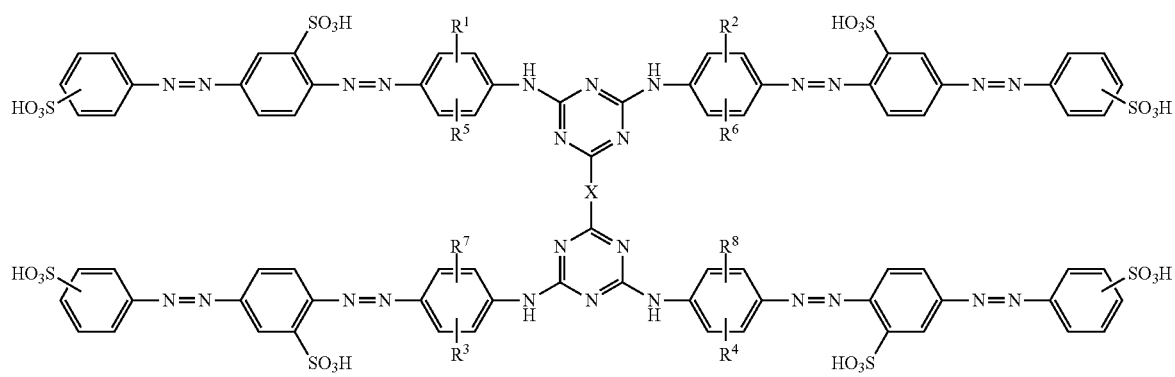

in the formula (1), $R^1$ to $R^8$ each independently represent a hydrogen atom; a halogen atom; a sulfo group; a carboxy group; a sulfamoyl group; a carbamoyl group; a C1-C4 alkyl group; a C1-C4 alkoxy group; a C1-C4 alkoxy group substituted with at least one group selected from the group consisting of a hydroxy group, a C1-C4 alkoxy group, a hydroxy-C1-C4 alkoxy group, a sulfo group and a carboxy group; a C1-C4 alkylcarbonylamino group; a C1-C4 alkylcarbonylamino group substituted with a carboxy group; a ureido group; a mono-C1-C4 alkylureido group; a di-C1-C4 alkylureido group; a mono-C1-C4 alkylureido group substituted with at least one group selected from the group consisting of a hydroxy group, a sulfo group and a carboxy group; a di-C1-C4 alkylureido group substituted with at least one group selected from the group consisting of a hydroxy group, a sulfo group and a carboxy group; a benzoylamino group; a benzoylamino group having its benzene ring substituted with at least one group selected from the group consisting of a halogen atom, a C1-C4 alkyl group, a nitro group, a sulfo group and a carboxy group; a benzenesulfonylamino group; or a phenylsulfonylamino group having its benzene ring substituted with at least one group selected from the group consisting of a halogen atom, a C1-C4 alkyl group, a nitro group, a sulfo group and a carboxy group; and X represents a divalent crosslinking group;

2) the azo compound or a salt thereof as described in the above item 1), wherein X represents any one group selected from the group consisting of a C1-C8 alkylenediamino group; a C1-C8 alkylenediamino group substituted with a hydroxy group or a carboxy group; an N—C1-C4 alkyl-C1-C6 alkylenediamino group; an N—C1-C4 alkyl-C1-C6 alkylenediamino group having its alkyl moiety substituted with a hydroxy group or a carboxy group; an amino-C1-C6 alkoxy-C1-C6 alkylamino group; an amino-C1-C4 alkoxy-C1-C4 alkoxy-C1-C4 alkylamino group; a xylylenediamino group; a piperazine-1,4-diyl group; a piperazine-1,4-diyl group substituted with a C1-C4 alkyl group or a C1-C4 alkoxy group; and a phenylenediamino group;

3) the azo compound or a salt thereof as described in the above item 1, wherein $R^1$ to $R^8$ each independently represent a hydrogen atom; a halogen atom; a C1-C4 alkyl group; a C1-C4 alkoxy group; a C1-C4 alkoxy group substituted with a sulfo group or a carboxy group; or a C1-C4 alkylcarbonylamino group;

4) the azo compound or a salt thereof as described in the above item 1), wherein at least one of $R^1$ to $R^8$ is a C1-C4 alkoxy group substituted with a sulfo group;

5) the azo compound or a salt thereof as described in the above item 1) wherein $R^1$ to $R^4$ each independently represent a hydrogen atom, a C1-C4 alkyl group, or a C1-C4 alkoxy group substituted with a sulfo group, while at least one of $R^1$ to $R^4$ is a C1-C4 alkoxy group substituted with a sulfo group, and 6) the azo compound or a salt thereof as described in of the above item 1), wherein X represents a C 1-C8 alkylenediamino group; a C 1-C8 alkylenediamino group substituted with a carboxy group; an N—C1-C4 alkyl-C1-C6 alkylenediamino group having its alkyl moiety substituted with a hydroxy group; an amino-C1-C4 alkoxy-C1-C4 alkoxy-C1-C4 alkylamino group; a xylylenediamino group; or a piperazine-1,4-diyl group;

7) the azo compound or a salt thereof as described in the above item 1), wherein the azo compound represented by the formula (1) is an azo compound represented by the following formula (2):

(2)

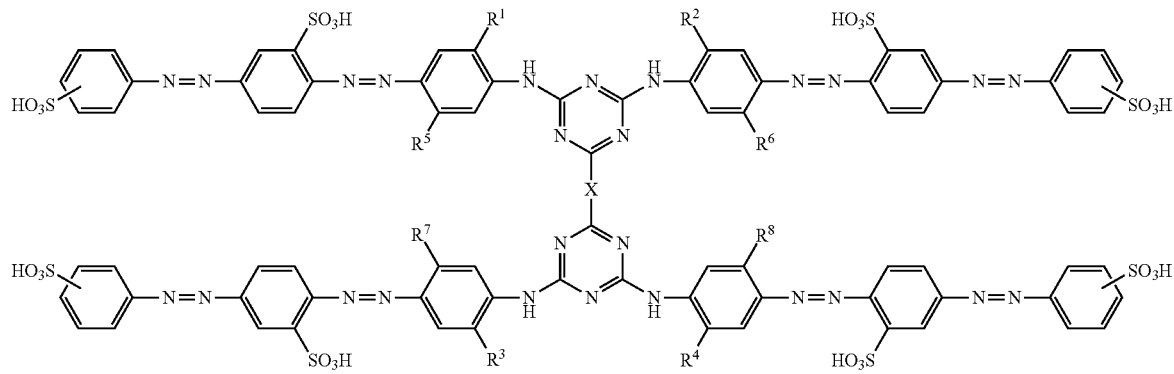

in the formula (2), $R^1$ to $R^8$ and X have the same meanings as $R^1$ to $R^8$ and X, respectively, as defined for the formula (1);

8)
the azo compound or a salt thereof as described in the above item 1), wherein at least one of $R^1$ and $R^2$ is a sulfopropoxy group,
at least one of $R^3$ and $R^4$ is a sulfopropoxy group, and $R^5$ to $R^8$ are C1-C4 alkyl groups;

9)
the azo compound or a salt thereof as described in the above item 1), wherein $R^5$ to $R^8$ are C1-C4 alkyl groups,
X represents a C2-C4 alkylenediamino group; a C2-C6 alkylenediamino group substituted with a carboxy group; an N—C2-C3 alkyl-C2-C3 alkylenediamino group having its alkyl moiety substituted with a hydroxy group; an amino-C2-C3 alkoxy-C2-C3 alkoxy-C2-C3 alkylamino group; an m- or p-xylylenediamino group; or a piperazine-1,4-diyl group;

10)
the azo compound or a salt thereof as described in the above item 1), wherein any one of $R^1$ and $R^2$ is a sulfopropoxy group, while the other is a hydrogen atom or a sulfopropoxy group,
any one of $R^3$ and $R^4$ is a sulfopropoxy group, while the other is a hydrogen atom or a sulfopropoxy group,
$R^5$ to $R^8$ are methyl groups, and X represents a 1,2-ethylenediamino group; a 1,3-propylenediamino group; a 1,4-butylenediamino group; a 1-carboxypentylene-1,5-diamino group; an N-2-hydroxyethylethylenediamino group; an aminoethoxyethoxyethylamino group; an m-xylylenediamino group; or a piperazine-1,4-diyl group;

11)
an ink composition containing at least one of the azo compound or a salt thereof as described in the above item 1), as a coloring matter;

12)
an ink jet recording method, including performing recording by using the ink composition as described in the above item 11) as an ink, discharging ink droplets of the ink in accordance with a recording signal, and thereby attaching the ink droplets onto a record-receiving material;

13)
the ink jet recording method as described in the above item 12), wherein the record-receiving material is a communication sheet;

14)
the ink jet recording method as described in the above item 13), wherein the communication sheet is a sheet having an ink-receiving layer containing a porous white inorganic substance;

15)
an ink jet printer equipped with a container containing the ink composition as described in the above item 11); and 16)
a colored body colored by
the azo compound or a salt thereof as described in the above item 1);

17)
a colored body colored by the ink composition as described in the above item 11);

18)
a colored body colored b the ink jet recording method as described in the above item 12).

EFFECTS OF THE INVENTION

The azo compound of the present invention or a salt thereof has excellent water solubility, and thus has satisfactory filterability through membrane filters in the process of preparing an ink composition or the like. Furthermore, when an ink composition containing this compound is used as an ink for ink jet recording, a recorded material having a hue ranging from yellow to orange to brown to red, which has high print density and excellent light fastness, can be provided.

PREFERRED MODE FOR CARRYING OUT THE INVENTION

The present invention will be described in detail. Meanwhile, unless particularly stated otherwise in the present specification, acid functional groups such as a sulfo group and a carboxy group are presented in the form of free acid.

Furthermore, unless particularly stated otherwise in the following descriptions of the present specification, the "azo compound of the present invention or a salt thereof" will be described simply as "(azo) compound of the present invention" for convenience.

The azo compound of the present invention is a water-soluble coloring matter exhibiting a color ranging from yellow to orange to brown to red, and can be suitably used as a coloring matter included in various inks for recording, particularly for ink jet recording. The azo compound of the present invention is represented by the above formula (1).

In the formula (1), examples of the halogen atom for $R^1$ to $R^8$ include a fluorine atom, a chlorine atom, a bromine atom, and an iodine atom. Among these, a fluorine atom, a chlorine atom and a bromine atom are preferred, and a chlorine atom is particularly preferred.

The C1-C4 alkyl group for $R^1$ to $R^8$ may be a linear or branched alkyl group, and a linear alkyl group is preferred. Specific examples include linear alkyl groups such as methyl, ethyl, n-propyl and n-butyl; and branched alkyl groups such as isopropyl, isobutyl, sec-butyl, and t-butyl. Specific preferred examples include methyl and ethyl, and methyl is particularly preferred.

The C1-C4 alkoxy group for $R^1$ to $R^8$ may be a linear or branched alkoxy group. Specific examples include linear alkoxy groups such as methoxy, ethoxy, n-propoxy, and n-butoxy; and branched alkoxy groups such as isopropoxy, isobutoxy, sec-butoxy, and t-butoxy. Specific preferred examples include methoxy and ethoxy, and methoxy is particularly preferred.

The C1-C4 alkoxy group substituted with at least one group selected from the group consisting of a hydroxy group, a C1-C4 alkoxy group, a hydroxy-C1-C4 alkoxy group, a sulfo group and a carboxy group for $R^1$ to $R^8$ may be a C1-C4 alkoxy group having these substituents on any arbitrary carbon atoms in the alkoxy group. The number of the substituents is usually one or two, and preferably one. There are no particular limitations on the position of the substituent, but it is preferable that two or more oxygen atoms do not substitute the same carbon atom.

Specific examples include hydroxy-C1-C4 alkoxy groups such as 2-hydroxyethoxy, 2-hydroxypropoxy, and 3-hydroxypropoxy; C1-C4 alkoxy-C1-C4 alkoxy groups such as methoxyethoxy, ethoxyethoxy, n-propoxyethoxy, isopropoxyethoxy, n-butoxyethoxy, methoxypropoxy, ethoxypropoxy, n-propoxypropoxy, isopropoxybutoxy, and n-propoxybutoxy; hydroxy-C1-C4 alkoxy-C1-C4 alkoxy groups such as 2-hydroxyethoxyethoxy; carboxy-C1-C4 alkoxy groups such as carboxymethoxy, 2-carboxyethoxy, and 3-carboxypropoxy; and sulfo-C1-C4 alkoxy groups such as 2-sulfoethoxy, 3-sulfopropoxy, and 4-sulfobutoxy.

The C1-C4 alkylcarbonylamino group for $R^1$ to $R^8$ may be a linear or branched alkylcarbonylamino group, and a linear alkylcarbonylamino group is preferred. Specific examples include linear groups such as acetylamino (methylcarbonylamino), ethylcarbonylamino, propylcarbonylamino, and butylcarbonylamino; and branched groups such as isopropylcarbonylamino and t-butylcarbonylamino.

Specific examples of the C1-C4 alkylcarbonylamino group substituted with a carboxy group for $R^1$ to $R^8$ include carboxy-C1-C4 alkylcarbonylamino groups such as 2-carboxyethylcarbonylamino, and 3-carboxypropylcarbonylamino. The number of substituting carboxy groups is usually one or two, and preferably one.

The mono-C1-C4 alkylureido group for $R^1$ to $R^8$ may be an alkylureido group having a linear or branched alkyl moiety. There are no particular limitations on the position of substitution of the C1-C4 alkyl, but it is preferable that the C1-C4 alkyl be substituted at the position of "N'".

According to the present specification, the term "mono-C1-C4 alkylureido group" means a "C1-C4 alkyl-NH—CO—NH—" group or a "H₂N—CO—N(C1-C4 alkyl)-" group. In the benzene ring to which $R^1$ and $R^8$ are bonded, the nitrogen atom which is directly bonded to the benzene ring is designated as "N", and the nitrogen atom which is bonded to the benzene ring through this nitrogen atom and a carbonyl (CO) group is designated as "N'". Therefore, in regard to the position of substitution of the C1-C4 alkyl, the former indicates "N'", and the latter indicates "N".

Specific examples include linear groups such as N'-ethylureido, N'-propylureido, and N'-butylureido; and branched groups such as N'-isopropylureido, N'-isobutylureido, and N'-t-butylureido.

The di-C1-C4 alkylureido group for $R^1$ to $R^8$ may be a linear or branched alkylureido group. There are no particular limitations on the position of substitution of the C1-C4 alkyl, and examples include those alkylureido groups having one alkyl each on the "N" and "N'" positions, or having two alkyls on the "N'" position, conforming to the position of substitution in the "mono-C1-C4 alkylureido group", and the latter is preferred. Furthermore, the two C1-C4 alkyls may be identical with or different from each other, but it is preferable that the two alkyls be identical.

Specific examples include linear groups such as N',N'-dimethylureido, N',N'-diethylureido, N',N'-dipropylureido, and N',N'-dibutylureido; and branched groups such as N',N'-diisopropylureido, and N',N'-diisobutylureido.

The mono-C1-C4 alkylureido group substituted with at least one group selected from the group consisting of a hydroxy group, a sulfo group and a carboxy group for $R^1$ to $R^8$ may be a mono-C1-C4 alkylureido group having these substituents on any arbitrary carbon atoms in the alkylureido group. The number of the substituents is usually one or two, and preferably one. There are no particular limitations on the position of substituent, but it is preferable that a nitrogen atom and a hydroxy group do not substitute the same carbon atom.

Specific examples include N'-mono(hydroxy-C1-C4 alkyl)ureido groups such as N'-2-hydroxyethylureido and N'-3-hydroxypropylureido; N'-mono(sulfo-C1-C4 alkyl)ureido groups such as N'-2-sulfoethylureido and N'-3-sulfopropylureido; and N'-mono(carboxy-C1-C4 alkyl)ureido groups such as N'-carboxymethylureido, N'-2-carboxyethylureido, N'-3-carboxypropylureido, and N'-4-carboxybutylureido.

The di-C1-C4 alkylureido group substituted with at least one group selected from the group consisting of a hydroxy group, a sulfo group and a carboxy group for $R^1$ to $R^8$ may be a di-C1-C4 alkylureido group having these substituents on any arbitrary carbon atoms in the dialkylureido group. The number of the substituents is usually one or two, and preferably two. There are no particular limitations on the position of substituent, but it is preferable that a nitrogen atom and a hydroxy group do not substitute the same carbon atom. Furthermore, when the group has plural substituents, the substituents may be of the same kind or of different kinds, but it is preferable that the substituents be the same.

Specific examples include N',N'-di(hydroxy-C1-C4 alkyl)ureido groups such as N',N'-di(2-hydroxyethyl)ureido, N',N'-di(2-hydroxypropyl)ureido, and N',N'-di(3-hydroxypropyl)ureido; N',N'-di(sulfo-C1-C4 alkyl)ureido groups such as N',N'-di(3-sulfopropyl)ureido; and N',N'-di(carboxy-C1-C4 alkyl)ureido groups such as N',N'-di(carboxymethyl)ureido.

The benzoylamino group having its benzene ring substituted with at least one group selected from the group consisting of a halogen atom (examples include a fluorine atom, a chlorine atom, a bromine atom and an iodine atom, and a chlorine atom is particularly preferred), a C1-C4 alkyl group, a nitro group, a sulfo group and a carboxy group for $R^1$ to $R^8$ may be a benzoylamino group having one to three, and preferably one or two, of these substituents. When the group has plural substituents, the substituents may be of the same kind or of different kinds, but it is preferable that the substituents be the same.

Specific examples include halogen atom-substituted benzoyl amino groups such as 2-chlorobenzoylamino, 4-chlorobenzoylamino, and 2,4-dichlorobenzoylamino; C1-C4 alkyl-substituted benzoylamino groups such as 2-methylbenzoylamino, 3-methylbenzoylamino, and 4-methylbenzoylamino; nitro-substituted benzoylamino groups such as 2-nitrobenzoylamino, 4-nitrobenzoylamino, and 3,5-dinitrobenzoylamino; sulfo-substituted benzoylamino groups such as 2-sulfobenzoylamino and 4-sulfobenzoylamino; and carboxy-substituted benzoylamino groups such as 2-carboxybenzoylamino, 4-carboxybenzoylamino, and 3,5-dicarboxybenzoylamino.

The phenylsulfonylamino group having its benzene ring substituted with at least one group selected from the group consisting of a halogen atom, a C1-C4 alkyl group, a nitro group, a sulfo group and a carboxy group for $R^1$ to $R^8$ may be a phenylsulfonylamino group having one to three, preferably one or two, and more preferably one, of these substituents. When the group has plural substituents, the substituents may be of the same kind or of different kinds.

Specific examples include halogen atom-substituted phenylsulfonylamino groups such as 2-chlorophenylsulfonylamino and 4-chlorophenylsulfonylamino; C1-C4 alkyl-substituted phenylsulfonylamino groups such as 2-methylphenylsulfonylamino, 4-methylphenylsulfonylamino, and 4-t-butylphenylsulfonylamino; nitro-substituted phenylsulfonylamino groups such as 2-nitrophenylsulfonylamino, 3-nitrophenylsulfonylamino, and 4-nitrophenylsulfonylamino; sulfo-substituted phenylsulfonylamino groups such as 3-sulfophenylsulfonylamino and 4-sulfophenylsulfonylamino; and carboxy-substituted phenylsulfonylamino groups such as 3-carboxyphenylsulfonylamino and 4-carboxyphenylsulfonylamino.

Among the substituents described above, $R^1$ to $R^8$ are each preferably a hydrogen atom; a halogen atom; a C1-C4 alkyl group; a C1-C4 alkoxy group; a C1-C4 alkoxy group substituted with a sulfo group or a carboxy group; or a C1-C4 alkylcarbonylamino group. Among these, a hydrogen atom, methyl, ethyl, t-butyl, 2-carboxyethoxy, 3-carboxypropoxy, 2-sulfoethoxy, 3-sulfopropoxy, and 4-sulfobutoxy are more preferred. Particularly preferred examples include a hydrogen atom, methyl, and 3-sulfopropoxy.

In the formula (1), it is preferable that at least one of $R^1$ to $R^8$ be a C1-C4 alkoxy group substituted with a sulfo group.

Furthermore, it is more preferable that $R^1$ to $R^4$ each independently represent a hydrogen atom, a C1-C4 alkyl group, or a C1-C4 alkoxy group substituted with a sulfo group, while at least one of $R^1$ to $R^4$ be a C1-C4 alkoxy group substituted with a sulfo group, and $R^5$ to $R^8$ each independently represent a hydrogen atom or a C1-C4 alkyl group.

It is even more preferable that at least one of $R^1$ and $R^2$ be a sulfopropoxy group; at least one of $R^3$ and $R^4$ be a sulfopropoxy group; and $R^5$ to $R^8$ be C1-C4 alkyl groups.

It is particularly preferable that at least one of $R^1$ and $R^2$ be a sulfopropoxy group, while the other be a hydrogen atom or a sulfopropoxy group; at least one of $R^3$ and $R^4$ be a sulfopropoxy group, while the other be a hydrogen atom or a sulfopropoxy group; and $R^5$ to $R^8$ be methyl groups.

There are no particular limitations on the positions of substitution of $R^1$ to $R^8$, but it is preferable that for the respective benzene rings substituted with these substituents, when the position of substitution of the nitrogen atom bonded to the triazine ring is designated as the 1-position, and the position of substitution of the azo group is designated as the 4-position, $R^1$ to $R^4$ be substituted at the 2-position, and $R^5$ to $R^8$ be substituted at the 5-position.

In the formula (1), X represents a divalent crosslinking group.

The crosslinking group is not particularly limited as long as it is a divalent group to the extent that the compound represented by the formula (1) exhibits solubility in water. Here, in regard to the solubility of the compound represented by the formula (1) in water, it is desirable that the compound represented by the formula (1) dissolve in 1 liter of water in an amount of usually 5 g or more, preferably 10 g or more, more preferably 25 g or more, even more preferably 50 g or more, and particularly preferably 100 g or more.

Specific examples include a divalent atom (preferably a divalent heteroatom) such as a nitrogen atom, an oxygen atom or a sulfur atom; a C1-C8 alkylenediamino group, a C1-C8 alkylenedioxy group or a C1-C8 alkylenedithio group; an N,N'-hydrazinediyl group; a group in which two alkylamino groups are substituted at an oxygen atom, such as an aminoalkoxyalkylamino group; and a group in which an alkylene oxide chain containing one or more ether bonds is substituted with one amino group and one alkylamino group at the chain ends, such as an aminoalkoxyalkoxyalkylamino group.

These divalent crosslinking groups for X may respectively have a group selected from the group consisting of a hydroxy group, a carboxy group and an alkoxy group as a substituent of the carbon atom; and an alkyl group which may be substituted with a hydroxy group or a carboxy group at the alkyl moiety as a substituent for the nitrogen atom.

The divalent crosslinking group for X is preferably any one group selected from the group consisting of a C1-C8 alkylenediamino group; a C1-C8 alkylenediamino group substituted with a hydroxy group or a carboxy group; an N—C1-C4 alkyl-C1-C6 alkylenediamino group; an N—C1-C4 alkyl-C1-C6 alkylenediamino group having its alkyl moiety substituted with a hydroxy group or a carboxy group; an amino-C1-C6 alkoxy-C1-C6 alkylamino group; amino-C1-C4 alkoxy-C1-C4 alkoxy-C1-C4 alkylamino group, a xylylenediamino group; a piperazine-1,4-diyl group; a piperazine-1,4-diyl group substituted with a C1-C4 alkyl group or a C1-C4 alkoxy group; and a phenylenediamino group.

Meanwhile, these divalent crosslinking groups are all "diamino" groups each having two amino groups. Therefore, for example, among the "diamino" groups excluding some groups such as piperazine-1,4-diyl, the present invention includes both the case where crosslinking is achieved at any one of the nitrogen atoms (that is, N,N-diyl is obtained), and the case where crosslinking is achieved at two different nitrogen atoms (that is, N,N'-diyl is obtained). Among these, the latter case of obtaining "N,N'-diyl" is particularly preferred.

The C1-C8 alkylenediamino group for X may be a linear or branched alkylenediamino group, and a linear alkylenediamino group is preferred. The carbon number is usually in the range of C1-C8, preferably C2-C8, more preferably C2-C6, and even more preferably C2-C4.

Specific examples include linear groups such as ethylenediamino, 1,3-propylenediamino, 1,4-butylenediamino, 1,5-pentylenediamino, 1,6-hexylenediamino, 1,7-heptylenediamino, and 1,8-octylenediamino; and branched groups such as 2-methyl-1,3-propylenediamino, 3-methyl-1,4-butylenediamino, and 4-methyl-1,6-hexylenediamino.

The C1-C8 alkylenediamino group substituted with a hydroxy group or a carboxy group for X may be a C1-C8 alkylenediamino group having these substituents on any arbitrary carbon atoms in the alkylenediamino group. There are no particular limitations on the number of the substituents, but the number is preferably one or two. Furthermore, when the group has plural substituents, the substituents may be of the same kind or of different kinds, but it is preferable that the substituents be the same.

Specific examples include hydroxy-substituted C1-C8 alkylenediamino groups such as 2-hydroxy-1,3-propylenediamino, 2-hydroxy-1,4-butylenediamino, and 3-hydroxy-1,6-hexylenediamino; and carboxy-substituted C1-C8 alkylenediamino groups such as 1-carboxyethylenediamino, 1-carboxy-1,3-propylenediamino, 1-carboxy-1,4-butylenediamino, 1-carboxy-1,5-pentylenediamino, and 1,5-dicarboxy-1,5-pentylenediamino.

The N—C1-C4 alkyl-C1-C6 alkylenediamino group for X means that one of the nitrogen atoms of a C1-C6 alkylenediamino group has been substituted with a C1-C4 alkyl group. According to the present specification, in the diamino group, the nitrogen atom substituted with a C1-C4 alkyl group is indicated as "N", and if necessary, the other nitrogen atom is indicated as "N'". The carbon number of the alkylene moiety is usually in the range of C1-C6, preferably C2-C4, and particularly preferably C2 or C3.

The C1-C4 alkyl group may be a linear or branched alkyl group, and a linear alkyl group is preferred.

Specific examples include N-linear C1-C4 alkyl-C1-C6 alkylenediamino groups such as an N-methylethylenediamino group, an N-ethylethylenediamino group, an N-propylethylenediamino group, and N-butylethylenediamino group; and N-branched C1-C4 alkyl-C1-C6 alkylenediamino groups such as an N-isopropylethylenediamino group, an N-isobutylethylenediamino group, an N-sec-butylethylenediamino group, and N-t-butylethylenediamino group.

The N—C1-C4 alkyl-C1-C6 alkylenediamino group having its alkyl moiety substituted with a hydroxy group or a carboxy group for X may be an N—C1-C4 alkyl-C1-C6 alkylenediamino group having these substituents on any arbitrary carbon atoms of the alkyl moiety of the N—C1-C4 alkyl group. There are no particular limitations on the position of substituents, but it is preferable that a nitrogen atom and a hydroxy group do not substitute the same carbon atom. The carbon number of the alkylene moiety may be in the same range, including preferred ranges, as that of the N—C1-C4 alkyl-C1-C6 alkylenediamino group described above. Furthermore, the carbon number of the alkyl moiety is usually in the range of C1-C4, preferably C2-C4, and more preferably C2-C3.

The number of the substituents is usually one or two, and preferably one. Also, when the group has plural substituents, the substituents may be of the same kind or of different kinds, but it is preferable that the substituents be the same.

Specific examples include N-hydroxy-substituted C1-C4-alkyl-C1-C6 alkylendiamino groups such as an N-(2-hydroxyethyl)ethylenediamino group, an N-(3-hydroxypropyl) ethylenediamino group, an N-(2-hydroxypropyl) ethylenediamino group, and N-(4-hydroxybutyl) ethylenediamino group; and N-carboxy-substituted C1-C4 alkyl-C1-C6 alkylenediamino groups such as an N-(carboxymethyl)ethylenediamino group, an N-(2-carboxyethyl) ethylenediamino group, an N-(3-carboxypropyl)ethylenediamino group, and N-(4-carboxybutyl)ethylenediamino group.

The amino-C1-C6 alkoxy-C1-C6 alkylamino group for X may be a linear or branched aminoalkoxyalkylamino group, and a linear group is preferred. In regard to the range of the carbon number, usually an amino-C1-C6 alkoxy-C1-C6 alkylamino group, and preferably an amino-C2-C4 alkoxy-C2-C4 alkylamino group may be used, and particularly preferably, an amino-C2-C3 alkoxy-C2-C3 alkylamino group may be used. Specific examples include aminoethoxyethylamino, aminoethoxypropylamino, aminopropoxypropylamino, and aminoethoxypentylamino.

The amino-C1-C4 alkoxy-C1-C4 alkoxy-C1-C4 alkylamino group for X may be a linear or branched aminoalkoxyalkoxyalkylamino group, and a linear group is preferred. In regard to the range of the carbon number, usually an amino-C1-C4 alkoxy-C1-C4 alkoxy-C1-C4 alkylamino group, and preferably, an amino-C2-C4 alkoxy-C2-C4 alkoxy-C2-C4 alkylamino group may be used, and particularly preferably, an amino-C2-C3 alkoxy-C2-C3 alkoxy-C2-C3 alkylamino group may be used.

Specific examples include linear groups such as aminoethoxyethoxyethylamino, aminoethoxypropoxyethylamino, and aminoethoxybutoxyethylamino; and branched groups such as aminoethoxy(2-methylethoxy)ethylamino, and aminoethoxy(2-methylpropoxy)ethylamino.

The xylylenediamino group for X may be, for example, an o-, m-, or p-xylylenediamino group, and an m- or p-xylylenediamino group is preferred.

The piperazine-1,4-diyl group substituted with a C1-C4 alkyl group or a C1-C4 alkoxy group for X may be a piperazinediyl group having these substituents on any arbitrary carbon atoms among the ring-constituting atoms of the piperazine ring. The number of the substituents is usually one or two, and preferably one. Furthermore, when the group has plural substituents, the substituents may be of the same kind or of different kinds, but it is preferable that the substituents be the same.

Specific examples include a 2-methylpiperazine-1,4-diyl group, a 2-ethylpiperazine-1,4-diyl group, a 2,5-dimethylpiperazine-1,4-diyl group, a 2,6-dimethylpiperazine-1,4-diyl group, a 2,5-diethylpiperazine-1,4-diyl group, and a 2-methyl-5-ethylpiperazine-1,4-diyl group.

The phenylenediamino group for X may be an o-, m- or p-phenylenediamino group, and an m- or p-phenylenediamino group is preferred.

Among the substituents described above, X is preferably a C1-C8 alkylenediamino group; a C1-C8 alkylenediamino group substituted with a carboxy group; an N—C1-C4 alkyl-C1-C6 alkylenediamino group having its alkyl moiety substituted with a hydroxy group; an amino-C1-C4 alkoxy-C1-C4 alkoxy-C1-C4 alkylamino group; a xylylenediamino group; or a piperazine-1,4-diyl group.

X is more preferably a C2-C4 alkylenediamino group; a C2-C6 alkylenediamino group substituted with a carboxy group; an N—C2-C3 alkyl-C2-C3 alkylenediamino group having its alkyl moiety substituted with a hydroxy group; an amino-C2-C3 alkoxy-C2-C3 alkoxy-C2-C3 alkylamino group; and an m- or p-xylylenediamino group; or a piperazine-1,4-diyl group.

X is even more preferably a C1-C8 alkylenediamino group; a xylylenediamino group; or a piperazine-1,4-diyl group.

Among these, specific preferred examples include 1,2-ethylenediamino; 1,3-propylenediamino; 1,4-butylenediamino; 1-carboxypentylene-1,5-diamino; N-2-hydroxyethylethylenediamino; aminioethoxyethoxyethylamino; m-xylylenediamino; and piperazine-1,4-diyl.

In the above formula (1), the positions of substitution of the four sulfo groups whose respective positions of substitution are not specified, are not particularly limited. The sulfo group substituted at the benzene ring having one azo bond may be substituted at the 2-position, 3-position or 4-position, with respect to the position of substitution of the azo bond as the 1-position, and is preferably substituted at the 4-position.

A preferred example of the azo compound of the present invention represented by the formula (1) is a compound represented by the above formula (2), and a more preferred example is a compound represented by the following formula (3).

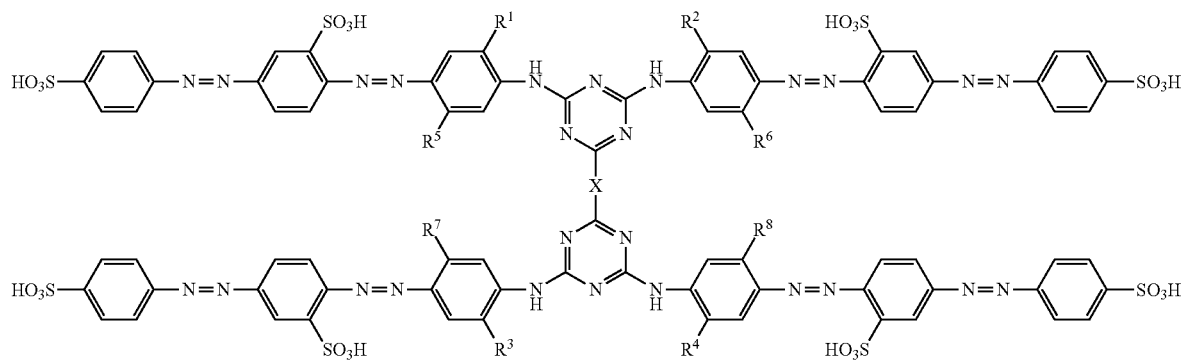

(3)

$R^1$ to $R^8$ and X in the formula (3) have the same meanings, including specific examples and preferred examples, as $R^1$ to $R^8$ and X, respectively, as defined for the formula (1) or formula (2).

In regard to $R^1$ to $R^8$ in the formula (1) to formula (3) described above, the positions of substitution of $R^1$ to $R^8$ in the formula (1), and the positions of substitution of the sulfo groups whose positions of substitution in the formula (1) and formula (2) are not specified, combinations of preferred examples are more preferable, and combinations of more preferred examples are even more preferable. The same applies also to combinations of even more preferred examples, combinations of preferred examples and more preferred examples, and the like.

The azo compounds represented by the formula (1) to formula (3) can be synthesized by, for example, a method such as described below. Meanwhile, the structural formulas of the compounds given in each step are expressed in the form of free acid, and $R^1$ to $R^8$ and X that are appropriately used in the following formula (4) to formula (20) have the same meanings as $R^1$ to $R^8$ and X, respectively, as defined for the formula (1).

First, a compound represented by the following formula (4) is diazotized by a routine method, and this product and a compound represented by the following formula (5) are subjected to a coupling reaction by a routine method. Thus, a compound represented by the following formula (6) is obtained.

As another synthesis method for the compound represented by the formula (6), the following method may be used. That is, a compound represented by the following formula (4) is diazotized by a routine method, and this product and a methyl-co-sulfonic acid derivative of aniline are subjected to a coupling reaction by a routine method and then to hydrolysis under alkaline conditions. Thus, a compound represented by the following formula (7) is obtained. The compound represented by the formula (7) thus obtained is sulfonated by treating the compound with fuming sulfuric acid or the like, and thereby a compound represented by the formula (6) can be obtained. Furthermore, among the compounds represented by the formula (6), there are also products available as commercial products (for example, C.I. Acid Yellow 9).

Subsequently, the compound represented by the formula (6) thus obtained is diazotized by a routine method, and then this product and a compound represented by the following formula (8) are subjected to a coupling reaction by a routine method. Thus, a compound represented by the following formula (9) is obtained.

On the other hand, the compound represented by the formula (6) is diazotized by a routine method, and then this product and a compound represented by the following formula (10) are subjected to a coupling reaction by a routine method. Thus, a compound represented by the following formula (11) is obtained.

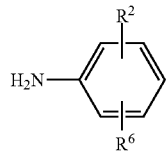
(10)

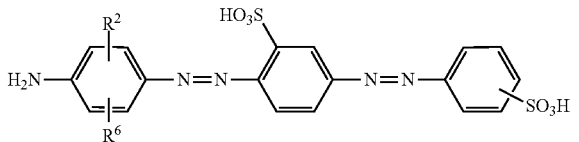
(11)

In the same manner, the compound represented by the formula (6) is diazotized by a routine method, and then this product and a compound represented by the following formula (12) are subjected to a coupling reaction by a routine method. Thus, a compound represented by the following formula (13) is obtained.

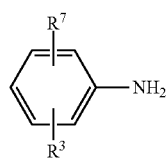
(12)

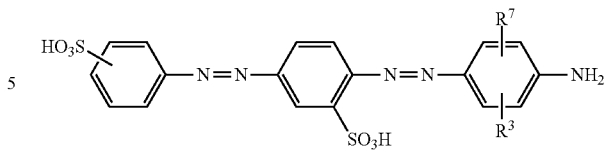
(13)

In the same manner, the compound represented by the following formula (6) is diazotized by a routine method, and then this product and a compound represented by the following formula (14) are subjected to a coupling reaction by a routine method. Thus, a compound represented by the following formula (15) is obtained.

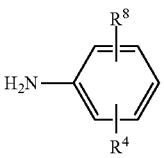
(14)

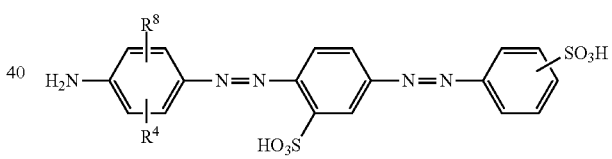
(15)

The compound represented by the formula (9) thus obtained is subjected to a condensation reaction with a cyanuric halide, for example, cyanuric chloride, by a routine method, and thus a compound represented by the following formula (16) is obtained.

(16)

Subsequently, the compound represented by the formula (16) thus obtained is subjected to a condensation reaction with a compound represented by the formula (11) by a routine method, and thus a compound represented by the following formula (17) is obtained.

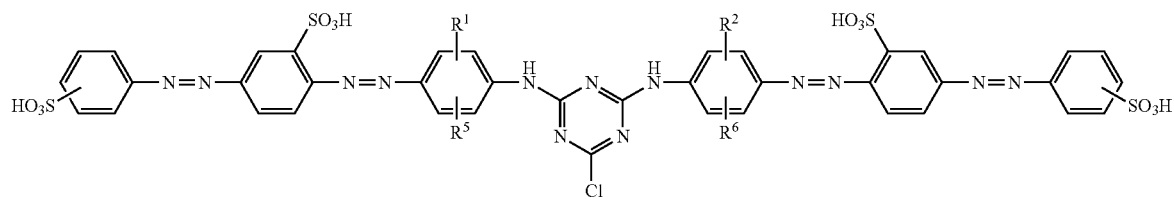

(17)

In the same manner, the compound represented by the formula (13) thus obtained is subjected to a condensation reaction with a cyanuric halide, for example, cyanuric chloride, by a routine method, and thus a compound represented by the following formula (18) is obtained.

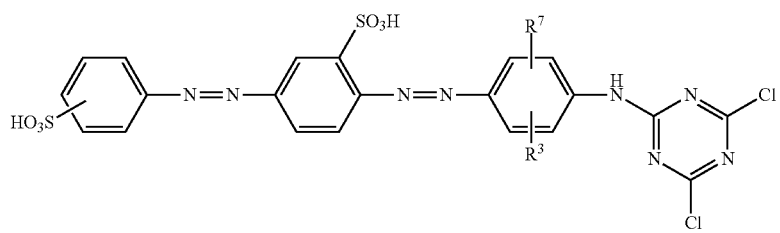

(18)

Subsequently, the compound represented by the formula (18) thus obtained is subjected to a condensation reaction with a compound represented by the formula (15) by a routine method, and thus a compound represented by the following formula (19) is obtained.

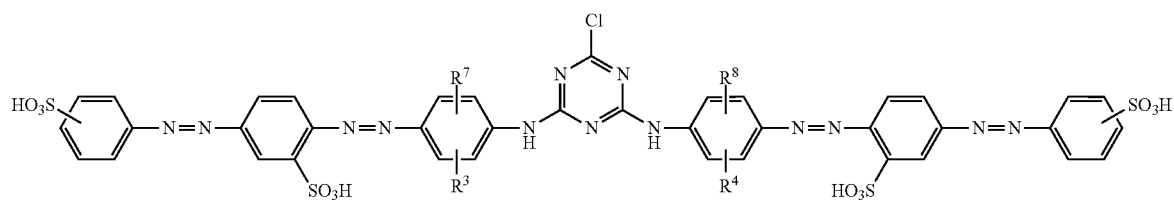

(19)

Then, the compound represented by the formula (17), the compound represented by the formula (19) thus obtained, and a compound corresponding to the crosslinking group X represented by the following formula (20) are subjected to a condensation reaction by a routine method, and thereby the azo compound of the present invention represented by the formula (1) can be obtained.

$$H-X-H \quad (20)$$

There are no particular limitations on the suitable specific examples of the azo compound of the present invention represented by the formula (1), but some suitable specific examples include the compounds presented in the following Tables 1 to 22, etc.

In the respective tables, the functional groups such as a sulfo group and a carboxy group are indicated in the form of free acid, for convenience.

TABLE 1
| Compound No. | Structural formula |
|---|---|
| 1 | 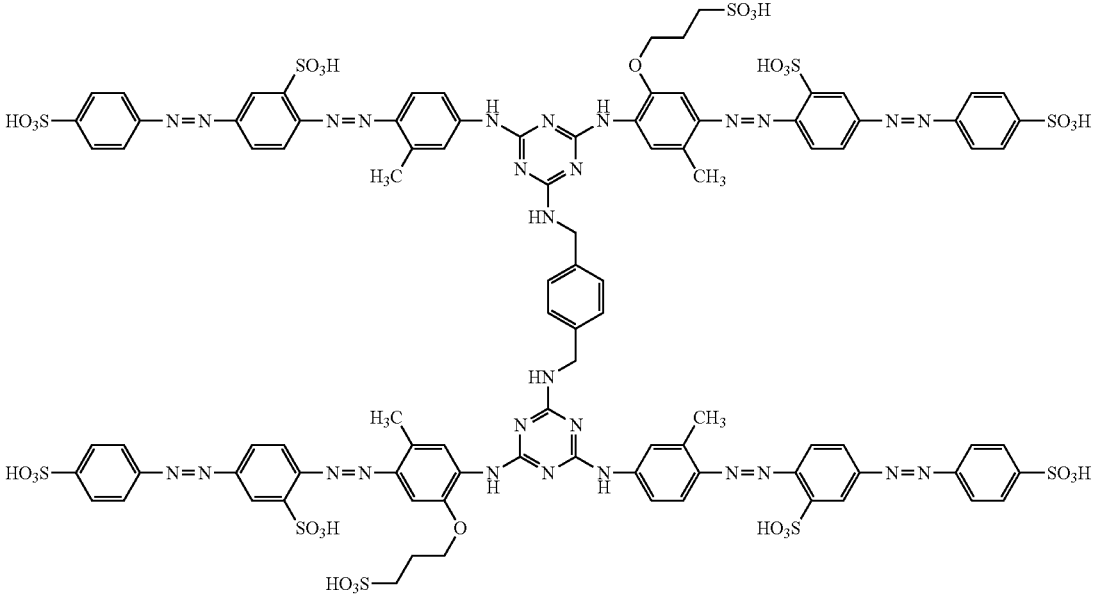 |
| 2 | 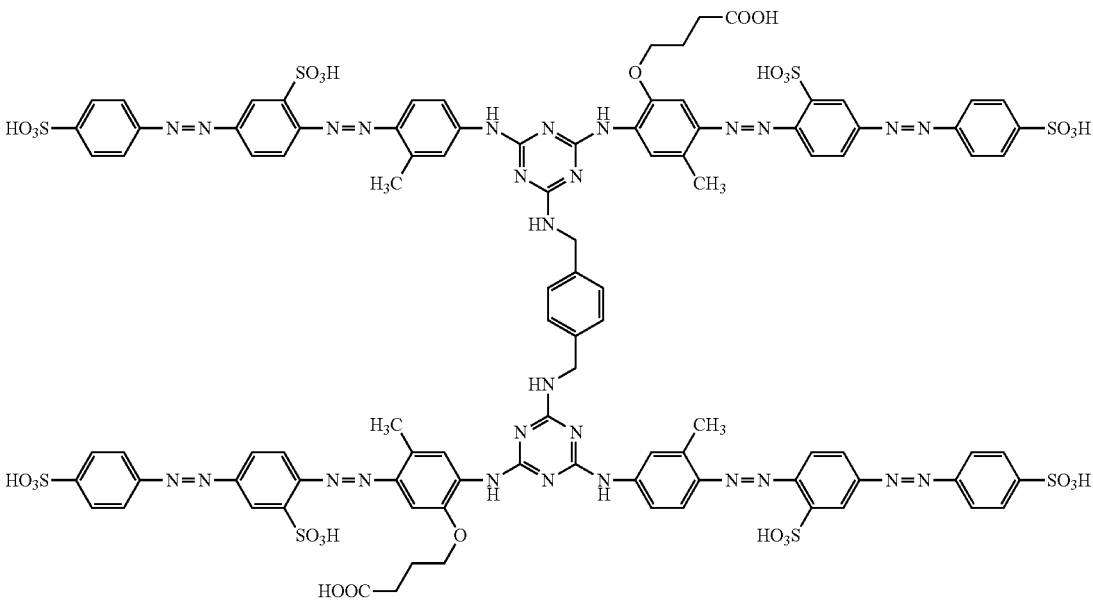 [SMILES: Cc1cc(Nc2nc(NCc3ccc(CNc4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCC(=O)O)n4)cc3)nc(Nc3cc(C)c(N=Nc4ccc(N=Nc5ccc(S(=O)(=O)O)cc5)cc4S(=O)(=O)O)cc3OCCCC(=O)O)n2)ccc1N=Nc1ccc(N=Nc2ccc(S(=O)(=O)O)cc2)cc1S(=O)(=O)O] |

TABLE 1-continued
| Compound No. | Structural formula |
|---|---|
| 3 | 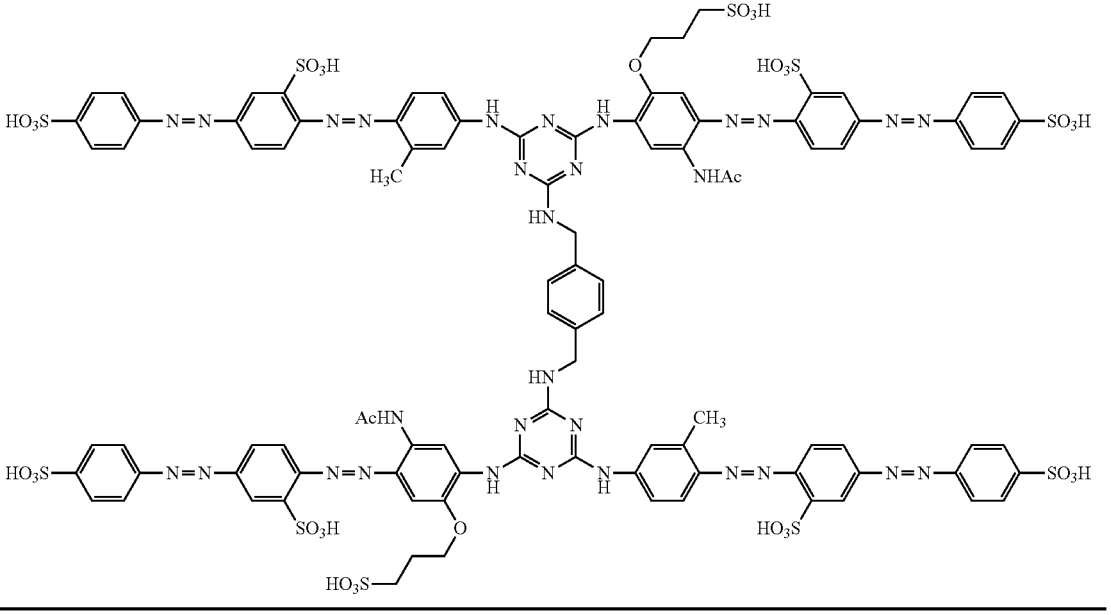 |
TABLE 2
| Compound No. | Structural formula |
|---|---|
| 4 | 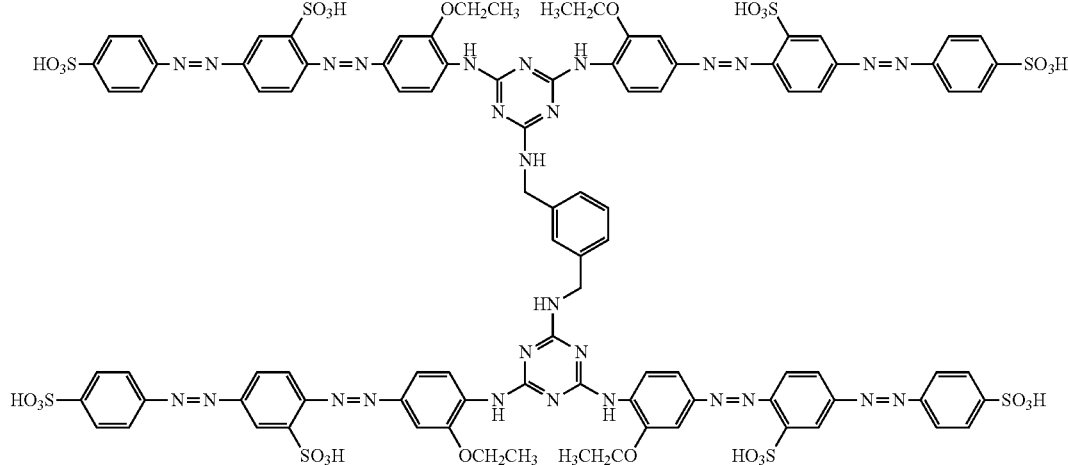 |

TABLE 2-continued
| Compound No. | Structural formula |
|---|---|
| 5 | 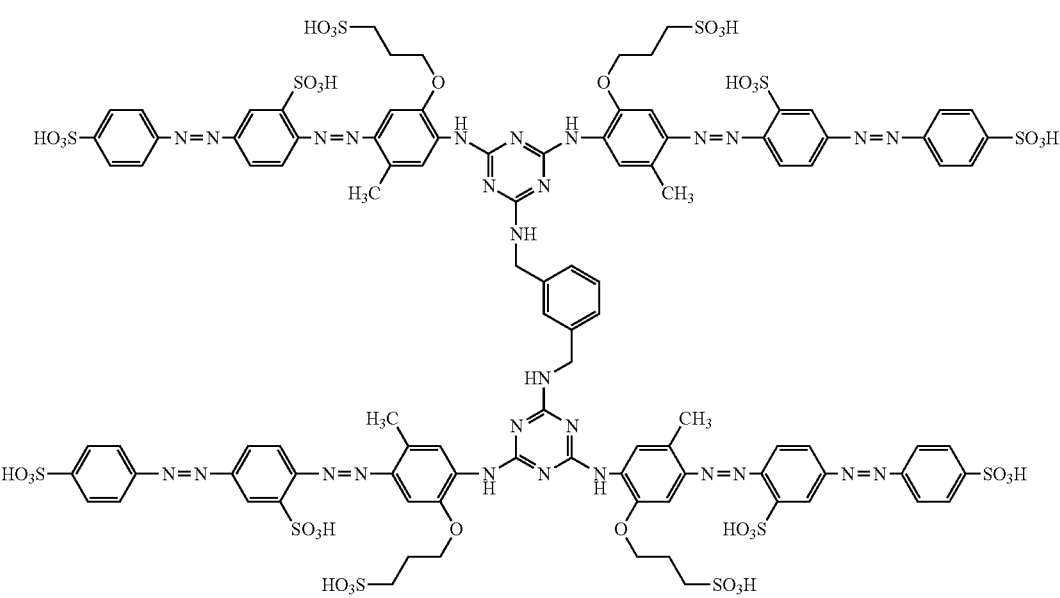 [SMILES: Cc1cc(Nc2nc(NCc3cccc(CNc4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)c3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |
| 6 | 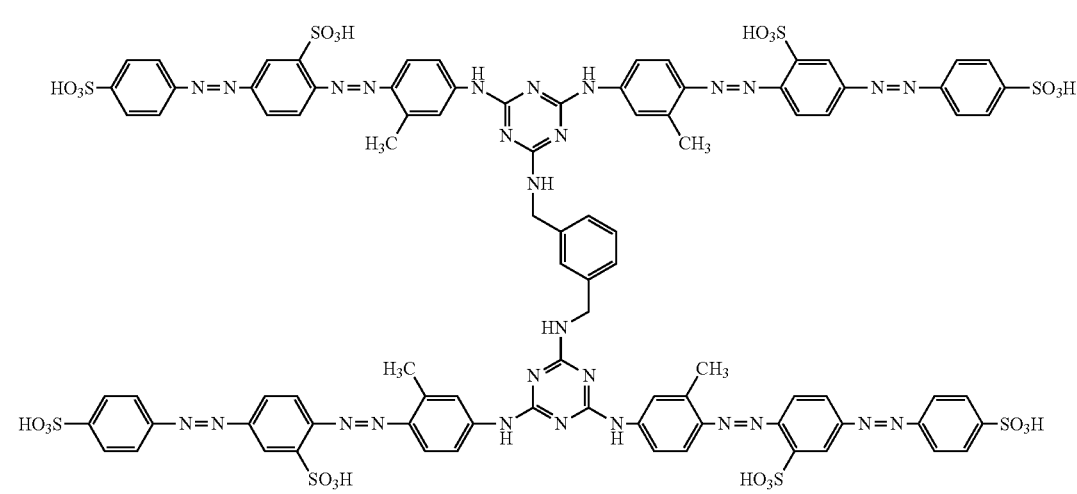 [SMILES: Cc1cc(Nc2nc(NCc3cccc(CNc4nc(Nc5ccc(N=Nc6ccc(N=Nc7ccc(S(=O)(=O)O)cc7)cc6S(=O)(=O)O)c(C)c5)nc(Nc5ccc(N=Nc6ccc(N=Nc7ccc(S(=O)(=O)O)cc7)cc6S(=O)(=O)O)c(C)c5)n4)c3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 3
| Compound No. | Structural formula |
|---|---|
| 7 | 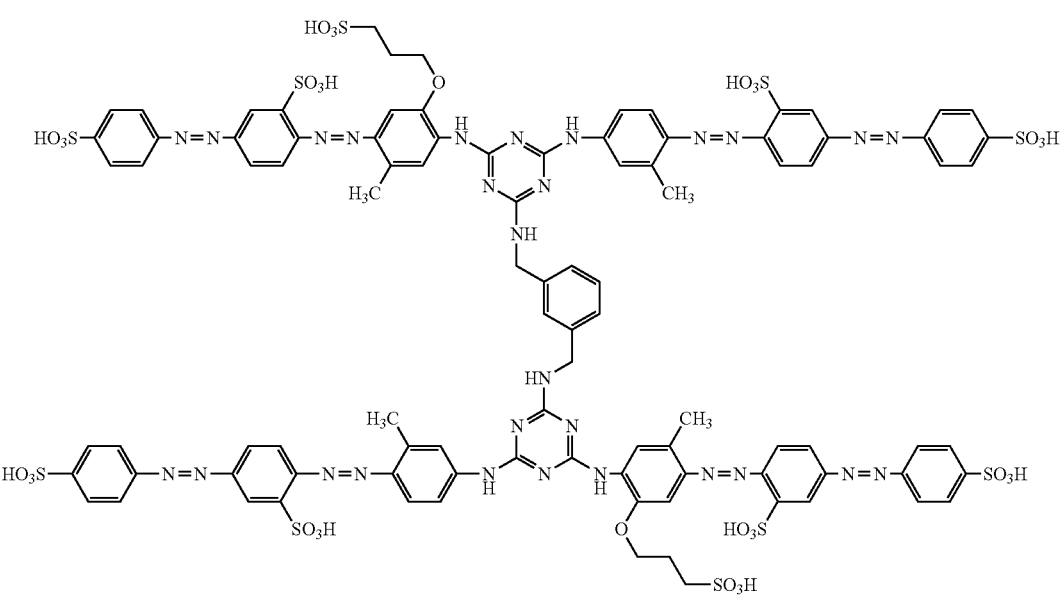 [SMILES: Cc1cc(Nc2nc(NCc3cccc(CNc4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)c3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
| 8 | 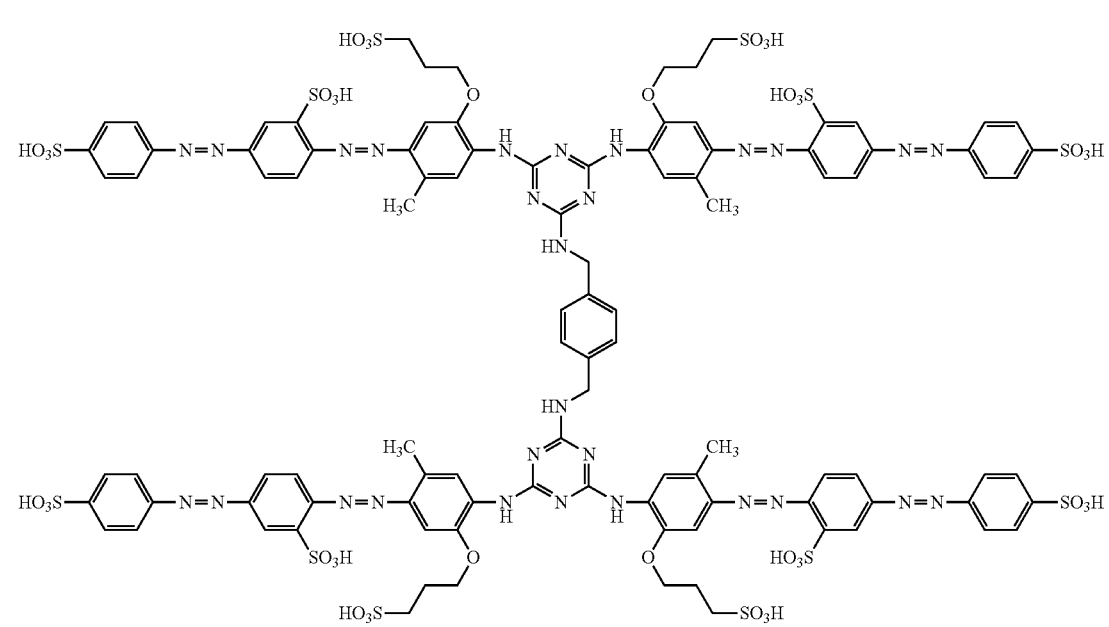 [SMILES: Cc1cc(Nc2nc(NCc3ccc(CNc4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)cc3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |

TABLE 3-continued
| Compound No. | Structural formula |
| --- | --- |
| 9 | 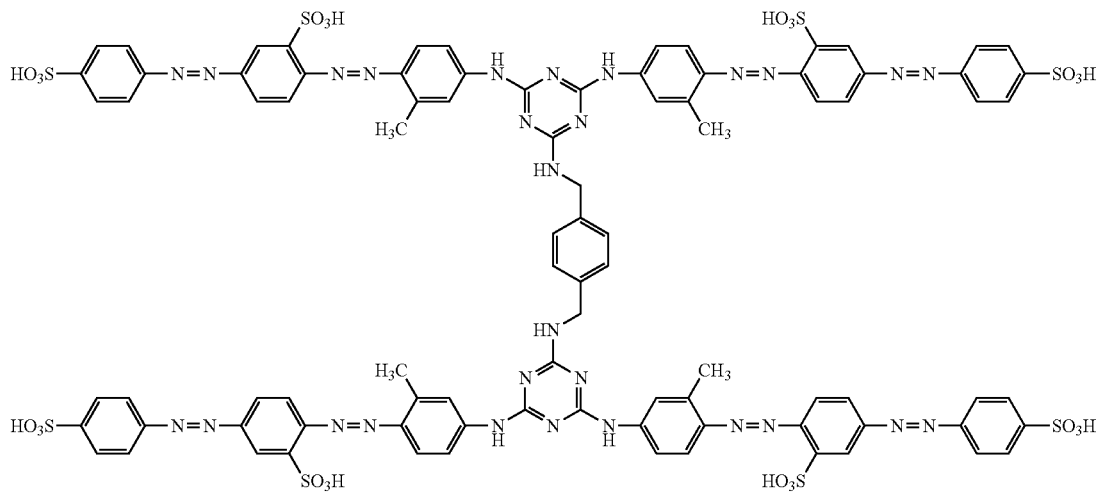 [SMILES: Cc1cc(Nc2nc(NCc3ccc(CNc4nc(Nc5ccc(N=Nc6ccc(N=Nc7ccc(S(=O)(=O)O)cc7)cc6S(=O)(=O)O)c(C)c5)nc(Nc5ccc(N=Nc6ccc(N=Nc7ccc(S(=O)(=O)O)cc7)cc6S(=O)(=O)O)c(C)c5)n4)cc3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |
TABLE 4
| Compound No. | Structural formula |
| --- | --- |
| 10 | 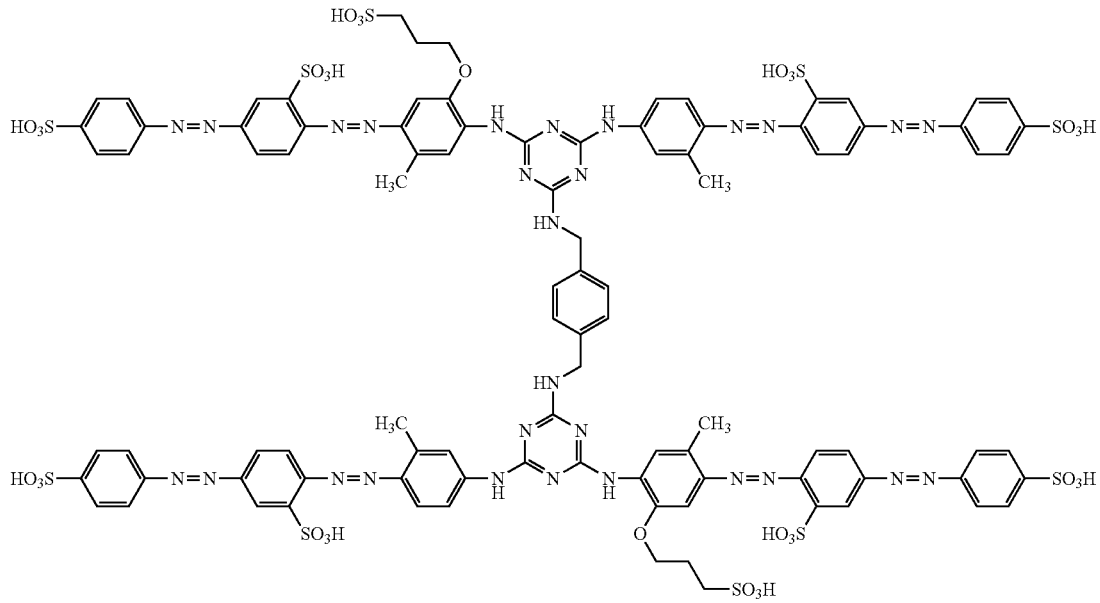 [SMILES: Cc1cc(Nc2nc(NCc3ccc(CNc4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)cc3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |

TABLE 4-continued
| Compound No. | Structural formula |
|---|---|
| 11 | 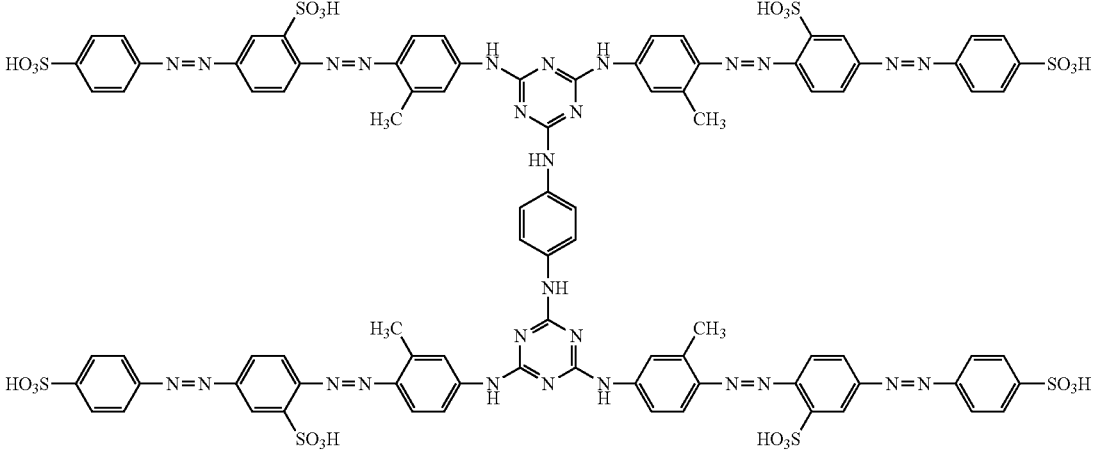 [SMILES: Cc1cc(Nc2nc(Nc3ccc(Nc4nc(Nc5ccc(N=Nc6ccc(N=Nc7ccc(S(=O)(=O)O)cc7)cc6S(=O)(=O)O)c(C)c5)nc(Nc5ccc(N=Nc6ccc(N=Nc7ccc(S(=O)(=O)O)cc7)cc6S(=O)(=O)O)c(C)c5)n4)cc3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |
| 12 | 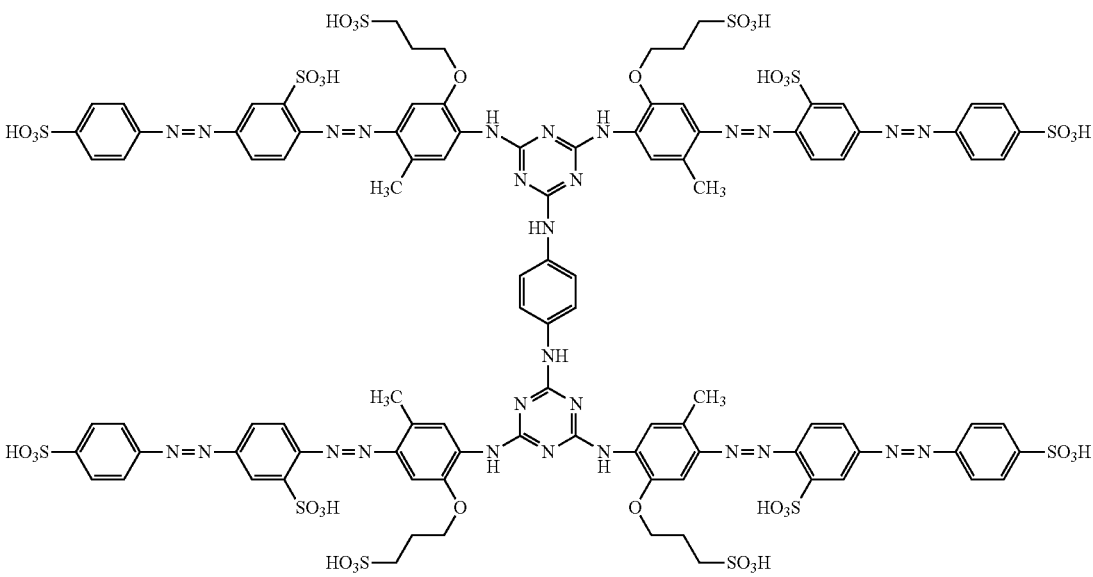 [SMILES: Cc1cc(Nc2nc(Nc3ccc(Nc4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)cc3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |

TABLE 5
| Compound No. | Structural formula |
| --- | --- |
| 13 | 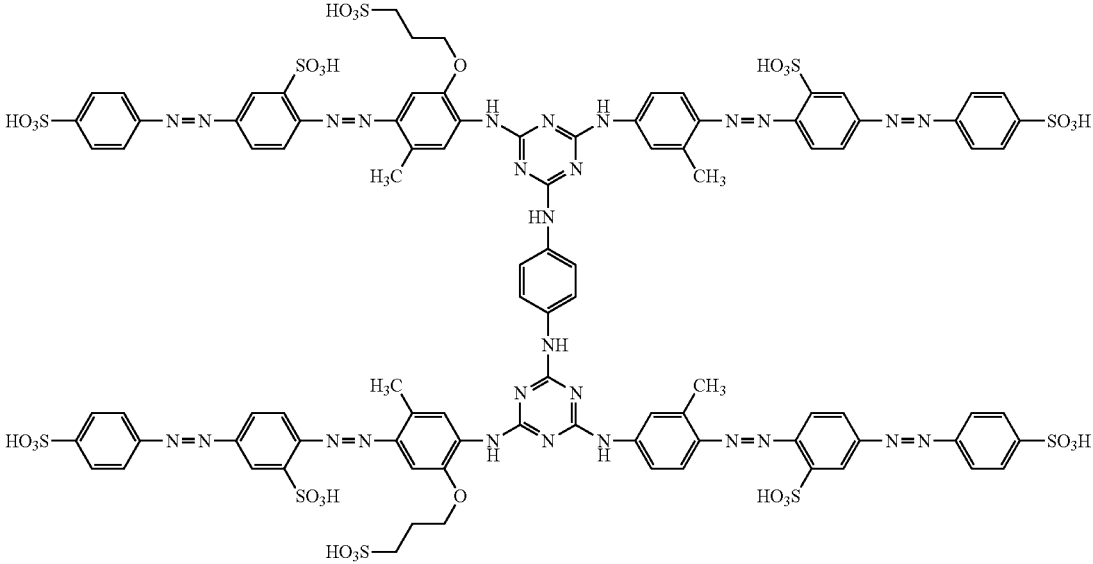 [SMILES: Cc1cc(Nc2nc(Nc3ccc(Nc4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)cc3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
| 14 | 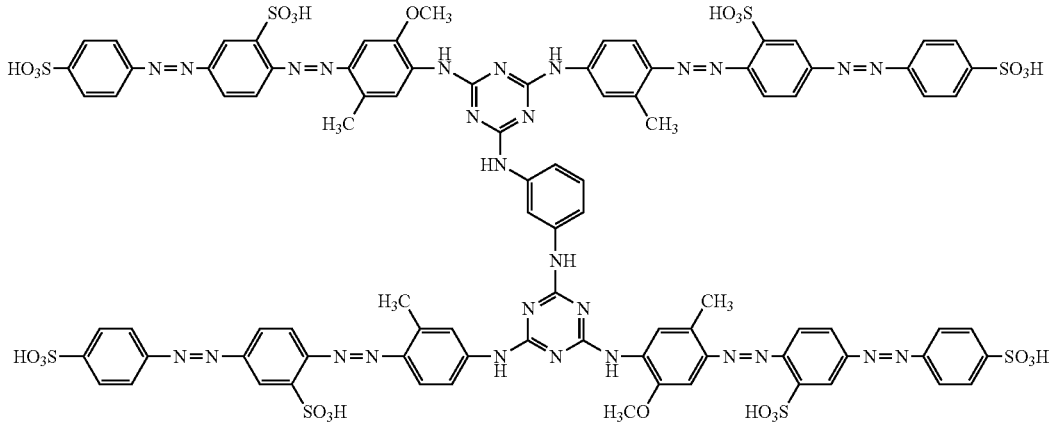 [SMILES: COc1cc(N=Nc2ccc(N=Nc3ccc(S(=O)(=O)O)cc3)cc2S(=O)(=O)O)c(C)cc1Nc1nc(Nc2cccc(Nc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OC)n3)c2)nc(Nc2ccc(N=Nc3ccc(N=Nc4ccc(S(=O)(=O)O)cc4)cc3S(=O)(=O)O)c(C)c2)n1] |
| 15 | 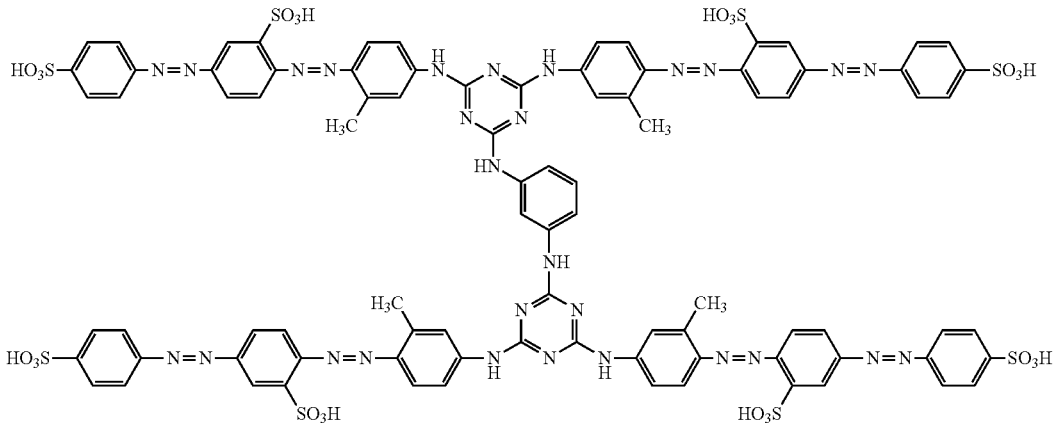 [SMILES: Cc1cc(Nc2nc(Nc3cccc(Nc4nc(Nc5ccc(N=Nc6ccc(N=Nc7ccc(S(=O)(=O)O)cc7)cc6S(=O)(=O)O)c(C)c5)nc(Nc5ccc(N=Nc6ccc(N=Nc7ccc(S(=O)(=O)O)cc7)cc6S(=O)(=O)O)c(C)c5)n4)c3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 5-continued
| Compound No. | Structural formula |
|---|---|
| 16 | 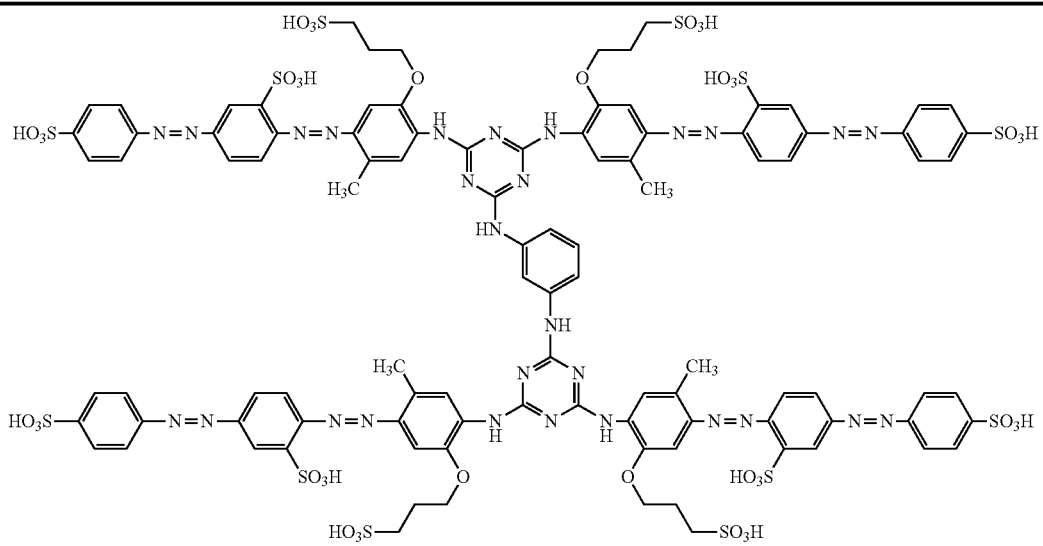 |
TABLE 6
| Compound No. | Structural formula |
|---|---|
| 17 | 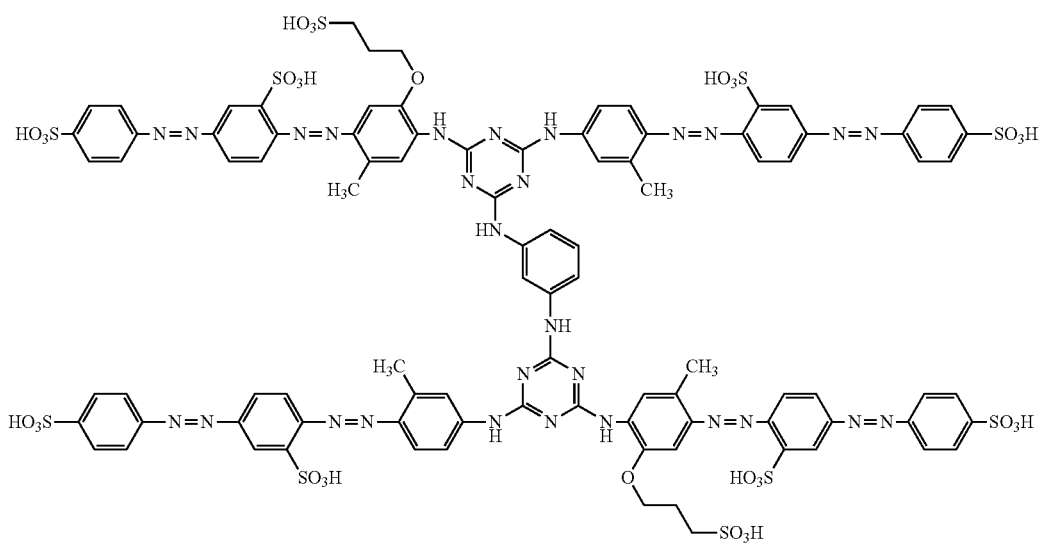 [SMILES: Cc1cc(Nc2nc(Nc3cccc(Nc4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)c3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |

TABLE 6-continued
| Compound No. | Structural formula |
|---|---|
| 18 | 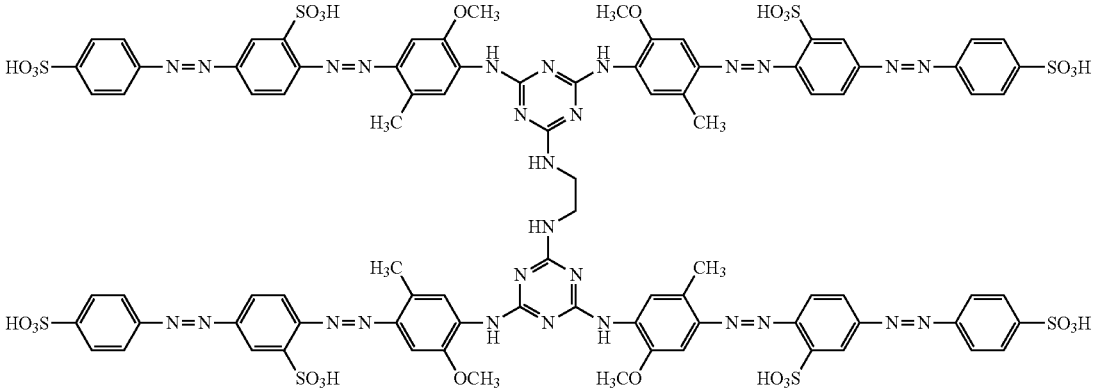 [SMILES: COc1cc(N=Nc2ccc(N=Nc3ccc(S(=O)(=O)O)cc3)cc2S(=O)(=O)O)c(C)cc1Nc1nc(NCCNc2nc(Nc3cc(C)c(N=Nc4ccc(N=Nc5ccc(S(=O)(=O)O)cc5)cc4S(=O)(=O)O)cc3OC)nc(Nc3cc(C)c(N=Nc4ccc(N=Nc5ccc(S(=O)(=O)O)cc5)cc4S(=O)(=O)O)cc3OC)n2)nc(Nc2cc(C)c(N=Nc3ccc(N=Nc4ccc(S(=O)(=O)O)cc4)cc3S(=O)(=O)O)cc2OC)n1] |
| 19 | 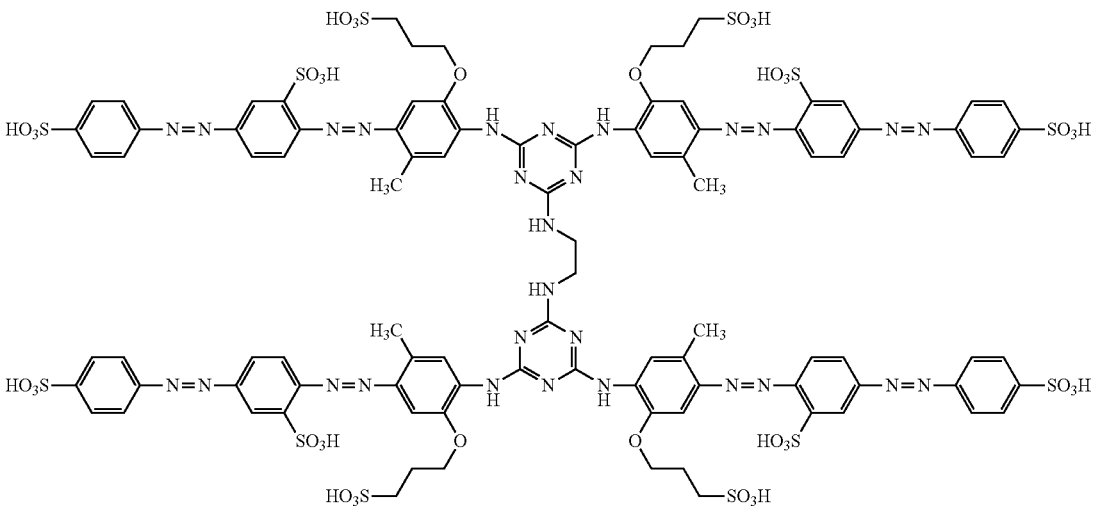 [SMILES: Cc1cc(Nc2nc(NCCNc3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |
| 20 | 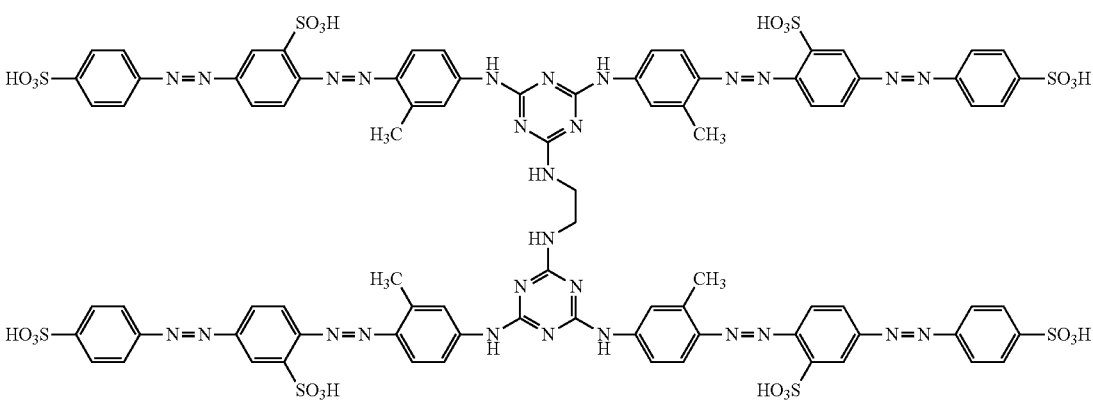 [SMILES: Cc1cc(Nc2nc(NCCNc3nc(Nc4ccc(N=Nc5ccc(N=Nc6ccc(S(=O)(=O)O)cc6)cc5S(=O)(=O)O)c(C)c4)nc(Nc4ccc(N=Nc5ccc(N=Nc6ccc(S(=O)(=O)O)cc6)cc5S(=O)(=O)O)c(C)c4)n3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 7
| Compound No. | Structural formula |
|---|---|
| 21 | 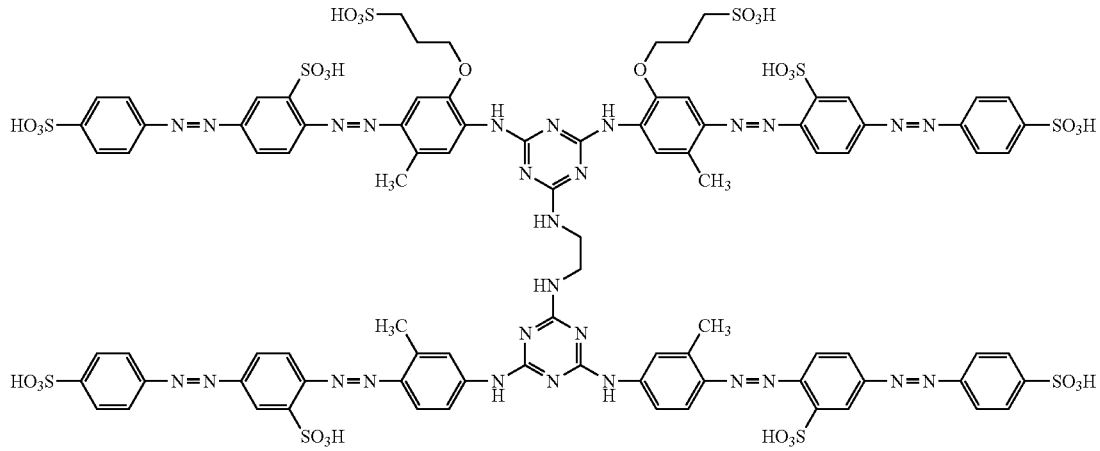 [SMILES: Cc1cc(Nc2nc(NCCNc3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |
| 22 | 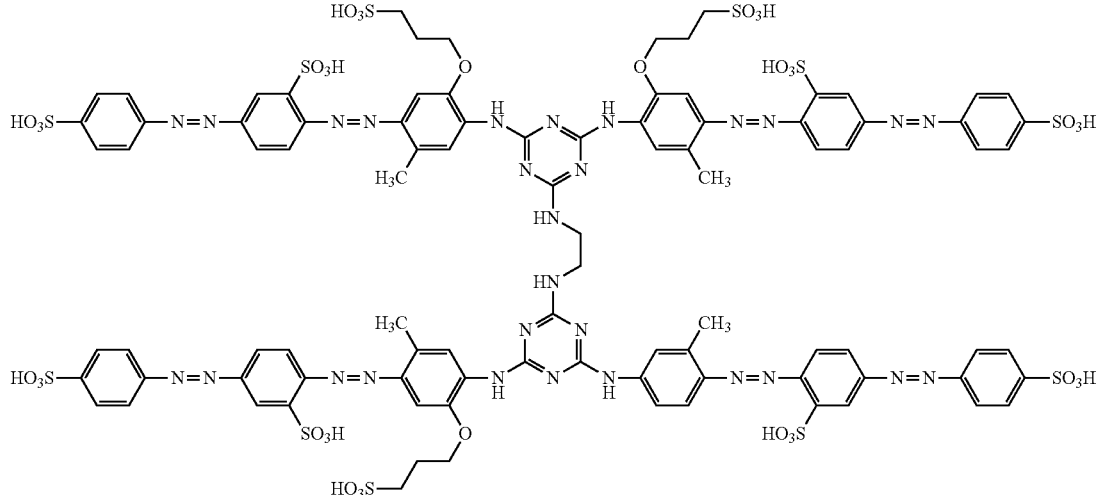 |
| 23 | 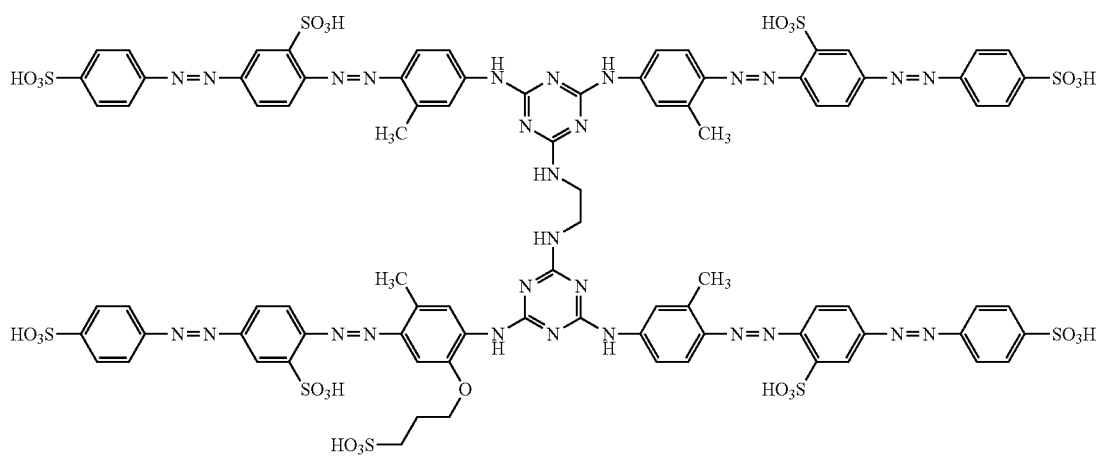 [SMILES: Cc1cc(Nc2nc(NCCNc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 7-continued
| Compound No. | Structural formula |
|---|---|
| 24 | 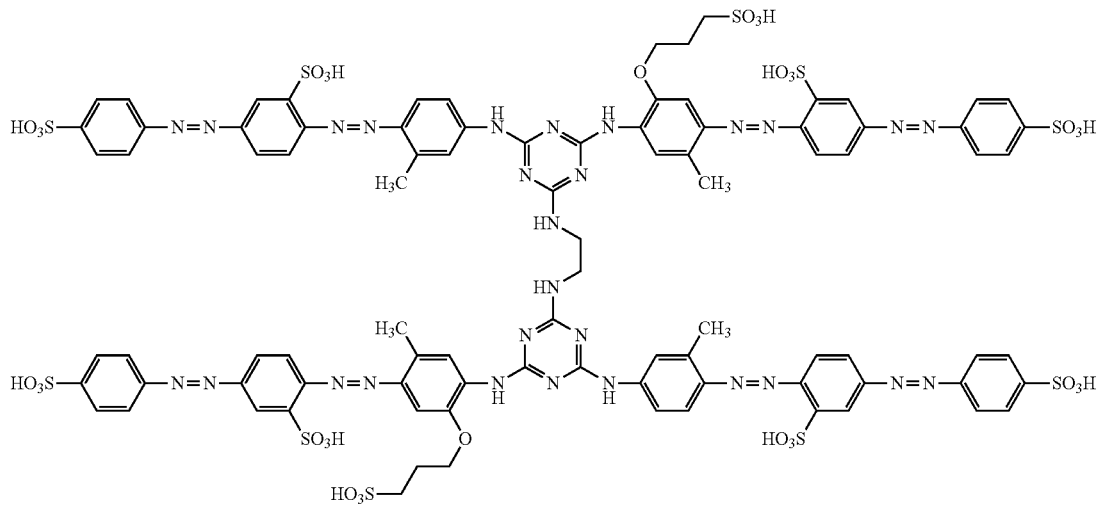 [SMILES: Cc1cc(Nc2nc(NCCNc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
TABLE 8
| Compound No. | Structural formula |
|---|---|
| 25 | 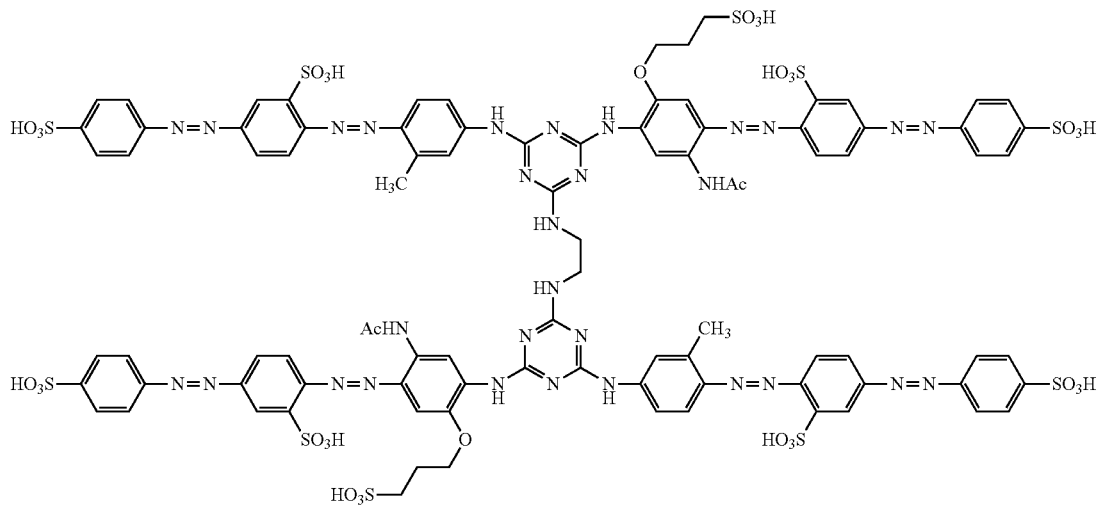 [SMILES: CC(=O)Nc1cc(Nc2nc(NCCNc3nc(Nc4ccc(N=Nc5ccc(N=Nc6ccc(S(=O)(=O)O)cc6)cc5S(=O)(=O)O)c(C)c4)nc(Nc4cc(NC(C)=O)c(N=Nc5ccc(N=Nc6ccc(S(=O)(=O)O)cc6)cc5S(=O)(=O)O)cc4OCCCS(=O)(=O)O)n3)nc(Nc3ccc(N=Nc4ccc(N=Nc5ccc(S(=O)(=O)O)cc5)cc4S(=O)(=O)O)c(C)c3)n2)c(OCCCS(=O)(=O)O)cc1N=Nc1ccc(N=Nc2ccc(S(=O)(=O)O)cc2)cc1S(=O)(=O)O] |

TABLE 8-continued

| Compound No. | Structural formula |
| --- | --- |
| 26 | (structure) |
| 27 | (structure) |
| 28 | (structure) |

TABLE 9
| Compound No. | Structural formula |
|---|---|
| 29 | 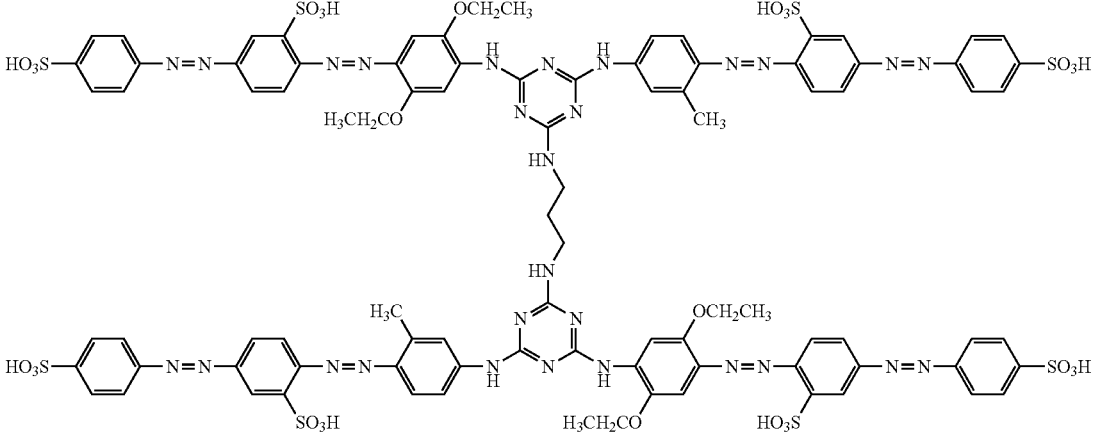 |
| 30 | 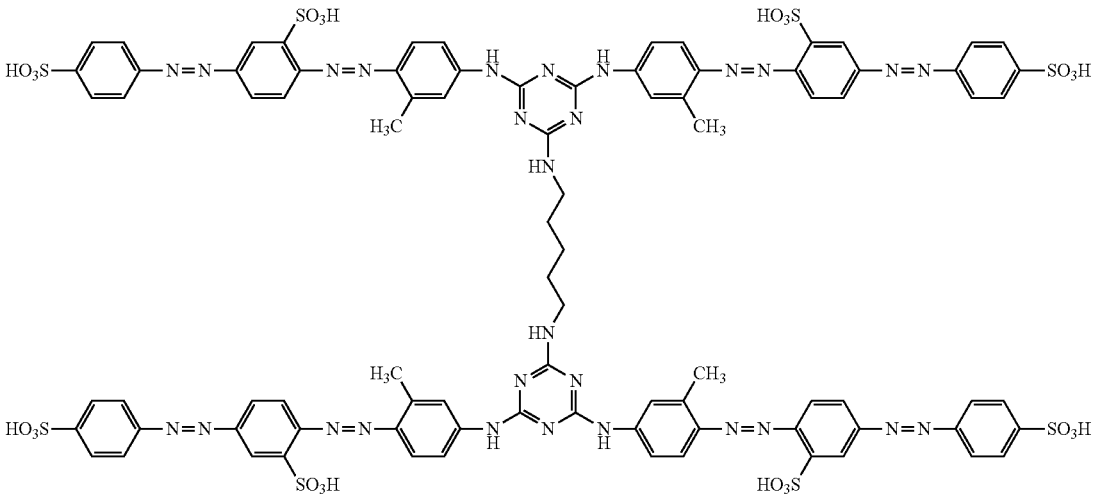 [SMILES: Cc1cc(Nc2nc(NCCCCCNc3nc(Nc4ccc(N=Nc5ccc(N=Nc6ccc(S(=O)(=O)O)cc6)cc5S(=O)(=O)O)c(C)c4)nc(Nc4ccc(N=Nc5ccc(N=Nc6ccc(S(=O)(=O)O)cc6)cc5S(=O)(=O)O)c(C)c4)n3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |
| 31 | 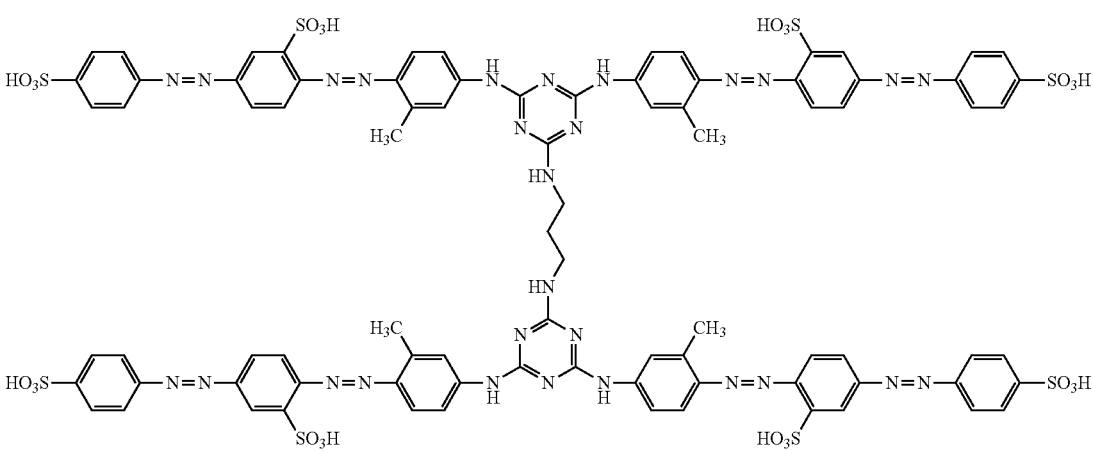 [SMILES: Cc1cc(Nc2nc(NCCCNc3nc(Nc4ccc(N=Nc5ccc(N=Nc6ccc(S(=O)(=O)O)cc6)cc5S(=O)(=O)O)c(C)c4)nc(Nc4ccc(N=Nc5ccc(N=Nc6ccc(S(=O)(=O)O)cc6)cc5S(=O)(=O)O)c(C)c4)n3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 9-continued
| Compound No. | Structural formula |
| --- | --- |
| 32 | 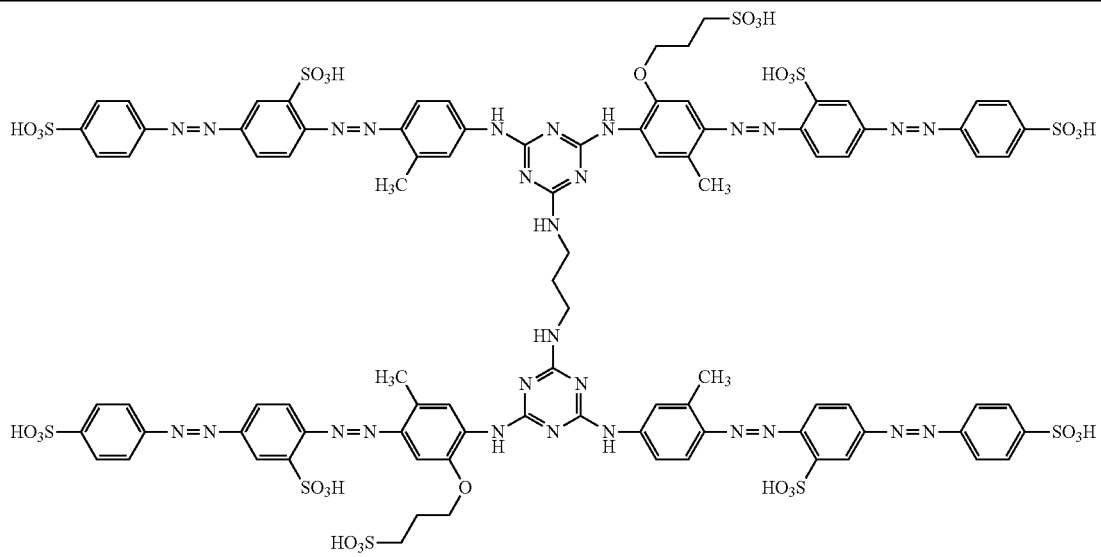 |

TABLE 10

| Compound No. | Structural formula |
|---|---|
| 33 | (structure not transcribed) |

TABLE 10-continued
| Compound No. | Structural formula |
|---|---|
| 34 | 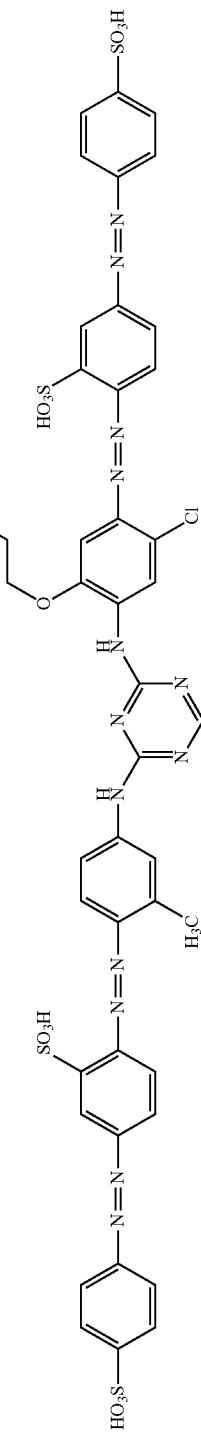 |

TABLE 10-continued

| Compound No. | Structural formula |
|---|---|
| 35 | (structure shown) |

TABLE 11

| Compound No. | Structural formula |
|---|---|
| 36 | |

TABLE 11-continued
| Compound No. | Structural formula |
|---|---|
| 37 | 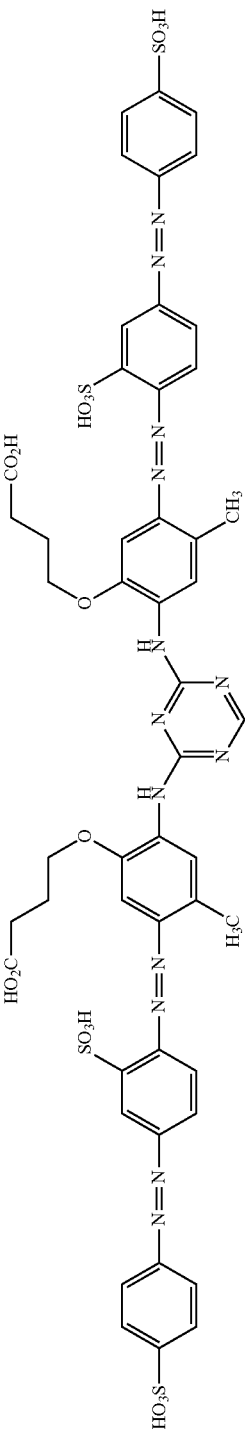 |

TABLE 11-continued
| Compound No. | Structural formula |
|---|---|
| 38 | 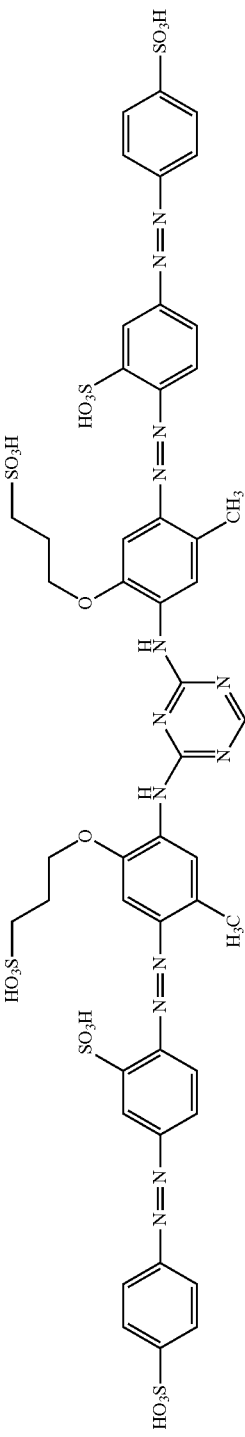 |

TABLE 12

| Compound No. | Structural formula |
| --- | --- |
| 39 | |

TABLE 12-continued
| Compound No. | Structural formula |
| --- | --- |
| 40 | 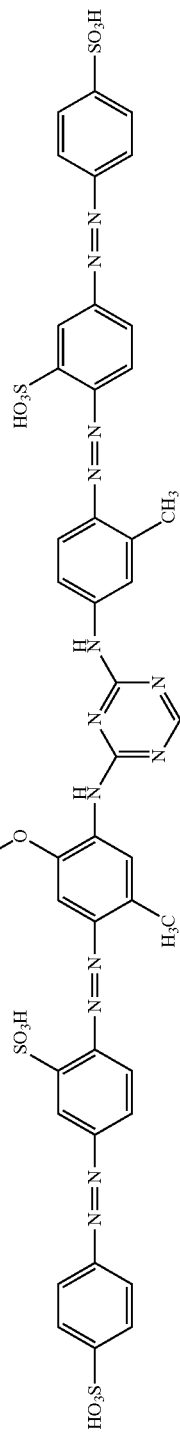 |

TABLE 12-continued
| Compound No. | Structural formula |
|---|---|
| 41 | 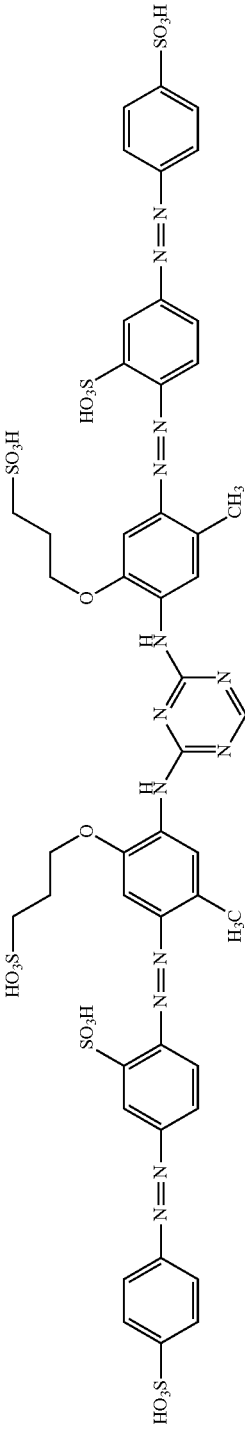 |

TABLE 13
| Compound No. | Structural formula |
|---|---|
| 42 | 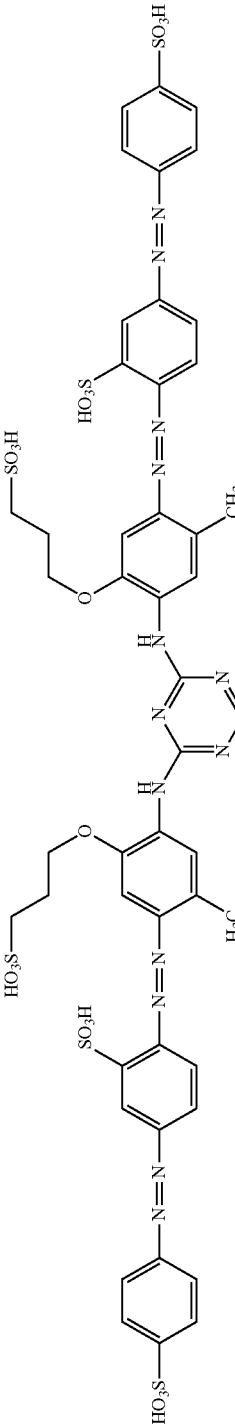 |

TABLE 13-continued
| Compound No. | Structural formula |
|---|---|
| 43 | 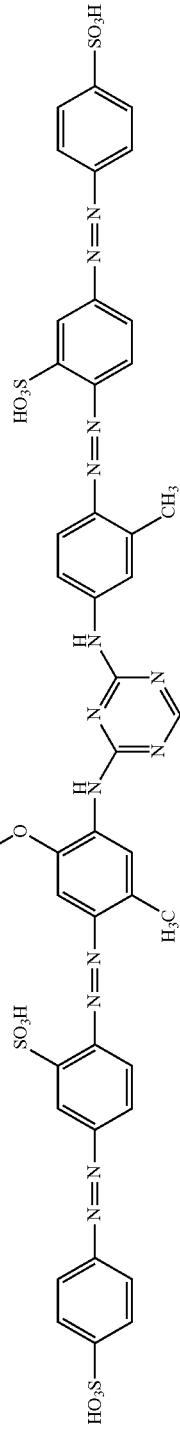 |

TABLE 13-continued

| Compound No. | Structural formula |
|---|---|
| 44 | |

TABLE 13-continued

| Compound No. | Structural formula |
|---|---|
| 45 | |

TABLE 14

| Compound No. | Structural formula |
| --- | --- |
| 46 | |

TABLE 14-continued

| Compound No. | Structural formula |
|---|---|
| 47 | |

TABLE 14-continued
| Compound No. | Structural formula |
|---|---|
| 48 | 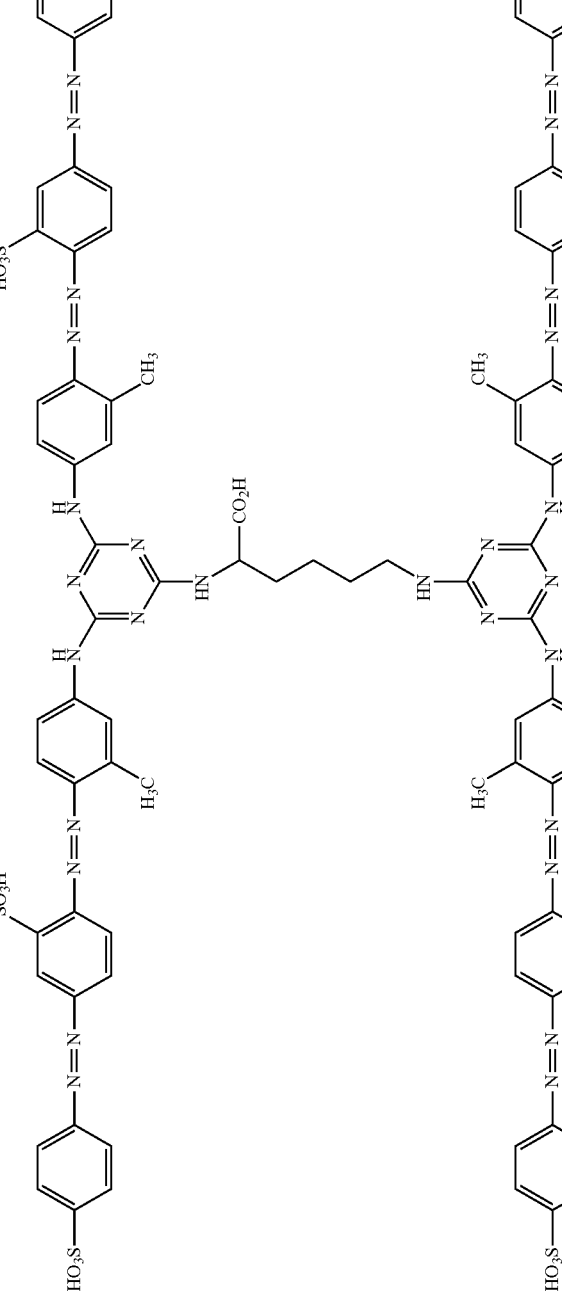 |

TABLE 15

| Compound No. | Structural formula |
|---|---|
| 49 | |

TABLE 15-continued
| Compound No. | Structural formula |
|---|---|
| 50 | 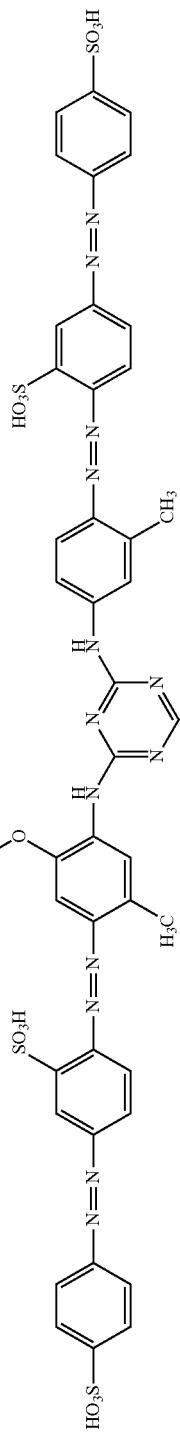 |

TABLE 15-continued
| Compound No. | Structural formula |
|---|---|
| 51 | 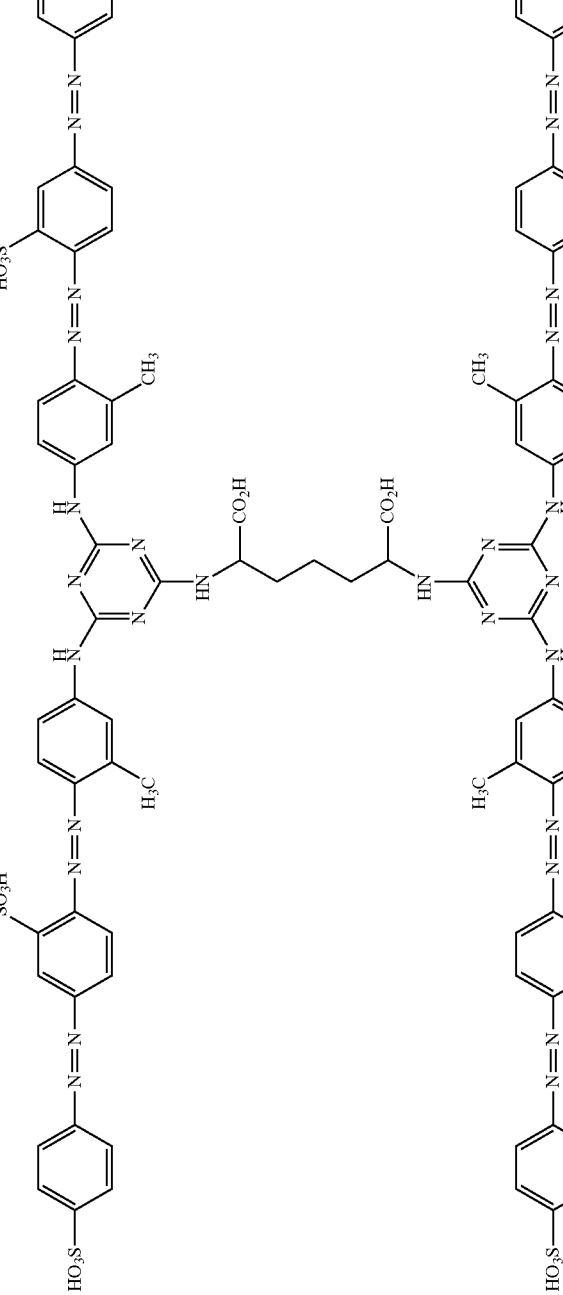 |

TABLE 16

| Compound No. | Structural formula |
| --- | --- |
| 52 | |

TABLE 16-continued

| Compound No. | Structural formula |
|---|---|
| 53 | (structure shown) |

TABLE 16-continued
| Compound No. | Structural formula |
|---|---|
| 54 | 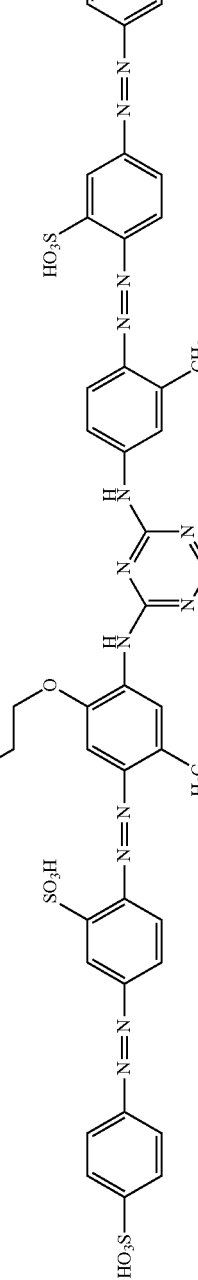 |

TABLE 17
| Compound No. | Structural formula |
|---|---|
| 55 | 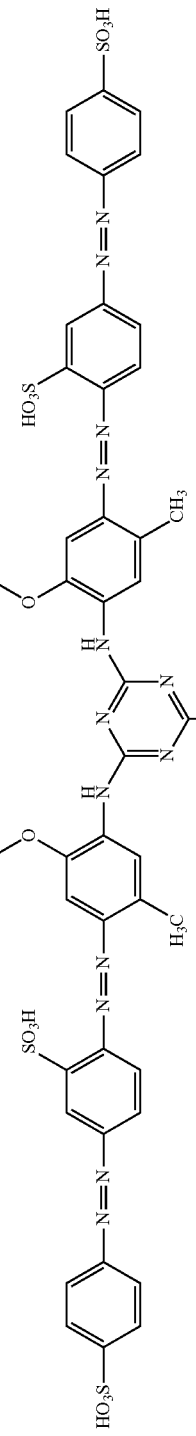 |

TABLE 17-continued
| Compound No. | Structural formula |
|---|---|
| 56 | 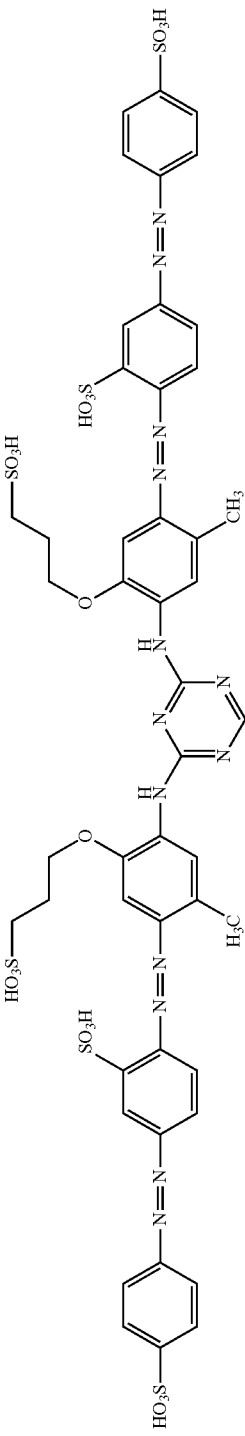 |

TABLE 17-continued
| Compound No. | Structural formula |
|---|---|
| 57 | 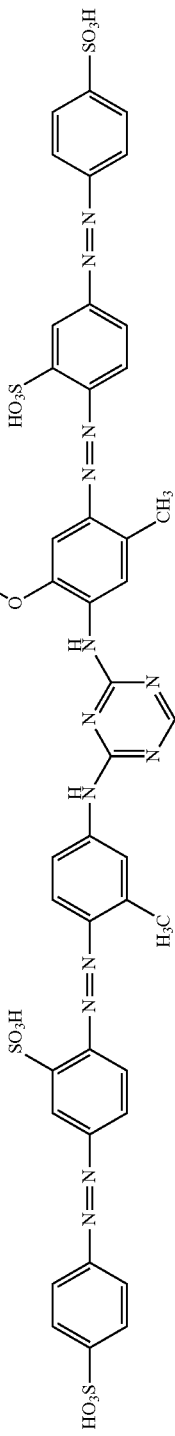 |

TABLE 18

| Compound No. | Structural formula |
|---|---|
| 58 | |

TABLE 18-continued
| Compound No. | Structural formula |
|---|---|
| 59 | 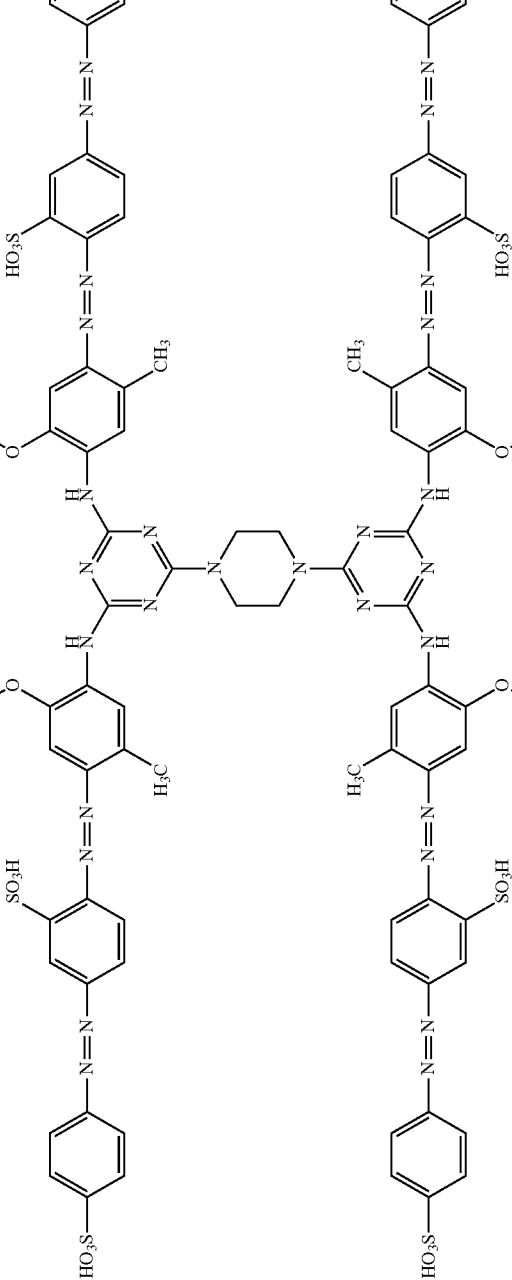 |

TABLE 18-continued

| Compound No. | Structural formula |
|---|---|
| 60 | |

TABLE 18-continued
| Compound No. | Structural formula |
|---|---|
| 61 | 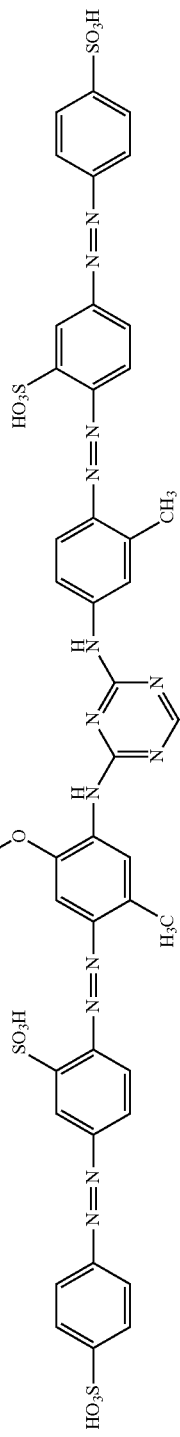 |

TABLE 19
| Compound No. | Structural formula |
|---|---|
| 62 | 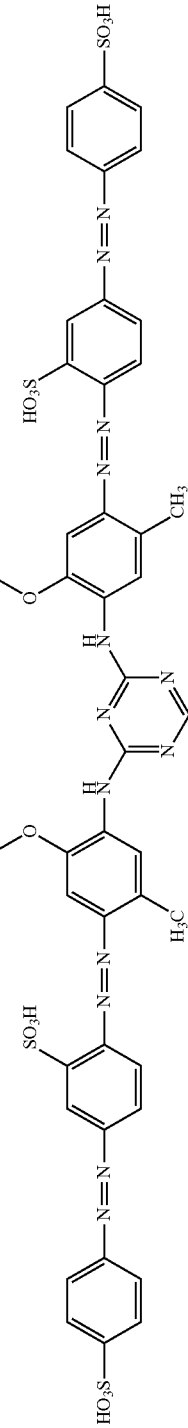 |

TABLE 19-continued
| Compound No. | Structural formula |
|---|---|
| 63 | 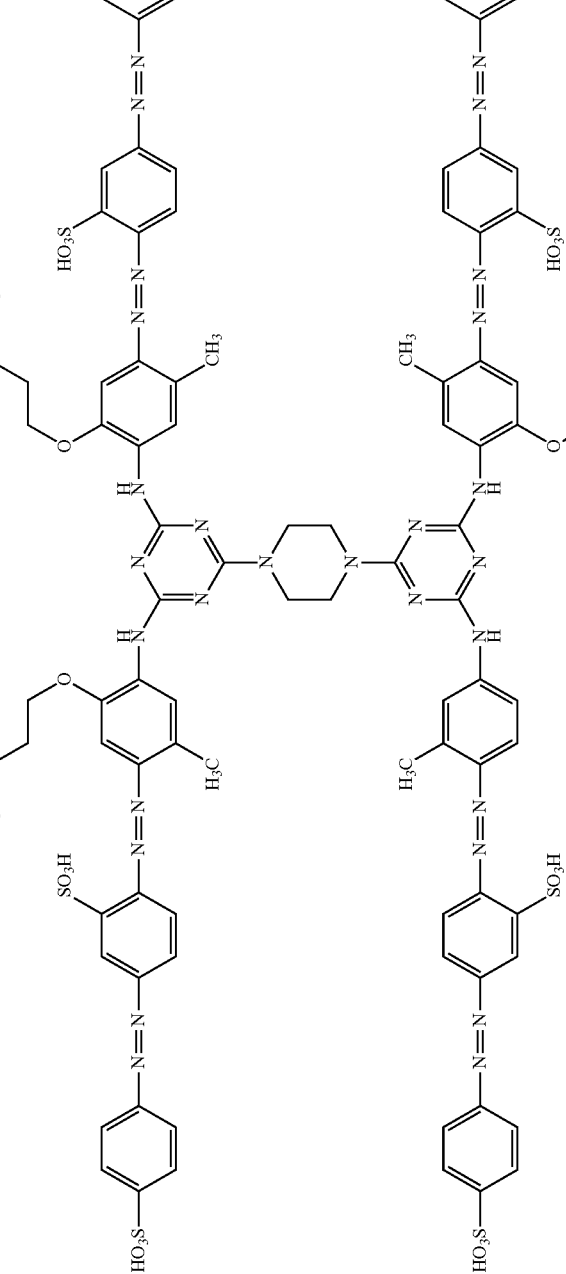 |

TABLE 19-continued

| Compound No. | Structural formula |
|---|---|
| 64 | |

TABLE 19-continued
| Compound No. | Structural formula |
|---|---|
| 65 | 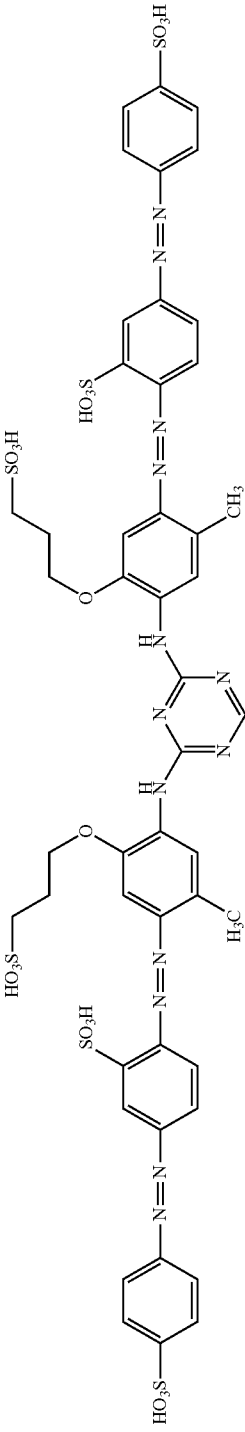 |

TABLE 20
| Compound No. | Structural formula |
|---|---|
| 66 | 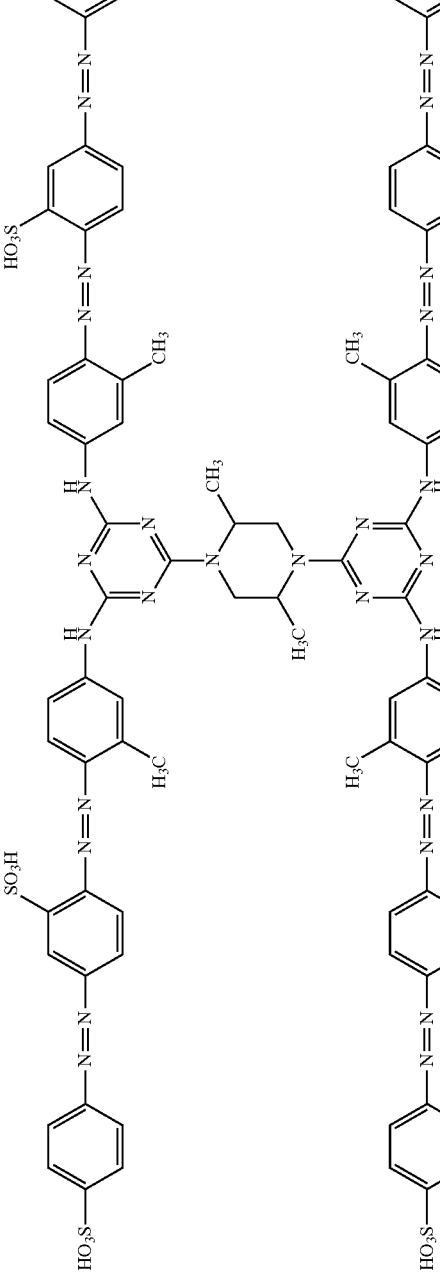 |

TABLE 20-continued
| Compound No. | Structural formula |
|---|---|
| 67 | 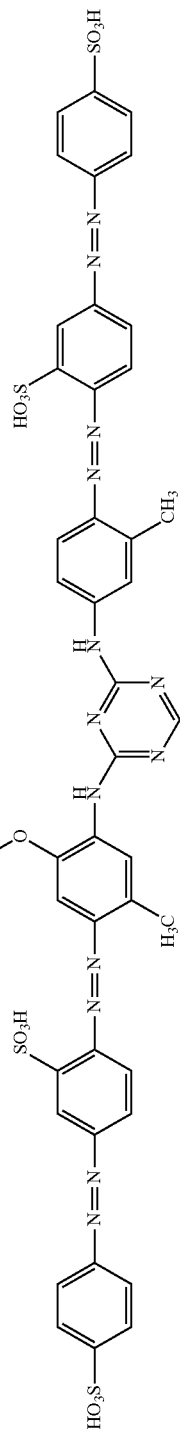 |

TABLE 20-continued

| Compound No. | Structural formula |
|---|---|
| 68 | |

TABLE 20-continued

| Compound No. | Structural formula |
|---|---|
| 69 | |

TABLE 21

| Compound No. | Structural formula |
|---|---|
| 70 | |

TABLE 21-continued

| Compound No. | Structural formula |
|---|---|
| 71 | (structure) |

TABLE 21-continued
| Compound No. | Structural formula |
|---|---|
| 72 | 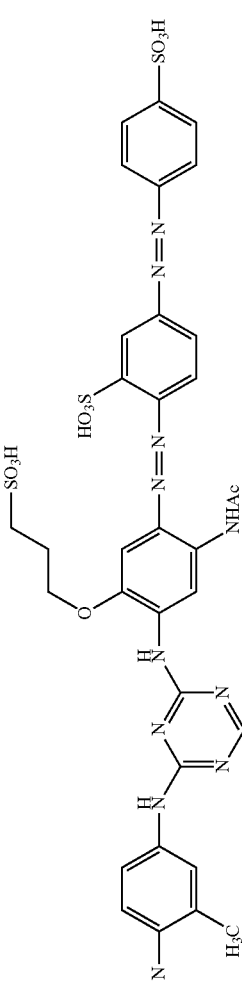 |

TABLE 21-continued
| Compound No. | Structural formula |
|---|---|
| 73 | 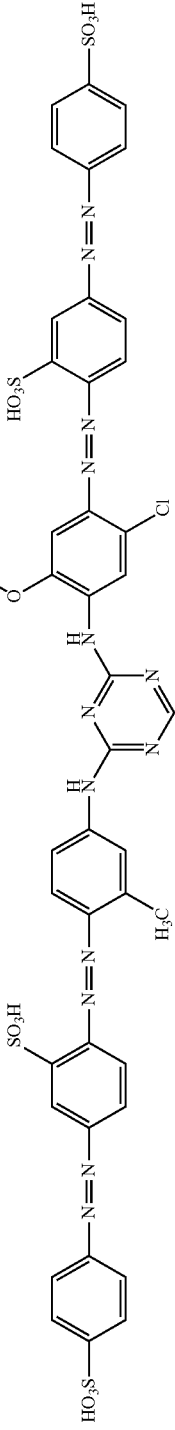 |

TABLE 22

| Compound No. | Structural formula |
|---|---|
| 74 | (structure shown) |

TABLE 22-continued

| Compound No. | Structural formula |
|---|---|
| 75 | (structure not transcribed) |

TABLE 22-continued
| Compound No. | Structural formula |
|---|---|
| 76 | 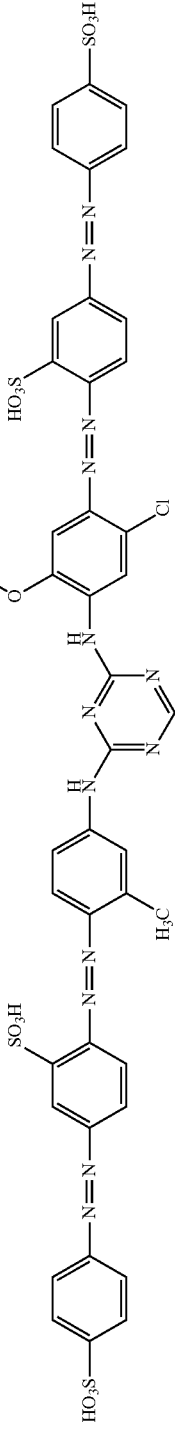 |

TABLE 22-continued
| Compound No. | Structural formula |
|---|---|
| 77 | 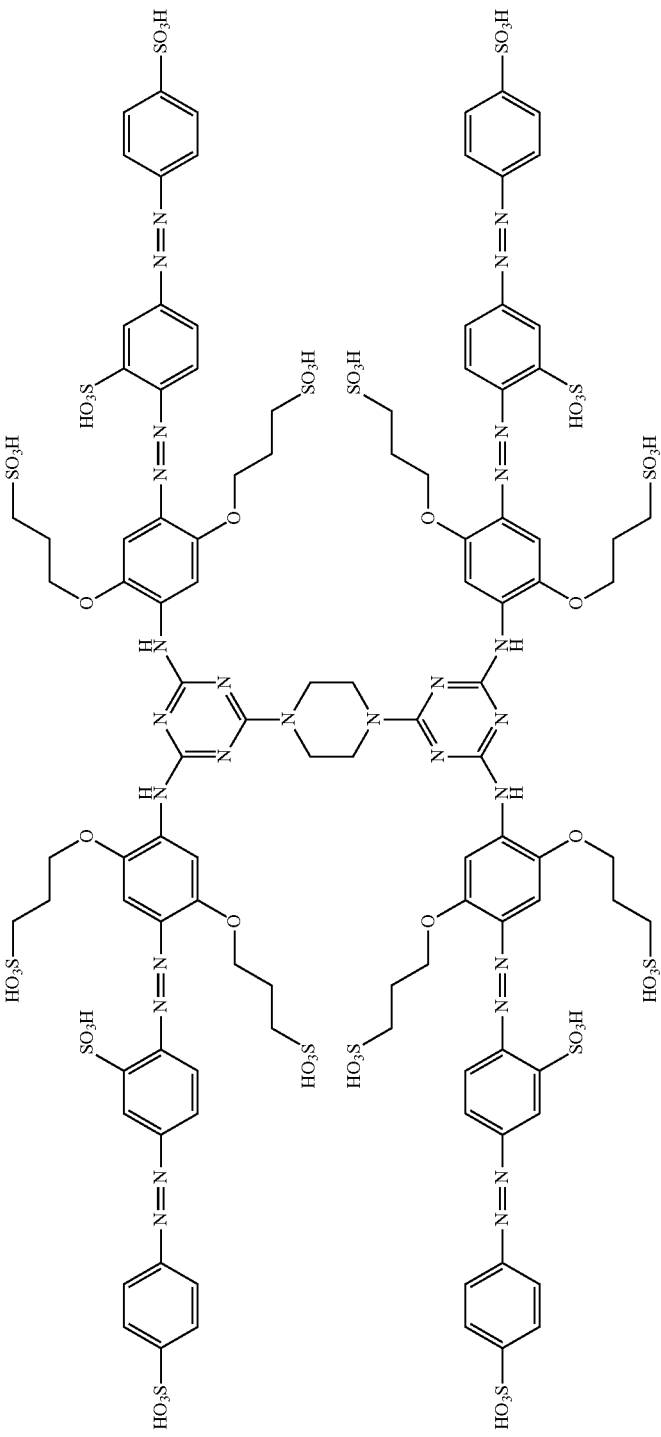 |

The diazotization of the compound represented by the formula (4) is carried out by a method that is known per se. For example, the diazotization is carried out in an inorganic acid medium at a temperature of, for example, −5° C. to 30° C., and preferably 0° C. to 20° C., using a nitrous acid salt, for example, a nitrous acid alkali metal salt such as sodium nitrite.

The coupling reaction between a diazotization product of a compound represented by the formula (4) and a compound represented by the formula (5) is also carried out under reaction conditions that are known per se. For example, it is advantageous to carry out the reaction in water or an aqueous organic medium at a temperature of 0° C. to 30° C., and preferably 5° C. to 25° C., and at a pH of an acidic to weakly acidic value, for example, at pH 1 to 6. The diazotization reaction liquid is acidic, and with the progress of the coupling reaction, the reaction system is even further acidified. Therefore, it is preferable to adjust the reaction liquid to the pH value described above by adding a base. Examples of the base that can be used include alkali metal hydroxides such as lithium hydroxide and sodium hydroxide; alkali metal carbonates such as lithium carbonate, sodium carbonate, and potassium carbonate; acetates such as sodium acetate; ammonia and organic amines. The compound of formula (4) and the compound of formula (5) are used in nearly stoichiometric amounts.

The diazotization of the compound represented by the formula (6) is carried out by a method that is known per se. For example, the diazotization is carried out in an inorganic acid medium at a temperature of, for example, −5° C. to 30° C., and preferably 0° C. to 25° C., using a nitrous acid salt, for example, a nitric acid alkali metal salt such as sodium nitrite.

The coupling reaction between a diazotization product of a compound represented by the formula (6) and a compound represented by the formula (8), formula (10), formula (12) or formula (14) is also carried out under reaction conditions that are known per se. For example, it is advantageous to carry out the reaction in water or an aqueous organic medium at a temperature of 0° C. to 30° C., and preferably 5° C. to 25° C., and at a pH of an acidic to weakly acidic value, for example, at pH 1 to 6. The diazotization reaction liquid is acidic, and with the progress of the coupling reaction, the reaction system is even further acidified. Therefore, it is preferable to adjust the reaction liquid to the pH value described above by adding a base. As the base, the same compounds as those described above can be used. The compound of formula (6) and the compound of formula (8), formula (10), formula (12) or formula (14) are used in nearly stoichiometric amounts.

The condensation reaction between a compound represented by the formula (9) or the formula (13) and a cyanuric halide, for example, cyanuric chloride is carried out by a method that is known per se. For example, it is advantageous to carry out the reaction in water or an aqueous organic medium at a temperature of 0° C. to 30° C., and preferably 5° C. to 25° C., and at a pH of a weakly acidic to neutral value, for example, at pH 3 to 8. With the progress of the reaction, the reaction system is acidified, and therefore, it is preferable to adjust the system to the pH value described above by adding a base. As the base, the same compounds as those described above can be used. The compound of formula (9) or formula (13) and the cyanuric halide are used in nearly stoichiometric amounts.

The condensation reaction between a compound represented by the formula (11) and a compound represented by the formula (16), or the condensation reaction between a compound represented by the formula (15) and a compound represented by the formula (18) is carried out by a method that is known per se. For example, it is advantageous to carry out the reaction in water or an aqueous organic medium at a temperature of 10° C. to 80° C., and preferably 25° C. to 70° C., and at a pH of a weakly acidic to weakly alkaline value, for example, at pH 5 to 9. The adjustment of the pH value is carried out by adding a base. As the base, the same compounds as those described above can be used. The compound represented by formula (11) and the compound represented by formula (16), or the compound represented by formula (15) and the compound represented by formula (18) are used in nearly stoichiometric amounts.

The condensation reaction between a compound represented by the formula (17), a compound represented by the formula (19) and a compound represented by the formula (20) is carried out by a method that is known per se. For example, it is advantageous to carry out the reaction in water or an aqueous organic medium at a temperature of 50° C. to 100° C., and preferably 60° C. to 95° C., and at a pH of a neutral to weakly alkaline value, for example, at pH 7 to 10. The adjustment of the pH value is carried out by adding a base. As the base, the same compounds as those described above can be used. The compound represented by formula (20) is used in an amount of 0.4 to 0.6 equivalents, and preferably 0.5 equivalents, relative to 1 equivalent of the compound represented by formula (17) and the compound represented by formula (19).

The salt of the azo compound of the present invention represented by the formula (1) is an inorganic salt or a salt with an organic cation. Among them, specific examples of the inorganic salt include alkali metal salts such as salts with lithium, sodium and potassium; alkaline earth metal salts; and ammonium salts. Preferred examples of the inorganic salt include lithium, sodium, potassium and ammonium salts.

Furthermore, examples of the salt of an organic cation include, but are not limited to, salts with quaternary ammonium ions represented by the following formula (21). Furthermore, free acids of the azo compound of the present invention, and various salts thereof may also be in the form of mixture. For example, any combinations such as a mixture of a sodium salt and an ammonium salt, a mixture of a free acid and a sodium salt, and a mixture of a lithium salt, a sodium salt and an ammonium salt may be used. In some cases, the properties such as solubility may vary depending on the type of the salt. Thus, it is preferable to obtain a mixture having properties that suit the purpose by appropriately selecting the type of the salt as necessary; by changing the ratios of salts if the system contains plural salts and the like; or the like.

(21)

In the formula (21), $Z^1$, $Z^2$, $Z^3$ and $Z^4$ each independently represent a group selected from the group consisting of a hydrogen atom, an alkyl group (preferably a C1-C4 alkyl group), a hydroxyalkyl group (preferably, a hydroxy-C1-C4 alkyl group), and a hydroxyalkoxyalkyl group (preferably, a hydroxy-C1-C4 alkoxy-C1-C4 alkyl group), and at least one of them represents a group other than a hydrogen atom.

Specific examples of the alkyl group for $Z^1$ to $Z^4$ in the formula (21) include methyl, ethyl, n-propyl, isopropyl, n-butyl, isobutyl, sec-butyl, and t-butyl. Specific examples of the hydroxyalkyl group include hydroxy-C1-C4 alkyl groups such as hydroxymethyl, hydroxyethyl, 3-hydroxypropyl, 2-hydroxypropyl, 4-hydroxybutyl, 3-hydroxybutyl, and 2-hydroxybutyl. Specific examples of the hydroxyalkoxyalkyl group include hydroxy-C1-C4 alkoxy-C1-C4 alkyl groups (preferably, hydroxyethoxy-C1-C4 alkyl groups) such as hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl, and 2-hydroxyethoxybutyl. Among the groups described above, specific preferred examples include a hydrogen atom; methyl, hydroxymethyl, hydroxyethyl, 3-hydroxypropyl, 2-hydroxypropyl, 4-hydroxybutyl, 3-hydroxybutyl, 2-hydroxybutyl, hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl, and 2-hydroxyethoxybutyl.

Specific examples of the combinations of $Z^1$, $Z^2$, $Z^3$ and $Z^4$ for preferred compounds of the formula (21) are presented in the following Table 23.

TABLE 23

| Compound No. | $Z^1$ | $Z^2$ | $Z^3$ | $Z^4$ |
|---|---|---|---|---|
| 1-1 | H | $CH_3$ | $CH_3$ | $CH_3$ |
| 1-2 | $CH_3$ | $CH_3$ | $CH_3$ | $CH_3$ |
| 1-3 | H | $-C_2H_4OH$ | $-C_2H_4OH$ | $-C_2H_4OH$ |
| 1-4 | $CH_3$ | $-C_2H_4OH$ | $-C_2H_4OH$ | $-C_2H_4OH$ |
| 1-5 | H | $-CH_2CH(OH)CH_3$ | $-CH_2CH(OH)CH_3$ | $-CH_2CH(OH)CH_3$ |
| 1-6 | $CH_3$ | $-CH_2CH(OH)CH_3$ | $-CH_2CH(OH)CH_3$ | $-CH_2CH(OH)CH_3$ |
| 1-7 | H | $-C_2H_4OH$ | H | $-C_2H_4OH$ |
| 1-8 | $CH_3$ | $-C_2H_4OH$ | H | $-C_2H_4OH$ |
| 1-9 | H | $-CH_2CH(OH)CH_3$ | H | $-CH_2CH(OH)CH_3$ |
| 1-10 | $CH_3$ | $-CH_2CH(OH)CH_3$ | H | $-CH_2CH(OH)CH_3$ |
| 1-11 | $CH_3$ | $-C_2H_4OH$ | $CH_3$ | $-C_2H_4OH$ |
| 1-12 | $CH_3$ | $-CH_2CH(OH)CH_3$ | $CH_3$ | $-CH_2CH(OH)CH_3$ |

Examples of the method of synthesizing a desired salt of the azo compound of the present invention represented by the formula (1) include a method of adding, after completion of the final step in the synthesis reaction for the compound represented by the formula (1), a desired inorganic salt or a desired organic quaternary ammonium salt to the reaction liquid, and salting out; and a method of adding a mineral acid such as hydrochloric acid to the reaction liquid to isolate the azo compound in the form of free acid from the reaction liquid, subsequently washing the free acid thus obtained with water, acidic water, an aqueous organic medium or the like as necessary, to remove any adhering impurities such as inorganic salts, adding again a desired inorganic base or an organic base corresponding to the above quaternary ammonium salt, to the free acid in an aqueous medium (preferably, in water), and thereby forming a salt. Through such methods, a desired salt of the azo compound can be obtained in the form of a solution or a precipitated solid. Here, the term acidic water means, for example, a solution prepared by dissolving a mineral acid such as sulfuric acid or hydrochloric acid, or an organic acid such as acetic acid in water, and acidifying the water. Furthermore, the term aqueous organic medium means a mixture of water and any organic substance and/or organic solvent, etc. that is miscible with water, or the like.

Examples of this organic substance or organic solvent that is miscible with water include the water-soluble organic solvents that will be described below.

Examples of the inorganic salt used when converting the azo compound of the present invention represented by the formula (1) into a desired salt include halide salts of alkali metals such as lithium chloride, sodium chloride and potassium chloride; carbonates of alkali metals such as lithium carbonate, sodium carbonate, and potassium carbonate; hydroxides of alkali metals such as lithium hydroxide, sodium hydroxide, and potassium hydroxide; halide salts of ammonium ions such as ammonium chloride and ammonium bromide; and hydroxides of ammonium ions such as ammonium hydroxide (aqueous ammonia).

Furthermore, examples of the salts of organic cations include halide salts of quaternary ammonium ions represented by the formula (21), such as diethanolamine hydrochloride, and triethanolamine hydrochloride.

The ink composition of the present invention is characterized by containing at least one kind of the azo compound of the present invention as a coloring matter. The azo compounds of the present invention include a compound exhibiting a wide spectrum of hue such as a color ranging from yellow to orange to brown to red. Therefore, two or more kinds of the compound of the present invention may be blended to mix colors to obtain a desired hue, and for example, an orange ink, a red ink or the like can also be prepared by using a single compound.

The ink composition of the present invention is suitable for the dyeing of natural and synthetic fabric materials and blended fabric products, and the preparation of writing inks and particularly ink compositions for ink jet recording.

A reaction liquid containing the azo compound of the present invention, for example, the reaction liquid of the final step in the synthesis reaction for the compound, and the like can be directly used in the preparation of the ink composition of the present invention. Furthermore, the compound can be isolated from the reaction liquid by methods such as, for example, crystallization and spray drying, and then dried as necessary, and thus an ink composition can be prepared by using the compound thus obtained. The ink composition of the present invention contains the azo compound of the present invention as a coloring matter, usually in an amount of 0.1% to 20% by mass, preferably 1% to 10% by mass, and more preferably 2% to 8% by mass, relative to the total mass of the ink composition.

The ink composition of the present invention is a composition obtained by dissolving the compound represented by the formula (1) in water or an aqueous medium (a liquid mixture of water, a water-soluble organic substance or a water-soluble organic solvent) or the like, and adding ink preparation agents as necessary. When this ink composition is used as an ink for ink jet printers, it is preferable to use ink compositions having smaller contents of inorganic impurities such as chlorides of metal cations contained as impurities, for example, sodium chloride; and sulfuric acid salts, for example, sodium sulfate. In this case, the total content of, for example, sodium chloride and sodium sulfate is about 1% by mass or less in the total mass of the azo compound of the present invention. The lower limit may be equal to or lower than the detection limit of the detecting instrument, that is, 0%. As a method of producing the compound with less inorganic impurities, for example, a desalting treatment may be carried out by a method of using a reverse osmosis membrane that is known per se; or a method of adding a dried product or a wet cake of the compound of the present invention or a salt thereof, to a water-soluble organic solvent, for example, a C1-C4 alkanol such as methanol, ethanol or isopropanol (may contain water as necessary) or the like to suspend and purify the compound, isolating a resulting solid by filtration, and drying the product.

The ink composition of the present invention is prepared by using water as a medium, so that the ink composition may contain a water-soluble organic solvent if necessary, to the extent that the effect of the present invention is not impaired. The water-soluble organic solvent is used for the purpose of obtaining effects such as the dissolution of dyes, prevention of drying (maintenance of a wetted state), adjustment of viscosity, acceleration of penetration, adjustment of the surface tension, and defoaming in the ink composition of the present invention, and thus it is preferable that the water-soluble organic solvent be included in the ink composition of the present invention.

Examples of the ink preparation agents include known additives such as a preservative and fungicide, a pH adjusting agent, a chelating reagent, a rust-preventive agent, an ultraviolet ray absorbing agent, a viscosity adjusting agent, a dye solubilizer, a discoloration-preventive agent, a surface tension adjusting agent, and a defoamant.

The content of the water-soluble organic solvent is 0% to 60% by mass, and preferably 10% to 50% by mass, relative to the total mass of the ink composition of the present invention, and it is desirable to use the ink formulating agents similarly in an amount of 0% to 20% by mass, and preferably 0% to 15% by mass. The balance other than the components described above is water.

Examples of the water-soluble organic solvent that can be used in the present invention include C1-C4 alkanols such as methanol, ethanol, n-propanol, isopropanol, n-butanol isobutanol, secondary butanol and tertiary butanol; amides such as N,N-dimethylformamide and N,N-dimethylacetamide; heterocyclic ketones such as 2-pyrrolidone, N-methyl-2-pyrrolidone, 1,3-dimethylimidazolidin-2-one and 1,3-dimethylhexahydropyrimid-2-one; ketones or keto alcohols such as acetone, methyl ethyl ketone, and 2-methyl-2-hydroxypentan-4-one; cyclic ethers such as tetrahydrofuran and dioxane; mono-, oligo- or polyalkylene glycols or thioglycols having a C2-C6 alkylene unit, such as ethylene glycol, 1,2- or 1,3-propylene glycol, 1,2- or 1,4-butylene glycol, 1,6-hexylene glycol, diethylene glycol, triethylene glycol, tetraethylene glycol, dipropylene glycol, polyethylene glycol, polypropylene glycol, and thiodiglycol; polyols (preferably, triols) such as glycerin and hexane-1,2,6-triol; C1-C4 monoalkyl ethers of polyhydric alcohols, such as ethylene glycol monomethyl ether, ethylene glycol monoethyl ether, diethylene glycol monomethyl ether, diethylene glycol monoethyl ether, diethylene glycol monobutyl ether (butyl carbitol), triethylene glycol monomethyl ether, and triethylene glycol monoethyl ether; γ-butyrolactone; and dimethyl sulfoxide.

As the water-soluble organic solvent, preferable examples include isopropanol, glycerin, mono-, di-, or tri-ethylene glycol, dipropylene glycol, 2-pyrrolidone, N-methyl-2-pyrrolidone, and butylcarbitol, whereas more preferable examples include isopropanol, glycerin, diethylene glycol, 2-pyrrolidone, N-methyl-2-pyrrolidone, and butylcarbitol. These water-soluble organic solvents are used either alone or as a mixture.

The preservative and fungicide may include, for example, a compound of organic sulfur based, organic nitrogen sulfur based, organic halogen based, haloallyl sulfone based, iodopropargyl based, N-haloalkylthio based, benzothiazole based, nitrile based, pyridine based, 8-oxyquinoline based, isothiazoline based, dithiol based, pyridineoxide based, nitropropane based, organic tin based, phenol based, quaternary ammonium salt based, triazine based, thiadiazine based, anilide based, adamantane based, dithiocarbamate based, brominated indanone based, benzylbromoacetate based or the like.

The organic halogen based compound may include, for example, sodium pentachlorophenol. The pyridineoxide based compound may include, for example, sodium 2-pyridinethiol-1-oxide. The isothiazoline based compound may include, for example, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesiumchloride, 5-chloro-2-methyl-4-isothiazolin-3-one calciumchloride, 2-methyl-4-isothiazolin-3-one calciumchloride, and the like.

The other preservative and fungicide may include, for example, sodium sorbate, sodium benzoate, sodium acetate, and the like. The other specific examples of preservative and fungicide may preferably include trade names Proxel® GXL (S) and Proxel® XL-2 (S) manufactured by Arch Chemical, Inc., and the like.

As used herein, the superscript notation of "®" means a registered trademark.

The pH adjusting agent may be used for the purpose of improving storage stability of the ink, and an arbitrary substance can be used as long as the pH of the ink can be controlled to fall within the range of 6.0 to 11.0. Examples of the pH adjusting agent include: alkanolamines such as diethanolamine and triethanolamine; hydroxides of an alkali metal such as lithium hydroxide, sodium hydroxide and potassium hydroxide; ammonium hydroxide; carbonates of an alkali metal such as lithium carbonate, sodium carbonate and potassium carbonate; aminosulfonic acids such as taurine; and the like.

The chelating agent may include, for example, disodium ethylenediamine tetraacetate, sodium nitrilo triacetate, sodium hydroxyethylethylenediamine triacetate, sodium diethylenetriamine pentaacetate, sodium uracil diacetate, and the like.

The rust-preventive agent may include, for example, acidic sulfite, sodium thiosulfate, ammonium thioglycolate, diisopropylammonium nitrite, pentaerythritol tetranitrate, dicyclohexylammonium nitrite, and the like.

Examples of the ultraviolet ray absorbing agent include benzophenone based compounds, benzotriazole based compounds, cinnamic acid based compounds, triazine based compounds, stilbene based compounds, and the like. Alternatively, a fluorescent whitening agent generally referred to, which is a compound that absorbs an ultraviolet ray to emit fluorescence, and which is typified by a benzoxazole based compound, may be also used.

The viscosity adjusting agent may include, for example, a water-soluble polymer compound, and specific examples include polyvinyl alcohols, cellulose derivatives, polyamine, polyimine, and the like.

The dye solubilizer may include, for example, urea, ε-caprolactam, ethylene carbonate, and the like. Of these, it is preferred to use urea.

The discoloration-preventive agent is used for the purpose of improving storability of the image. As the discoloration-preventive agent, a variety of organic and metal complex based discoloration-preventive agents may be used. Examples of the organic discoloration-preventive agent include hydroquinones, alkoxyphenols, dialkoxyphenols, phenols, anilines, amines, indanes, chromanes, alkoxyanilines, heterocycles and the like, whereas examples of the metal complex include nickel complexes, zinc complexes and the like.

As the surface tension adjusting agent, surfactants may be exemplified, and examples include anionic surfactants, amphoteric surfactants, cationic surfactants, nonionic surfactants, and the like.

Examples of the anionic surfactant include alkylsulfocarboxylic acid salts, α-olefinsulfonic acid salts, polyoxyethylenealkyl ether acetic acid salts, N-acylamino acid and salts thereof, N-acylmethyltaurine salts, alkylsulfate polyoxyalkyl ether sulfuric acid salts, alkylsulfate polyoxyethylenealkyl ether phosphoric acid salts, rosin acid soap, castor oil sulfate ester salts, lauryl alcohol sulfate ester salts, alkylphenolic phosphate esters, alkylated phosphate esters, alkylarylsulfonic acid salts, diethyl sulfosuccinic acid salts, diethylhexyl sulfosuccinic acid salts, dioctyl sulfosuccinic acid salts, and the like.

Examples of the cationic surfactant include 2-vinylpyridine derivatives, poly(4-vinylpyridine) derivatives, and the like.

Examples of the amphoteric surfactant include lauryldimethylamino acetate betaine, 2-alkyl-N-carboxymethyl-N-hydroxyethylimidazolinium betaine, coconut oil fatty acid amide propyldimethylamino acetate betaine, polyoctylpolyaminoethylglycine, imidazoline derivatives, and the like.

Examples of the nonionic surfactant include: ether based surfactants such as polyoxyethylene nonylphenyl ether, polyoxyethylene octylphenyl ether, polyoxyethylene dodecyl phenyl ether, polyoxyethylene oleyl ether, polyoxyethylene lauryl ether and polyoxyethylene alkyl ether; ester based surfactants such as polyoxyethylene oleate esters, polyoxyethylene distearate esters, sorbitan laurate, sorbitan monostearate, sorbitan monooleate, sorbitan sesquioleate, polyoxyethylene monooleate and polyoxyethylene stearate; acetylene glycol (alcohol) based surfactants such as 2,4,7,9-tetramethyl-5-decyne-4,7-diol, 3,6-dimethyl-4-octyne-3,6-diol and 3,5-dimethyl-1-hexyn-3-ol; and the like.

Examples of commercially available products include (trade name) Surfynol® 104, 82 and 465; and Olfine® STG, all manufactured by Nissin Chemical Industry Co., Ltd.

As the defoamant, compounds of highly oxidized oil series, glycerin fatty acid ester series, fluorine series, and silicone series are used as necessary.

These ink preparation agents are used singly or as mixtures. Meanwhile, the surface tension of the ink composition of the present invention is usually 25 mN/m to 70 mN/m, and preferably 25 mN/m to 60 mN/m. Furthermore, it is more preferable to adjust the viscosity of the ink composition of the present invention to 30 mPa·s or lower, and more preferably to 20 mPa·s or lower.

For the preparation of the ink composition of the present invention, there are no particular limitations on the order of dissolving various agents such as ink preparation agents. The water used at the time of preparing the composition is preferably water with fewer impurities, such as ion-exchanged water or distilled water. Furthermore, if necessary, any contaminants may be removed by performing precision filtration using a membrane filter. Particularly, in the case of using the ink composition of the present invention as an ink for ink jet printers, it is preferable to perform precision filtration. The pore size of the filter that is used to perform precision filtration is usually 1 pm to 0.1 µm, and preferably 0.5 µm to 0.1 µm.

The ink composition containing the azo compound of the present invention is suitable for use in printing, copying, marking, writing, drawing, stamping or recording (printing), particularly ink jet recording. Furthermore, the ink composition of the present invention is such that solid precipitation does not easily occur even against drying in the vicinity of the nozzles of ink jet printers, and for this reason, blockage of the head also does not easily occur. Furthermore, in the case of using the ink composition of the present invention in ink jet recording, recorded materials of a color ranging from yellow to orange to brown to red, which have satisfactory resistance to water, humidity, light, ozone, nitrogen oxide gas, and friction, and has high quality and high print density, are obtained.

The ink composition of the present invention is obtained by mixing and stirring the various components such as the ink preparation agents described above in any order. Furthermore, other coloring matters having various hues may also be incorporated, in addition to the azo compound of the present invention, for the purpose of finely adjusting the hue of the ink composition of the present invention, to the extent that the effect of the present invention is not impaired. In that case, various known coloring matters of yellow (for example, C.I. Direct Yellow 34, C.I. Direct Yellow 58, C.I. Direct Yellow 86, and C.I. Direct Yellow 132), orange (for example, C.I. Direct Orange 26, C.I. Direct Orange 29, and C.I. Direct Orange 49), brown, scarlet, red (for example, C.I. Direct Red 62, C.I. Direct Red 75, C.I. Direct Red 79, C.I. Direct Red 80, and C.I. Direct Red 84), magenta, violet, blue, navy, cyan, green and other colors can be incorporated and used.

As one application of the azo compound of the present invention, there is provided use thereof as a coloring matter for color adjusting. The azo compound of the present invention exhibits a hue ranging from yellow to orange to brown to red. Therefore, inks of various hues can also be prepared by using the azo compound of the present invention as a coloring matter for color adjusting, and blending the azo compound with coloring matters of other hues. For instance, a black coloring matter and the azo compound of the present invention may be blended for the purpose of finely adjusting the hue of a black ink, or reproducing a color ranging from black to grey, which is an achromatic color of high quality.

When the azo compound of the present invention is used in the color adjusting of a black ink, any black coloring matter may be used as the black coloring matter to be blended with, and examples include, but are not limited to, those known compounds described in the following Table 24.

TABLE 24
| Compound No. | Example of black coloring matter |
|---|---|
| b-1 | 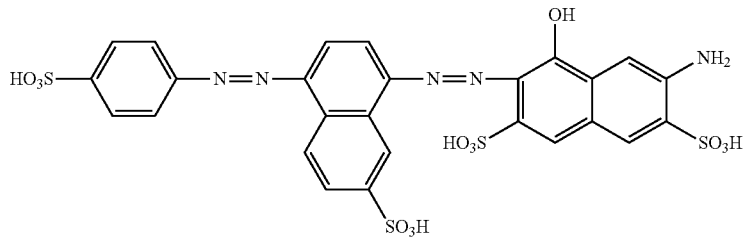 [SMILES: Nc1cc2c(O)c(N=Nc3ccc(N=Nc4ccc(S(=O)(=O)O)cc4)c4ccc(S(=O)(=O)O)cc34)c(S(=O)(=O)O)cc2cc1S(=O)(=O)O] |
| b-2 | 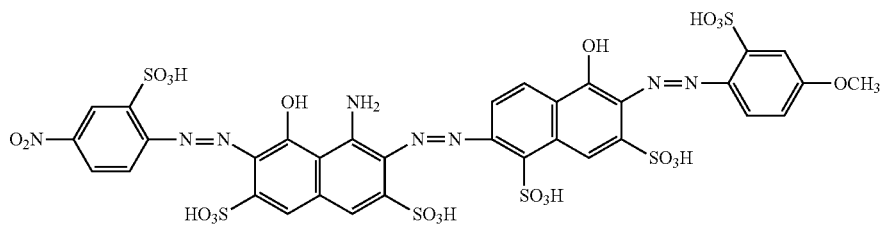 [SMILES: COc1ccc(N=Nc2c(S(=O)(=O)O)cc3c(S(=O)(=O)O)c(N=Nc4c(S(=O)(=O)O)cc5cc(S(=O)(=O)O)c(N=Nc6ccc([N+](=O)[O-])cc6S(=O)(=O)O)c(O)c5c4N)ccc3c2O)c(S(=O)(=O)O)c1] |
| b-3 | 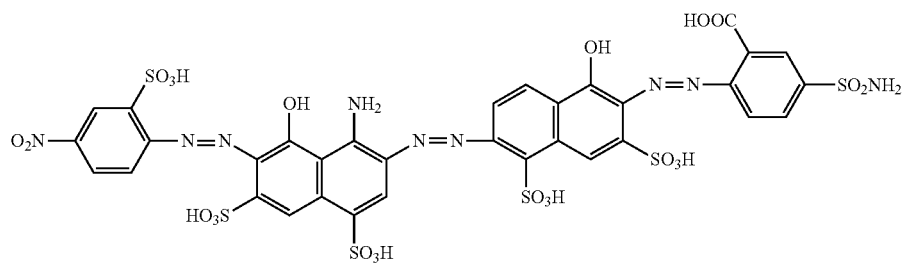 [SMILES: Nc1c(N=Nc2ccc3c(O)c(N=Nc4ccc(S(N)(=O)=O)cc4C(=O)O)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |
| b-4 | 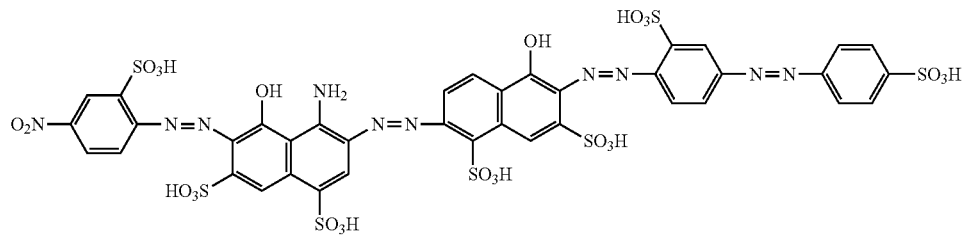 [SMILES: Nc1c(N=Nc2ccc3c(O)c(N=Nc4ccc(N=Nc5ccc(S(=O)(=O)O)cc5)cc4S(=O)(=O)O)c(S(=O)(=O)O)cc3c2S(=O)(=O)O)cc(S(=O)(=O)O)c2cc(S(=O)(=O)O)c(N=Nc3ccc([N+](=O)[O-])cc3S(=O)(=O)O)c(O)c12] |
| b-5 | 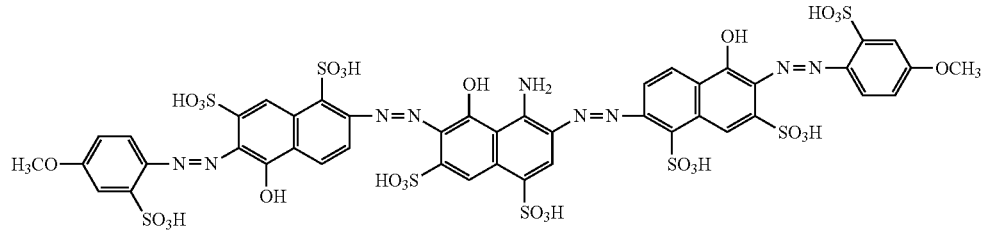 [SMILES: COc1ccc(N=Nc2c(S(=O)(=O)O)cc3c(S(=O)(=O)O)c(N=Nc4cc(S(=O)(=O)O)c5cc(S(=O)(=O)O)c(N=Nc6ccc7c(O)c(N=Nc8ccc(OC)cc8S(=O)(=O)O)c(S(=O)(=O)O)cc7c6S(=O)(=O)O)c(O)c5c4N)ccc3c2O)c(S(=O)(=O)O)c1] |
| b-6 | 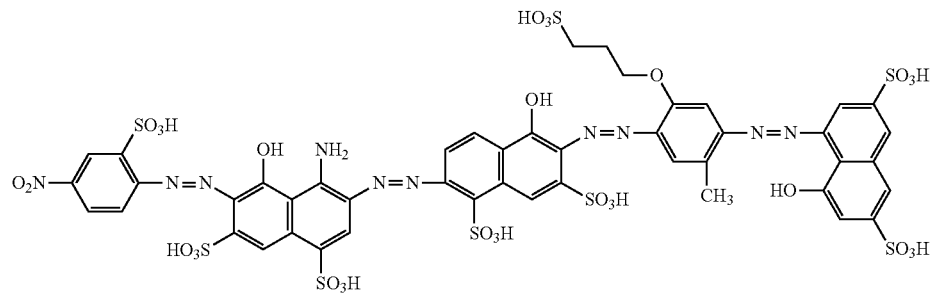 [SMILES: Cc1cc(N=Nc2c(S(=O)(=O)O)cc3c(S(=O)(=O)O)c(N=Nc4cc(S(=O)(=O)O)c5cc(S(=O)(=O)O)c(N=Nc6ccc([N+](=O)[O-])cc6S(=O)(=O)O)c(O)c5c4N)ccc3c2O)c(OCCCS(=O)(=O)O)cc1N=Nc1cc(S(=O)(=O)O)cc2cc(S(=O)(=O)O)cc(O)c12] |

In addition to the known black coloring matters mentioned above, for example, the coloring matters described in the respective Examples of WO 03/106572; the coloring matters described in the respective Examples of WO 2005/052065; the coloring matters described in Table 1 to Table 6 of Japanese Unexamined Patent Application, Publication No. 2005-220338; and the coloring matters described in the Compound Examples 1 to 38 of Japanese Unexamined Patent Application, Publication No. 2007-314602 can be blended with the azo compound of the present invention to prepare black inks.

For the purpose of supplying high precision images in ink jet printers, in regard to the black ink, there are cases in which two or more kinds of black inks including an ink of high concentration (dark black ink) and an ink of low concentration (light black ink) are loaded into one printer. In that case, for an ink composition containing only the azo compound of the present invention as a coloring matter; or a black ink composition containing a blend of the compound and other black coloring matters, an ink composition of high concentration and an ink composition of low concentration may be respectively prepared, and they may be used together as an ink set.

Furthermore, it is also acceptable to use or incorporate the relevant compound only in any one of the ink compositions. Ink compositions using known coloring matters of colors ranging from yellow to orange to brown to red in combination, in addition to the water-soluble azo compound of the present invention, may also be used. Examples of known coloring matters include, but are not limited to, the coloring matters designated with the C.I. numbers described above, etc.

The ink jet recording method of the present invention is a method of performing recording by loading a container filled with the ink composition of the present invention at a predetermined position of an ink jet printer, using this as an ink, discharging ink droplets of the ink according to the recording signals, and thereby attaching the ink droplets onto a record-receiving material. The ink jet recording method of the present invention can use, together with the ink composition of the present invention, a magenta ink, a cyan ink, and optionally, a green ink, a blue (or violet) ink, a red ink, a black ink, and the like in combination. In this case, the inks of various colors are filled into their respective containers, and those containers are loaded onto predetermined positions of an ink jet printer for use.

Examples of ink jet printers include printers utilizing a piezo system which utilizes mechanical vibration; and a Bubblejet (registered trademark) system which utilizes bubbles generated by heating. The ink jet recording method of the present invention can use any of those systems.

In regard to the record-receiving material used in the ink jet recording method of the present invention, there are no particular limitations on the material as long as it is a material that may be colored by the ink composition of the present invention. Specific examples include, for example, communication sheets such as paper and films; fabrics or clothes (cellulose, nylon, wool and the like), leather, and materials for color filters. Among these, communication sheets are preferred.

Preferred examples of the communication sheets include surface-treated sheets, more specifically, sheets provided with an ink-receiving layer on a base material such as a paper, a synthetic paper or a film. The ink-receiving layer is provided by, for example, a method of impregnating or coating the base material with a cationic polymer; or a method of coating a porous white inorganic substance (usually, fine particles thereof) capable of absorbing the coloring matter in the ink, such as porous silica, an alumina sol or a special ceramic substance, together with a hydrophilic polymer such as polyvinyl alcohol or polyvinylpyrrolidone.

Those sheets provided with such an ink-receiving layer are generally referred to as exclusive ink jet paper, exclusive ink jet film, glossy papers, glossy films, and the like.

Among these, those which are considered to be susceptible to the influence of gases having an oxidizing action in air, that is, ozone gas, nitrogen oxide gas and the like, are exclusive ink jet papers that are produced by coating a porous white inorganic substance on the base material surface.

Representative examples of commercially available products of the exclusive ink jet papers include (trade name:) Glossy Pro [platinum grade], Professional Photo Paper and Photo Paper Gloss Gold, manufactured by Canon, Inc.; (trade name:) Photo Paper Crispia® (high glossy), Photo Paper (glossy), and Photo Matte Paper, manufactured by Seiko Epson Corp.; (trade name:) Advanced Photo Paper (glossy) manufactured by Hewlett-Packard Japan, Ltd.; and (trade name:) Kassai Photo Finish Pro manufactured by Fujifilm Corporation.

Since the ink composition of the present invention has excellent resistance to the gases having an oxidizing action as described above, the ink composition produces excellent recorded images with less discoloration even in the occasion of recording onto such record-receiving materials. Also, the ink composition of the present invention can also be positively used in plain paper.

The colored body of the present invention means a material colored by means of any one of:
a) the azo compound of the present invention or a salt thereof,
b) the ink composition of the present invention, and
c) the ink jet recording method of the present invention.

There are no particular limitations on the material of the colored body, and for example, the record-receiving materials described above may be used.

Examples of the method of coloring include a dip dyeing method, a textile printing method, printing methods such as screen printing, and an ink jet recording method using an ink jet printer. As described in the above item c), an ink jet recording method is preferred.

The ink composition of the present invention has a color ranging from yellow to orange to brown to red, and is suitably used as an ink for various recording applications, for example, for writing tools or ink jet recording, and particularly as an ink for ink jet recording. Although the ink composition can also be used for plain paper, the ink composition has high print density particularly for images recorded on exclusive ink jet paper or glossy paper, does not cause the bronzing phenomenon (a phenomenon by which a coloring matter glares while exhibiting a metallic gloss; this phenomenon markedly deteriorates the quality of recorded images), and has a hue appropriate for the ink jet recording method. Furthermore, the ink composition of the present invention is characterized in that the recorded images produced with the ink composition are excellent in various fastness properties such as water resistance, light fastness and moisture resistance, and particularly excellent in ozone fastness, and are excellent in the fading balance under light exposure.

The ink composition of the present invention does not undergo precipitation or separation during storage, and has very high storage stability. Furthermore, since the azo compound of the present invention has excellent water solubility, when the ink composition of the present invention containing this compound is used in ink jet recording, solid precipitation due to drying of the ink composition in the vicinity of nozzles does not easily occur, and blockage of the injector (ink head)

does not occur. The ink composition of the present invention does not undergo any change in the physical properties in either of the following cases: using a continuous type ink jet printer, using the ink after recirculating at a relatively long time interval; or using the ink intermittently by means of an on-demand type ink jet printer.

EXAMPLES

Hereinafter, the present invention will be described more specifically by way of Examples, but the present invention is not intended to be limited by the following Examples.

The units "parts" and "percent (%)" in the descriptions are on a mass basis, unless particularly stated otherwise.

Unless particularly stated otherwise, the operations of the various synthesis reactions, crystallization and the like were all carried out under stirring.

Also for the various chemical formulas in the Examples, the acidic functional groups such as a sulfo group and a carboxy group are expressed in the form of free acid.

All of the pH values and the reaction temperatures for the synthesis reactions described are measured values obtained in the reaction system.

The maximum absorption wavelengths (λmax) of the synthesized compounds were measured in an aqueous solution at pH 7 to 8, and the measured values of the compounds are indicated in the Examples.

Example 1

(Step 1)
35.7 parts of a monoazo compound represented by the following formula (22) (C.I. Acid Yellow 9) was added to 200 parts of water, and the monoazo compound was dissolved therein while the system was adjusted to pH 6 with sodium hydroxide. Subsequently, 7.2 parts of sodium nitrite was added thereto. This solution was added dropwise over 30 minutes to 300 parts of 5% hydrochloric acid maintained at 0° C. to 10° C., and then the mixture was stirred for one hour at or below 20° C. to perform a diazotization reaction. Thus, a diazo reaction liquid was prepared.

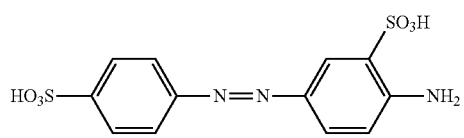
(22)

Meanwhile, 10.7 parts of 3-methylaniline, 10.4 parts of sodium hydrogen bisulfite, and 8.6 parts of a 35% aqueous formalin solution were added to 260 parts of water, and a methyl-ω-sulfonate derivative was obtained by a routine method.

The aqueous solution of the methyl-ω-sulfonate derivative thus obtained was added to the diazo reaction liquid previously prepared, and the mixture was allowed to react for 5 hours at 0° C. to 15° C., while the system was adjusted to pH 4 to 5 by adding sodium hydrogen carbonate.
100 parts of 35% hydrochloric acid was added to the reaction liquid, and then the mixture was allowed to react further for 5 hours at 70° C. to 80° C. Sodium chloride was added to the reaction liquid for salting-out, and a solid precipitated therefrom was isolated by filtration. Thus, 120 parts of a compound represented by the following formula (23) was obtained as a wet cake.

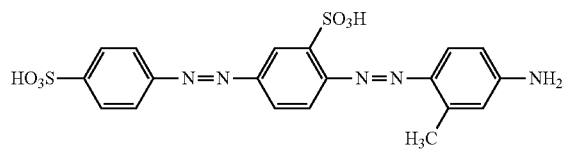
(23)

(Step 2)
35.7 parts of the monoazo compound represented by the above formula (22) (C.I. Acid Yellow 9) was added to 200 parts of water, and was dissolved therein while the system was adjusted to pH 6 with sodium hydroxide. Subsequently, 7.2 parts of sodium nitrite was added thereto. This solution was added dropwise over 30 minutes to an aqueous solution prepared by diluting 31.3 parts of 35% hydrochloric acid with 200 parts of water, while maintaining the system at 0° C. to 10° C., and then the mixture was stirred for one hour at or below 20° C. to perform a diazotization reaction. 0.4 parts of sulfamic acid was added to the reaction liquid thus obtained, and the resulting mixture was stirred for 5 minutes. Thus, a diazo reaction liquid was prepared.

Meanwhile, 24.0 parts of a compound represented by the following formula (24) obtained by the method described in Japanese Unexamined Patent Application, Publication No. 2004-083492, and a 25% aqueous solution of sodium hydroxide were added to 300 parts of warm water at 40° C. to 50° C., and the mixture was adjusted to pH 5 to 6. Thus, an aqueous solution was obtained. To this aqueous solution, the diazo reaction liquid obtained as described above was added dropwise over 30 minutes at 15° C. to 25° C. During the dropwise addition, the system was maintained at pH 5 to 6 by adding an aqueous solution of sodium carbonate. After the dropwise addition, the mixture was stirred for 2 hours at the same temperature and at the same pH, and then the mixture was adjusted to pH 0 to 1 by adding 35% hydrochloric acid. The liquid thus obtained was heated to 65° C., and was stirred for 2 hours at the same temperature. Subsequently, the liquid was cooled to room temperature, and a solid precipitated therefrom was isolated by filtration. Thereby, 130 parts of a wet cake containing a compound represented by the following formula (25) was obtained.

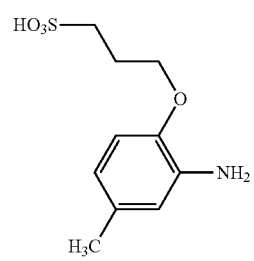
(24)

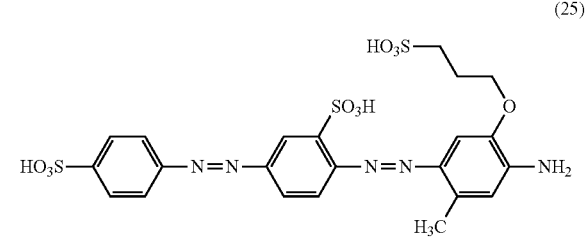
(25)

(Step 3)

50 parts of the wet cake containing the compound represented by formula (23) obtained in the (Step 1) was dissolved in 300 parts of water by adjusting the system to pH 8 to 9 by adding a 25% aqueous solution of sodium hydroxide. To this solution, 0.48 parts of (trade name:) Leocol® TD90 (surfactant, hereinafter simply referred to as "Leocol® TD90") manufactured by Lion Corp. was added, and then 7.3 parts of cyanuric chloride was added thereto at 5° C. to 10° C. After the addition, the mixture was stirred for 6 hours at 5° C. to 10° C. while the pH value was maintained at 6 to 7 by adding an aqueous solution of sodium carbonate.

Meanwhile, 51 parts of the wet cake containing the compound represented by formula (25) obtained in the (Step 2) was dissolved in 150 parts of water by adjusting the system to pH 7 to 8 by adding a 25% aqueous solution of sodium hydroxide. Thus, a solution was obtained. This solution was added to the reaction liquid described above, and then the resulting mixture was heated to 65° C. to 70° C. While the pH value was maintained at 6 to 7 by adding an aqueous solution of sodium carbonate, the mixture was stirred for 7 hours. Subsequently, 2.6 parts of m-xylenediamine was added thereto, and then the resulting mixture was heated to 90° C. to 95° C. While the pH value was maintained at 7 to 8 by adding an aqueous solution of sodium carbonate, the mixture was stirred for 18 hours.

The reaction liquid thus obtained was cooled to 20° C. to 30° C., and then salting-out was carried out by adding sodium chloride. A solid precipitated therefrom was isolated by filtration, and thus a wet cake was obtained.

This wet cake was dissolved in 600 parts of water.

To this solution, 50 parts of methanol, and then 800 parts of 2-propanol were added, and the mixture was stirred for 30 minutes. A solid precipitated therefrom was isolated by filtration, and thereby a wet cake was obtained. The wet cake thus obtained was dissolved again in 400 parts of water, and 1000 parts of 2-propanol was added thereto. A solid precipitated therefrom was isolated by filtration and dried. Thereby, 25.2 parts of an azo compound of the present invention represented by the following formula (26) (λmax: 440 nm) was obtained as a sodium salt.

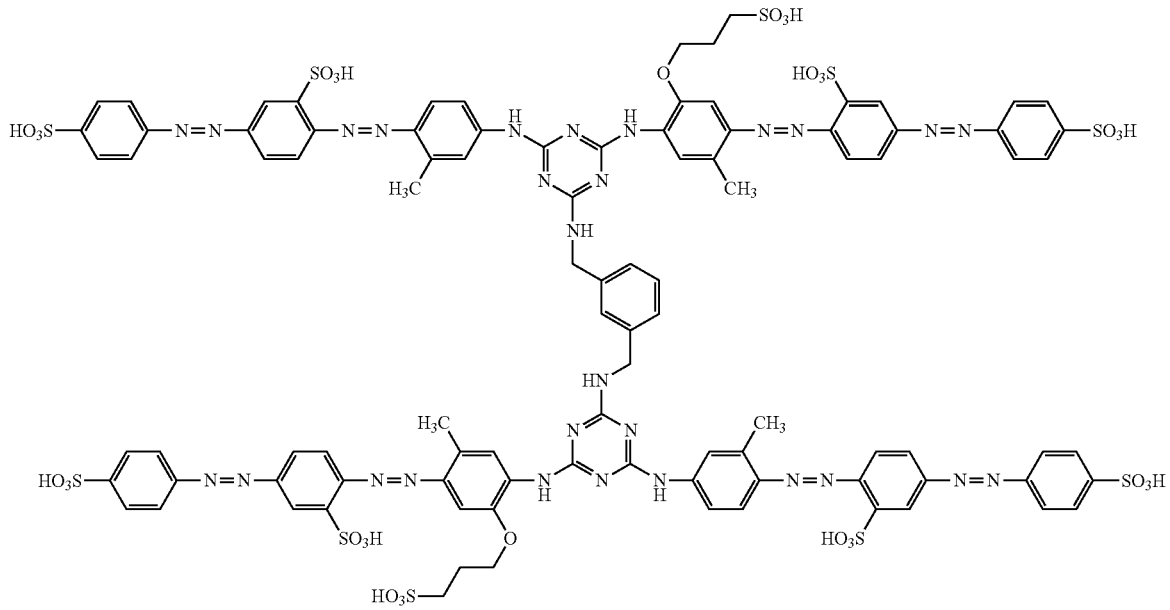

(26)

Example 2

6.3 parts of a sodium salt of the azo compound represented by formula (26) obtained in Example 1 and 23.1 parts of lithium chloride were added to 200 parts of water, and the mixture was dissolved under stirring to perform a salt exchange reaction. 300 parts of 2-propanol was added to this liquid, and a solid precipitated therefrom was isolated by filtration. Thus, a wet cake was obtained. The wet cake thus obtained was dissolved in 100 parts of water, and 400 parts of 2-propanol was added thereto. A solid precipitated therefrom was isolated by filtration, and thus a wet cake was obtained. The wet cake thus obtained was dissolved again in 80 parts of water, and 400 parts of 2-propanol was added thereto. A solid precipitated therefrom was isolated by filtration, and dried. Thus, 4.1 parts of an azo compound of the present invention represented by the formula (26) (λmax: 438 nm) was obtained as a salt mixture of a sodium salt and a lithium salt.

Example 3

The synthesis was carried out in the same manner as in Example 1, except that 1.7 parts of piperazine was used instead of using 2.6 parts of the m-xylenediamine used in the (Step 3) of Example 1. Thus, 25.3 parts of an azo compound of the present invention represented by the following formula (27) (λmax: 435 nm) was obtained as a sodium salt.

(27)

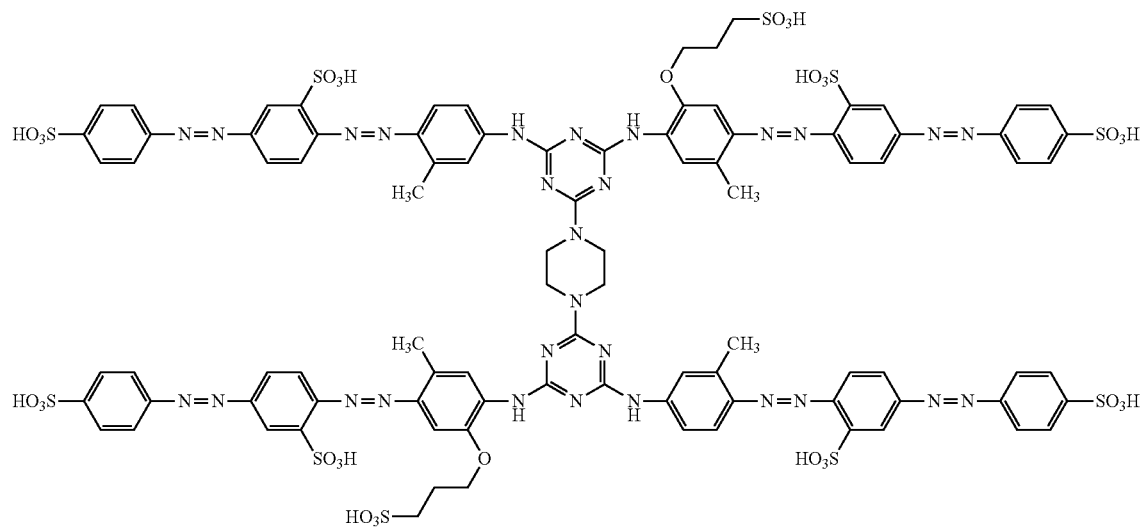

Example 4

The synthesis was carried out in the same manner as in Example 2, except that 6.8 parts of a sodium salt of the azo compound represented by formula (27) was used instead of 6.3 parts of the sodium salt of the azo compound represented by formula (26) used in Example 2. Thus, 5.3 parts of the azo compound of the present invention represented by formula (27) (λmax: 433 nm) was obtained as a salt mixture of a sodium salt and a lithium salt.

Example 5

The synthesis was carried out in the same manner as in Example 1, except that 3.3 parts of lysine monohydrochloride was used instead of 2.6 parts of the m-xylenediamine used in the (Step 3) of Example 1. Thus, 10.2 parts of an azo compound of the present invention represented by the following formula (28) (λmax: 438 nm) was obtained as a sodium salt.

(28)

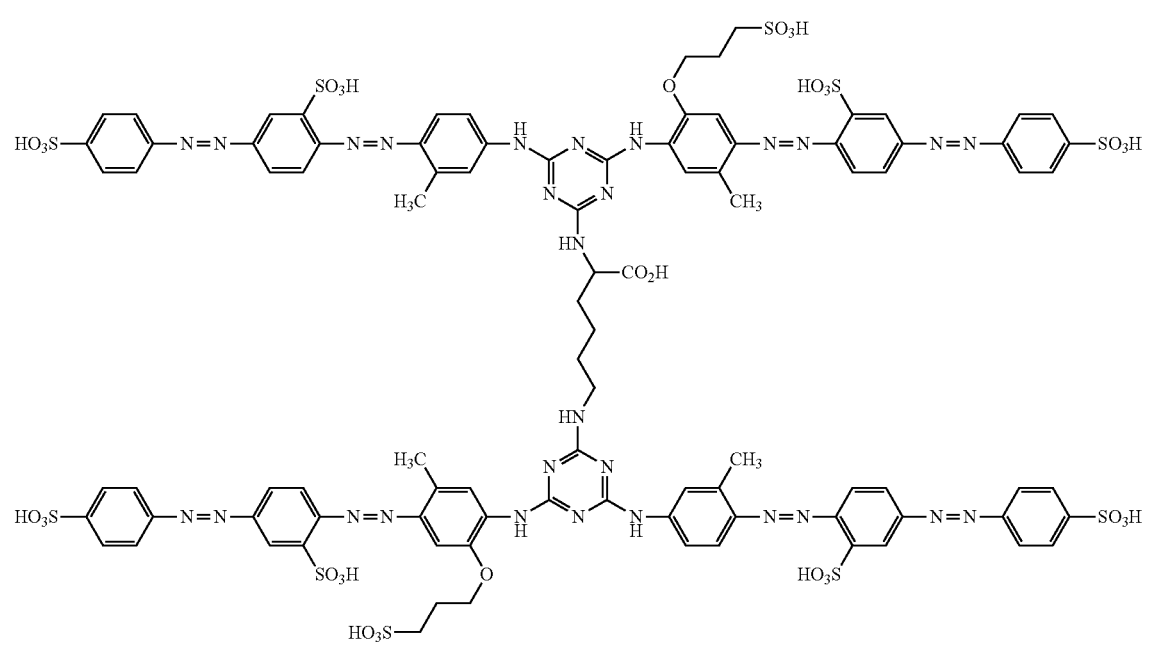

Example 6

The synthesis was carried out in the same manner as in Example 1, except that 1.3 parts of ethylenediamine was used instead of 2.6 parts of the m-xylenediamine used in the (Step 3) of Example 1. Thus, 24.3 parts of an azo compound of the present invention represented by the following formula (29) (λmax: 446 nm) was obtained as a sodium salt.

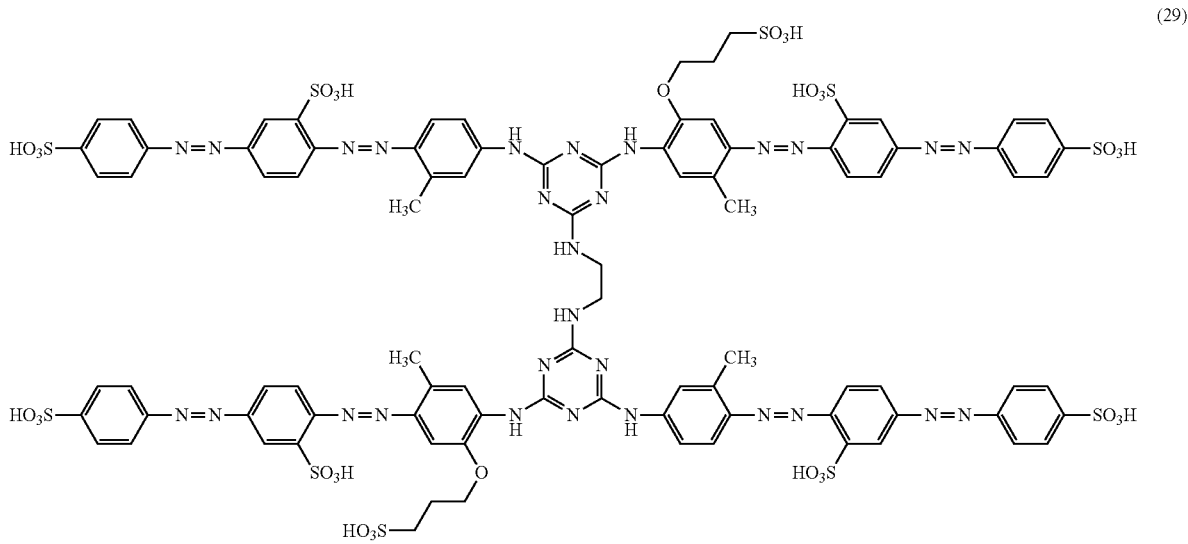 [SMILES: Cc1cc(Nc2nc(NCCNc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O]

Example 7

65 parts of the wet cake containing the compound represented by formula (25) obtained in the (Step 2) of Example 1 was dissolved in 250 parts of water by adjusting the system to pH 7 to 8 by adding a 25% aqueous solution of sodium hydroxide. To this solution, Leocol® TD90 (0.10 parts) was added, and then 3.8 parts of cyanuric chloride was added thereto at 15° C. to 25° C. After the addition, while the pH value was maintained at 5 to 6 by adding an aqueous solution of sodium carbonate, the mixture was stirred for 2 hours at 15° C. to 25° C. Subsequently, this reaction liquid was heated to 60° C. to 65° C., and while the pH value was maintained at 6 to 7 by adding an aqueous solution of sodium carbonate, the reaction liquid was stirred for 5 hours.

Subsequently, 1.5 parts of m-xylenediamine was added thereto, and then the resulting mixture was heated to 90° C. to 95° C. While the pH value was maintained at 8 to 9 by adding an aqueous solution of sodium carbonate, the mixture was stirred for 16 hours.

The reaction liquid thus obtained was cooled to 20° C. to 30° C., and then salting-out was carried out by adding sodium chloride. A solid precipitated therefrom was isolated by filtration, and thus a wet cake was obtained. This wet cake was dissolved in 400 parts of water. To this solution, 50 parts of methanol, and then 800 parts of 2-propanol were added, and the resulting mixture was stirred for 30 minutes. A solid precipitated therefrom was isolated by filtration, and thereby, a wet cake was obtained. The wet cake thus obtained was dissolved again in 200 parts of water, and 800 parts of 2-propanol was added thereto. A solid precipitated therefrom was isolated by filtration and dried. Thus, 19.2 parts of an azo compound of the present invention represented by the following formula (30) (λmax: 449 nm) was obtained as a sodium salt.

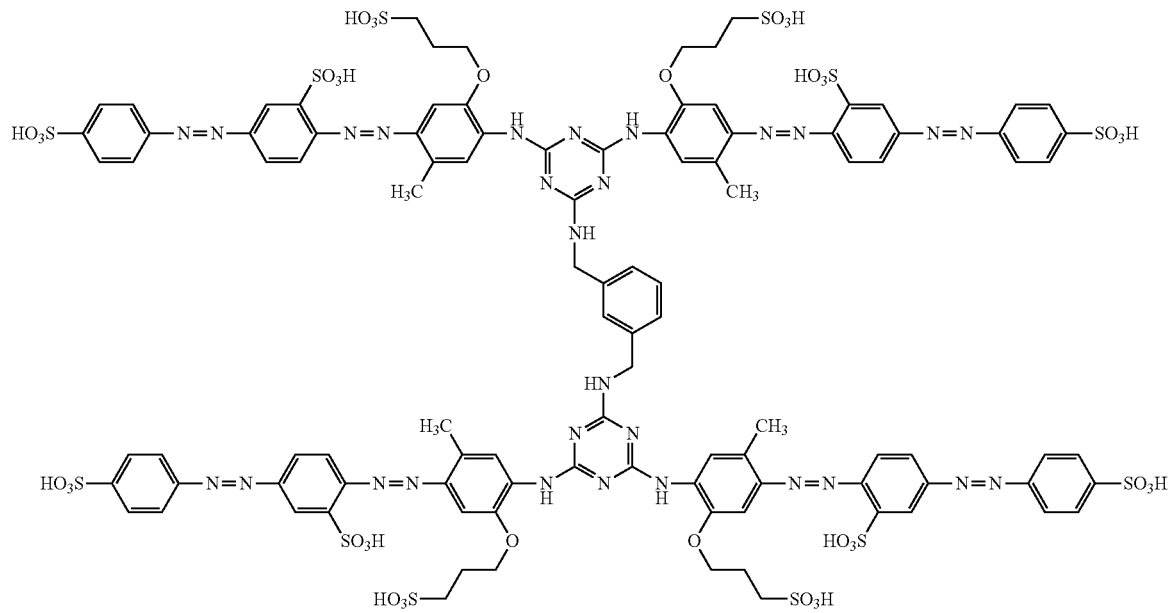

(30)

Example 8

A salt exchange reaction was carried out in the same manner as in Example 2, except that 6.2 parts of a sodium salt of the azo compound represented by formula (30) was used instead of 6.3 parts of the sodium salt of the azo compound represented by formula (26) used in Example 2. Thus, 4.8 parts of the azo compound of the present invention represented by formula (30) (λmax: 447 nm) was obtained as a salt mixture of a sodium salt and a lithium salt.

Example 9

The synthesis was carried out in the same manner as in Example 7, except that 0.89 parts of piperazine was used instead of 1.5 parts of the m-xylenediamine used in Example 7. Thus, 13.5 parts of an azo compound of the present invention represented by the following formula (31) (λmax: 436 nm) was obtained as a sodium salt.

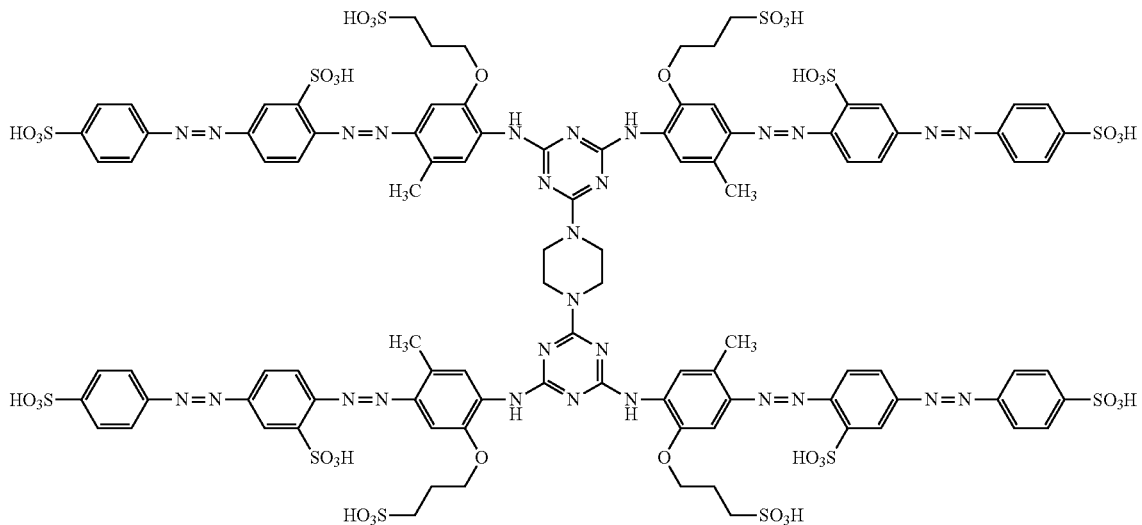

(31)

Example 10

The synthesis was carried out in the same manner as in Example 2, except that 6.9 parts of a sodium salt of the azo compound represented by formula (31) was used instead of 6.3 parts of the sodium salt of the azo compound represented by formula (26) used in Example 2. Thus, 4.6 parts of the azo compound of the present invention represented by formula (31) (λmax: 434 nm) was obtained as a salt mixture of a sodium salt and a lithium salt.

Example 11

The synthesis was carried out in the same manner as in Example 7, except that 1.9 parts of lysine monohydrochloride was used instead of 1.5 parts of the m-xylenediamine used in Example 7. Thus, 7.3 parts of an azo compound of the present invention represented by the following formula (32) (λmax: 450 nm) was obtained as a sodium salt.

(32)

Example 12

The synthesis was carried out in the same manner as in Example 7, except that 0.63 parts of ethylenediamine was used instead of 1.5 parts of the m-xylenediamine used in Example 7. Thus, 14.5 parts of an azo compound of the present invention represented by the following formula (33) (λmax: 456 nm) was obtained as a sodium salt.

(33)

Example 13

The synthesis was carried out in the same manner as in Example 7, except that 1.5 parts of 1,2-bis(2-aminoethoxy)ethane was used instead of 1.5 parts of the m-xylenediamine used in Example 7. Thus, 18.3 parts of an azo compound of the present invention represented by the following formula (34) (λmax: 454 nm), in which X in the formula (1) corresponded to aminoethoxyethoxyethylamino, was obtained as a sodium salt.

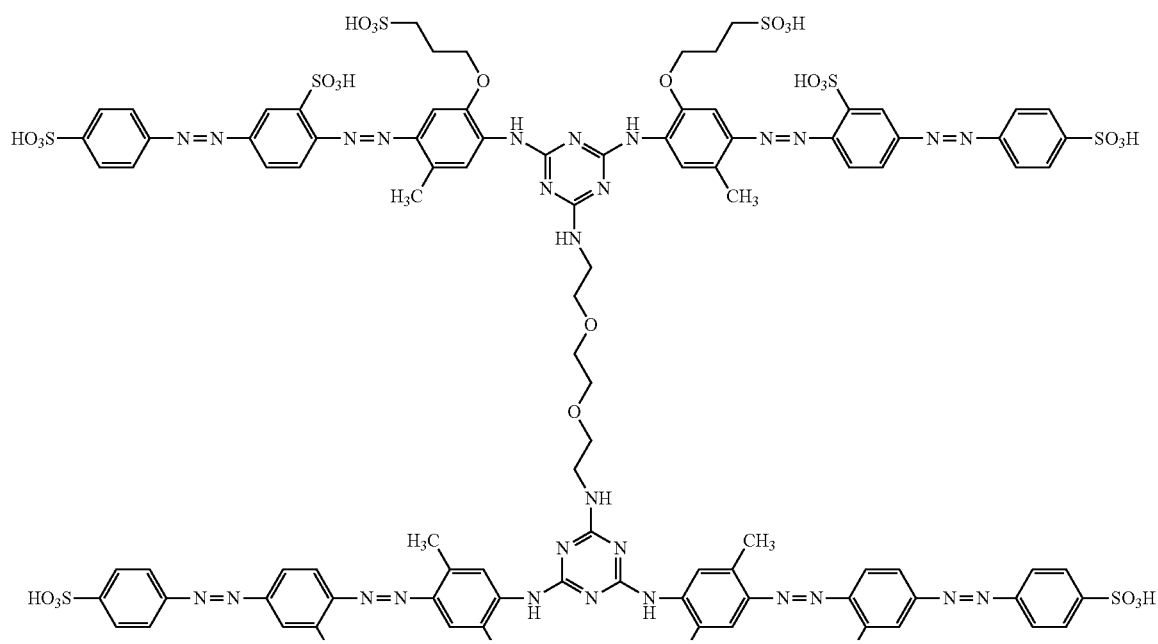

(34)

Example 14

The synthesis was carried out in the same manner as in Example 7, except that 1.1 parts of 2-(2-aminoethylamino)ethanol was used instead of 1.5 parts of the m-xylenediamine used in Example 7. Thus, 16.9 parts of an azo compound of the present invention represented by the following formula (35) (λmax: 457 nm), in which X in the formula (1) corresponded to N-2-hydroxyethylethylenediamino, was obtained as a sodium salt.

(35)

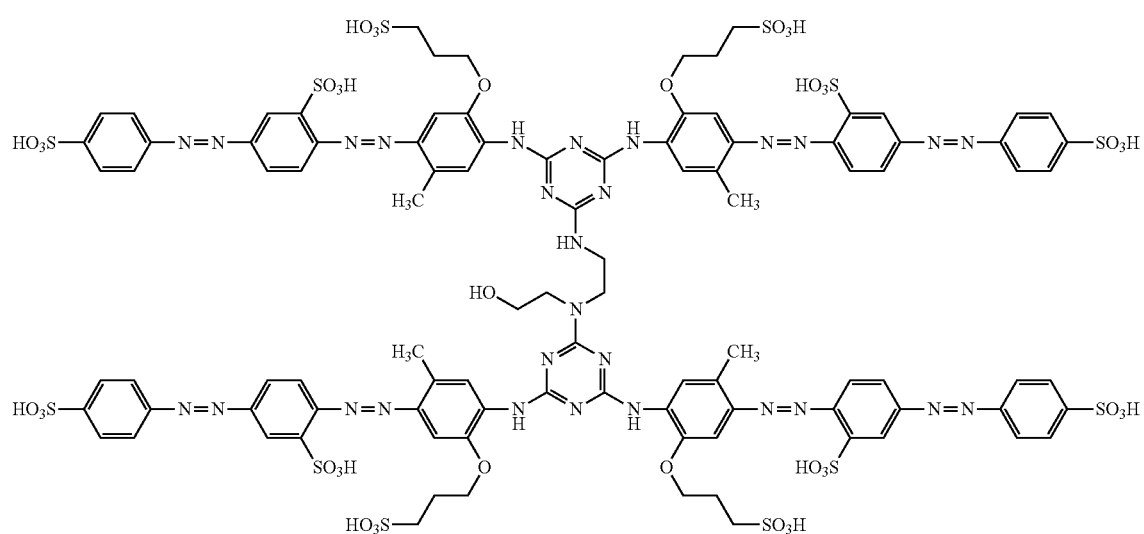

Example 15

(A) Preparation of Ink

Ink compositions were prepared by mixing the respective components indicated in the following Table 25, and each of the ink compositions was filtered through a membrane filter having a pore size of 0.45 μm. Thereby, testing inks were obtained. At this time, ion-exchanged water was used as water, and each of the ink compositions was adjusted using an aqueous solution of lithium hydroxide so that the pH of the ink composition would be pH 8 to 9. Water was appropriately added so as to obtain a total amount of 100.0 parts. The preparation of an ink using the compound obtained in Example 3 as the coloring matter in the ink is designated as Example 15. In the same manner, the inks prepared by the same method as that used in Example 15, except that the compounds obtained in Examples 4, 6, 8 and 10 were used, are designated as Examples 16, 17, 18 and 19. Among these, in regard to the preparation of inks that use compounds obtained in the form of sodium salts, since the adjustment of the pH was achieved using an aqueous solution of sodium hydroxide, the "water+aqueous solution of lithium hydroxide" in the following Table 25 should be read as "water+aqueous solution of sodium hydroxide."

Meanwhile, in the following Table 25, as the "surfactant," (trade name:) Surfynol® 104PG50 manufactured by Nissin Chemical Industry Co., Ltd. Was used.

TABLE 25

| Blend of ink composition | |
| --- | --- |
| Component | Number of parts |
| Compound obtained in Example 3 | 5.0 parts |
| Glycerin | 5.0 parts |
| Urea | 5.0 parts |
| N-methyl-2-pyrrolidone | 4.0 parts |
| Isopropyl alcohol | 3.0 parts |
| Butylcarbitol | 2.0 parts |
| Taurine | 0.3 parts |
| Disodium ethylenediamine tetraacetate | 0.1 parts |
| Surfactant | 0.1 parts |
| Water + aqueous solution of lithium hydroxide | 75.5 parts |
| Total | 100.0 parts |

Comparative Example 1

The preparation was carried out in the same manner as in Example 15, except that the compound represented by the following formula (36) described in Patent Document 3 was used instead of the azo compound of the present invention obtained in Example 3, and thus a comparative ink was obtained. The preparation of this ink is designated as Comparative Example 1.

(36)

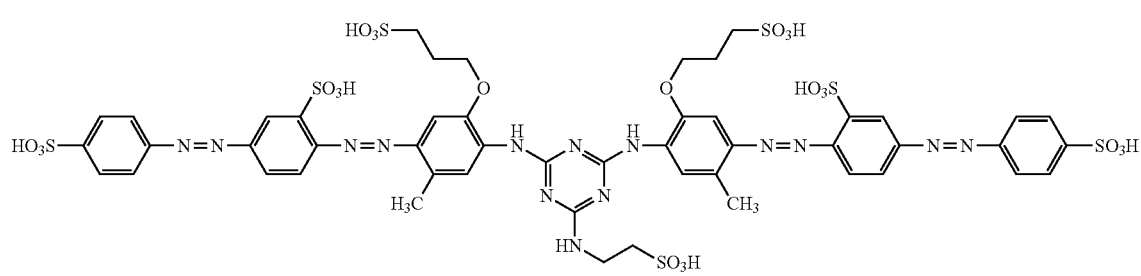

Comparative Example 2

The preparation was carried out in the same manner as in Example 15, except that the compound represented by the following formula (37) disclosed in Patent Document 1 was used instead of the azo compound of the present invention obtained in Example 3, and an aqueous solution of sodium hydroxide was used to adjust the pH, and thus a comparative ink was obtained. The preparation of this ink is designated as Comparative Example 2.

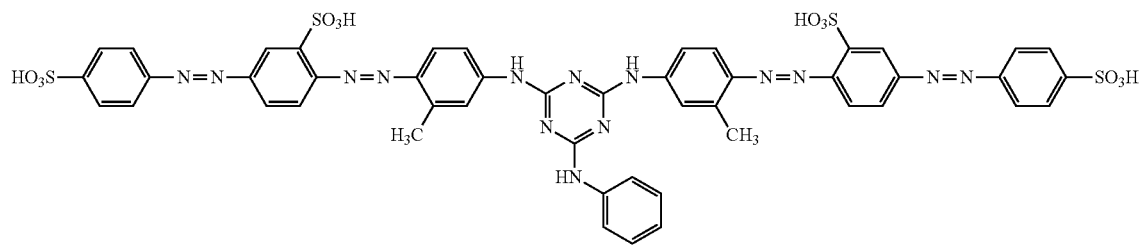

Comparative Example 3

The preparation was carried out in the same manner as in Example 15, except that the compound represented by the following formula (38) disclosed in Patent Document 1 was used instead of the azo compound of the present invention obtained in Example 3, and an aqueous solution of sodium hydroxide was used to adjust the pH, and thus a comparative ink was obtained. The preparation of this ink is designated as Comparative Example 3.

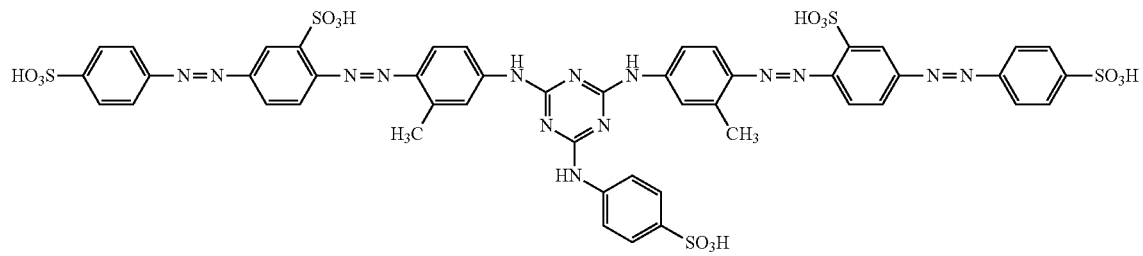

(B) Ink Jet Recording

Ink jet recording was carried out respectively on the following two kinds of glossy papers, using inks obtained in Examples 15 to 19 and Comparative Examples 1 to 3, respectively, and using an ink jet printer manufactured by Canon, Inc., (trade name:) PIXUS® iP4500. At the time of recording, image patterns were produced such that six grades of gradation at densities of 100%, 80%, 60%, 40%, 20% and 10% are obtained, and thus halftone recorded materials were obtained. Glossy paper 1 was used for a print density test, and glossy paper 2 was used for a light fastness test, as the respective test specimens.

Glossy paper 1: manufactured by Fujifilm Corporation, trade name: Kassai Photo Finish Pro Glossy paper 2: manufactured by Seiko Epson Corp., trade name: Photo Paper Crispia, High Glossy (C) Colorimetric Determination of Recorded Image Various tests and evaluations thereof were carried out by performing colorimetric determination of the test specimens using a colorimeter manufactured by X-Rite, Inc., trade name: SpectroEye. The colorimetric determination was carried out under the conditions of a viewing angle of 2° and a light source of D65, using a density standard of DIN.

(D) Print Density Test

The density spectrum (Spectrum D) at the 100%-density gradation area of the image that had been ink jet recorded on the glossy paper 1 was measured using the colorimeter system, and the respective print densities OD were measured at wavelengths over the range of 380 nm to 720 nm at an increment of 10 nm. Among the print densities OD thus obtained, the OD value that had given the highest value was evaluated according to the following evaluation criteria. The results are presented in the following Table 26. Meanwhile, the OD values thus obtained are such that a larger value means superior density.

A: The maximum OD value is 2.55 or greater.

B: The maximum OD value is equal to or greater than 2.50 and less than 2.55.

C: the maximum OD value is less than 2.50.

(E) Light Fastness Test

Each of the test specimens prepared by performing ink jet recording on the glossy paper 2 was mounted on (trade name:) low temperature cycle xenon weather-o-meter XL75 manufactured by Suga Test Instruments Co., Ltd., and irradiation was carried out for 120 hours under the conditions of a radiation illuminance of 100,000 Lux, a humidity of 60% RH, and a temperature of 24° C. For the recorded image of each of the test specimens before and after exposure to xenon light, L*, a* and b* of the CIE were measured under the conditions for colorimetric determination described above, and the color difference ΔE was calculated by the following formula. Thus, the values were evaluated by the following evaluation criteria. The results are presented in the following Table 26. The color difference ΔE thus obtained is such that a smaller value means less discoloration, which is excellent.

In the following calculation formula, ΔL*, Δa* and Δb* mean the differences in the L*, a* and b* values obtained before and after exposure, respectively.

Meanwhile, the evaluation of the light fastness test was performed by making a colorimetric determination at the 60%-density gradation area of the printed images before and after the test.

$$\Delta E = (\Delta L^{*2} + \Delta a^{*2} + \Delta b^{*2})^{1/2}$$

A: ΔE is less than 30.

B: ΔE is equal to or greater than 30 and less than 35.

C: ΔE is 35 or greater.

TABLE 26

| Test results | Print density | Light fastness |
|---|---|---|
| Example 15 | A | A |
| Example 16 | A | A |
| Example 17 | B | A |
| Example 18 | B | A |
| Example 19 | A | A |
| Comparative Example 1 | C | A |
| Comparative Example 2 | C | C |
| Comparative Example 3 | C | B |

As it is obvious from the results of the Table 26, the recorded images obtained by using the inks of Examples 15 to 19 exhibited the best results in all the test items.

Specifically, it was clear that Comparative Examples 1 to 3 were inferior by about one grade or two grades in terms of the print density, as compared with the respective Examples. Furthermore, in terms of light fastness, it was made clear that the Examples have superior performance to Comparative Examples 2 and 3.

Therefore, the azo compound of the present invention and the ink composition containing the same are extremely superior in light fastness and print density as compared with conventional compounds, and are accordingly suitable for the applications of inks of colors ranging from yellow to orange to brown to red for various recordings, particularly for ink jet recording.

INDUSTRIAL APPLICABILITY

The azo compound of the present invention and the ink composition of the present invention containing the compound are suitable for various recording applications, particularly for ink jet recording applications, such as writing tools of colors ranging from yellow to orange to brown to red.

The invention claimed is:

1. An azo compound represented by the following formula (1), or a salt thereof:

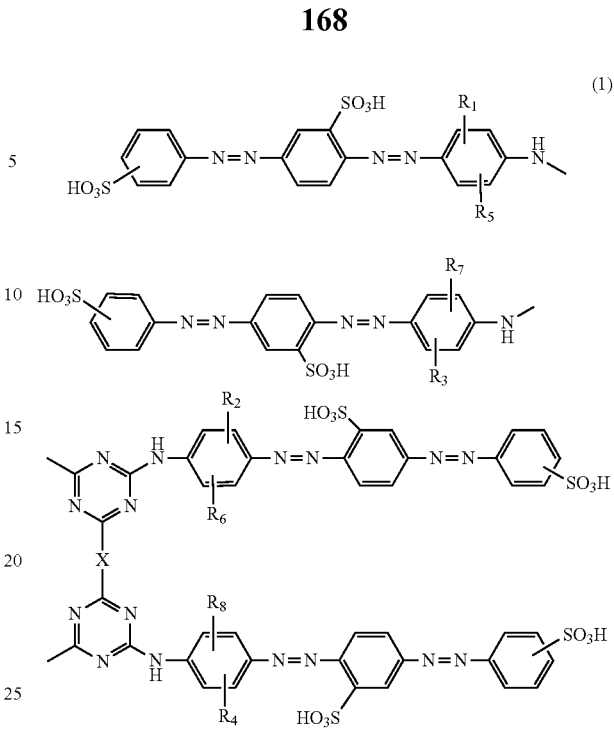

wherein, $R^1$ to $R^8$ each independently represents a hydrogen atom; a halogen atom; a sulfo group; a carboxy group; a sulfamoyl group; a carbamoyl group; a C1-C4 alkyl group; a C1-C4 alkoxy group; a C1-C4 alkoxy group substituted with at least one group selected from the group consisting of a hydroxy group, a C1-C4 alkoxy group, a hydroxy-C1-C4 alkoxy group, a sulfo group and a carboxy group; a C1-C4 alkylcarbonylamino group; a C1-C4 alkylcarbonylamino group substituted with a carboxy group; a ureido group; a mono-C1-C4 alkylureido group; a di-C1-C4 alkylureido group; a mono-C1-C4 alkylureido group substituted with at least one group selected from the group consisting of a hydroxy group, a sulfo group and a carboxy group; a di-C1-C4 alkylureido group substituted with at least one group selected from the group consisting of a hydroxy group, a sulfo group and a carboxy group; a benzoylamino group; a benzoylamino group having its benzene ring substituted with at least one group selected from the group consisting of a halogen atom, a C1-C4 alkyl group, a nitro group, a sulfo group and a carboxy group; a benzenesulfonylamino group; or a phenylsulfonylamino group having its benzene ring substituted with at least one group selected from the group consisting of a halogen atom, a C1-C4 alkyl group, a nitro group, a sulfo group and a carboxy group; and X represents a divalent crosslinking group.

2. The azo compound or a salt thereof according to claim 1, wherein X represents any group selected from the group consisting of a C1-C8 alkylenediamino group; a C1-C8 alkylenediamino group substituted with a hydroxy group or a carboxy group; an N-C1-C4 alkyl-C1-C6 alkylenediamino group; an N-C1-C4 alkyl-C1-C6 alkylenediamino group having its alkyl moiety substituted with a hydroxy group or a carboxy group; an amino-C1-C6 alkoxy-C1-C6 alkylamino group; an amino-C1-C4 alkoxy-C1-C4 alkoxy-C1-C4 alkylamino group; a xylylenediamino group; a piperazine-1,4-diyl group; a piperazine-1,4-diyl group substituted with a C1-C4 alkyl group or a C1-C4 alkoxy group; and a phenylenediamino group.

3. The azo compound or a salt thereof according to claim 1, wherein $R^1$ to $R^8$ each independently represents a hydrogen atom; a halogen atom; a C1-C4 alkyl group; a C1-C4 alkoxy group; a C1-C4 alkoxy group substituted with a sulfo group or a carboxy group; or a C1-C4 alkylcarbonylamino group.

4. The azo compound or a salt thereof according to claim 1, wherein at least one of $R^1$ to $R^8$ is a C1-C4 alkoxy group substituted with a sulfo group.

5. The azo compound or a salt thereof according to claim 1, wherein $R^1$ to $R^4$ each independently represents a hydrogen atom, a C1-C4 alkyl group, or a C1-C4 alkoxy group substituted with a sulfo group, while at least one of $R^1$ to $R^4$ is a C1-C4 alkoxy group substituted with a sulfo group, and
$R^5$ to $R^8$ each independently represents a hydrogen atom or a C1-C4 alkyl group.

6. The azo compound or a salt thereof according to claim 1, wherein X represents a C1-C8 alkylenediamino group; a C1-C8 alkylenediamino group substituted with a carboxy group; an N-C1-C4 alkyl-C1-C6 alkylenediamino group having its alkyl moiety substituted with a hydroxy group; an amino-C1-C4 alkoxy-C1-C4 alkoxy-C1-C4 alkylamino group; a xylylenediamino group; or a piperazine-1,4-diyl group.

7. The azo compound or a salt thereof according to claim 1, wherein the azo compound represented by the formula (1) is an azo compound represented by the following formula (2):

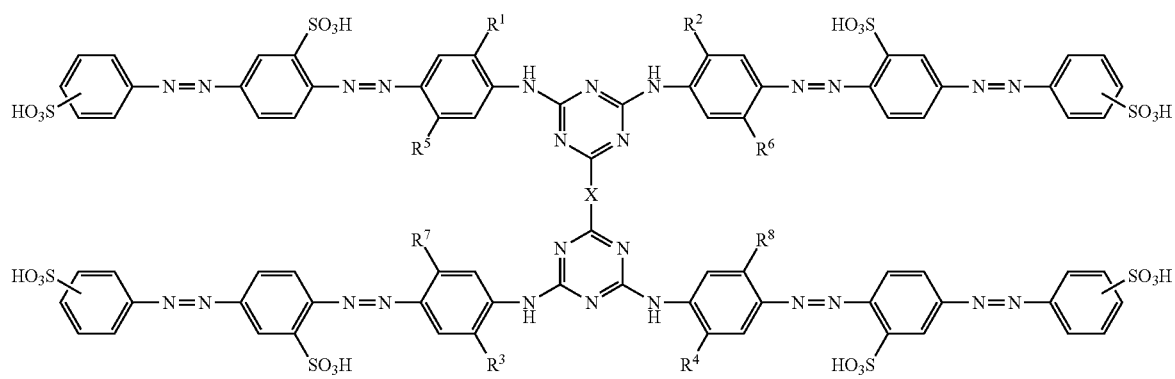

(2)

wherein, $R^1$ to $R^8$ and X are as defined for the formula (1).

8. The azo compound or a salt thereof according to claim 1, wherein at least one of $R^1$ and $R^2$ is a sulfopropoxy group,
at least one of $R^3$ and $R^4$ is a sulfopropoxy group, and
$R^5$ to $R^8$ are C1-C4 alkyl groups.

9. The azo compound or a salt thereof according to claim 1, wherein $R^5$ to $R^8$ are C1-C4 alkyl groups, and
X is a C2-C4 alkylenediamino group; a C2-C6 alkylenediamino group substituted with a carboxy group; an N—C2-C3 alkyl-C2-C3 alkylenediamino group having its alkyl moiety substituted with a hydroxy group; an amino-C2-C3 alkoxy-C2-C3 alkoxy-C2-C3 alkylamino group; an m- or p-xylylenediamino group; or a piperazine-1,4-diyl group.

10. The azo compound or a salt thereof according to claim 1, wherein any one of $R^1$ and $R^2$ is a sulfopropoxy group, while the other is a hydrogen atom or a sulfopropoxy group,
any one of $R^3$ and $R^4$ is a sulfopropoxy group, while the other is a hydrogen atom or a sulfopropoxy group,
$R^5$ to $R^8$ are methyl groups, and
X is a 1,2-ethylenediamino group; a 1,3-propylenediamino group; a 1,4-butylenediamino group; a 1-carboxypentylene-1,5-diamino group; an N-2-hydroxyethylethylenediamino group; an aminoethoxyethoxyethylamino group; an m-xylylenediamino group; or a piperazine-1,4-diyl group.

11. An ink composition comprising the azo compound or a salt thereof according to claim 1, as a coloring matter.

12. An ink jet recording method comprising:
recording by using the ink composition according to claim 11 as an ink;
discharging ink droplets of the ink in accordance with a recording signal; and
attaching the ink droplets onto a record-receiving material.

13. The ink jet recording method according to claim 12, wherein the record-receiving material is a communication sheet.

14. The ink jet recording method according to claim 13, wherein the communication sheet is a sheet comprising an ink-receiving layer containing a porous white inorganic substance.

15. An ink jet printer equipped with a container containing the ink composition according to claim 11.

16. A colored body colored by
the azo compound or a salt thereof according to claim 1.

17. A colored body colored by the ink composition according to claim 11.

18. A colored body colored by the ink jet recording method according to claim 12.

* * * * *

UNITED STATES PATENT AND TRADEMARK OFFICE
CERTIFICATE OF CORRECTION

| | | |
|---|---|---|
| PATENT NO. | : 8,512,462 B2 | |
| APPLICATION NO. | : 13/498431 | |
| DATED | : August 20, 2013 | |
| INVENTOR(S) | : Takahiko Matsui | |

It is certified that error appears in the above-identified patent and that said Letters Patent is hereby corrected as shown below:

Title Page 1 (Item 57) Abstract, Line 10, Change "C1-4" to --C1-C4--.

Title Page 1 (Item 57) Abstract, Line 11, Change "C1-4" to --C1-C4--.

Title Page 1 (Item 57) Abstract, Line 11, Change "C1-8" to --C1-C8--.

In the Specifications:

At Column 4, Line 17, Change "1," to --1),--.

At Column 4, Line 48, Change "1)" to --1),--.

At Column 4, Line 53, Below "and" insert --$R^5$ to $R^8$ each independently represent a hydrogen atom or a C1-C4 alkyl group;--.

At Column 6, Line 31, Change "b" to --by--.

At Column 12, Lines 11-12, Change "aminioethoxy" to --aminoethoxy--.

At Column 12, Line 54, Change "aminioethoxyethoxyethylamino;" to --aminoethoxyethoxyethylamino;--.

At Column 13, Line 57 (Approx.), Change "methyl-co-sulfonic" to --methyl-ω-sulfonic--.

Signed and Sealed this
Twenty-ninth Day of April, 2014

Michelle K. Lee
*Deputy Director of the United States Patent and Trademark Office*

CERTIFICATE OF CORRECTION (continued)
U.S. Pat. No. 8,512,462 B2

At columns 93-94, (TABLE 17-continued), Line 2 (Structure), Change

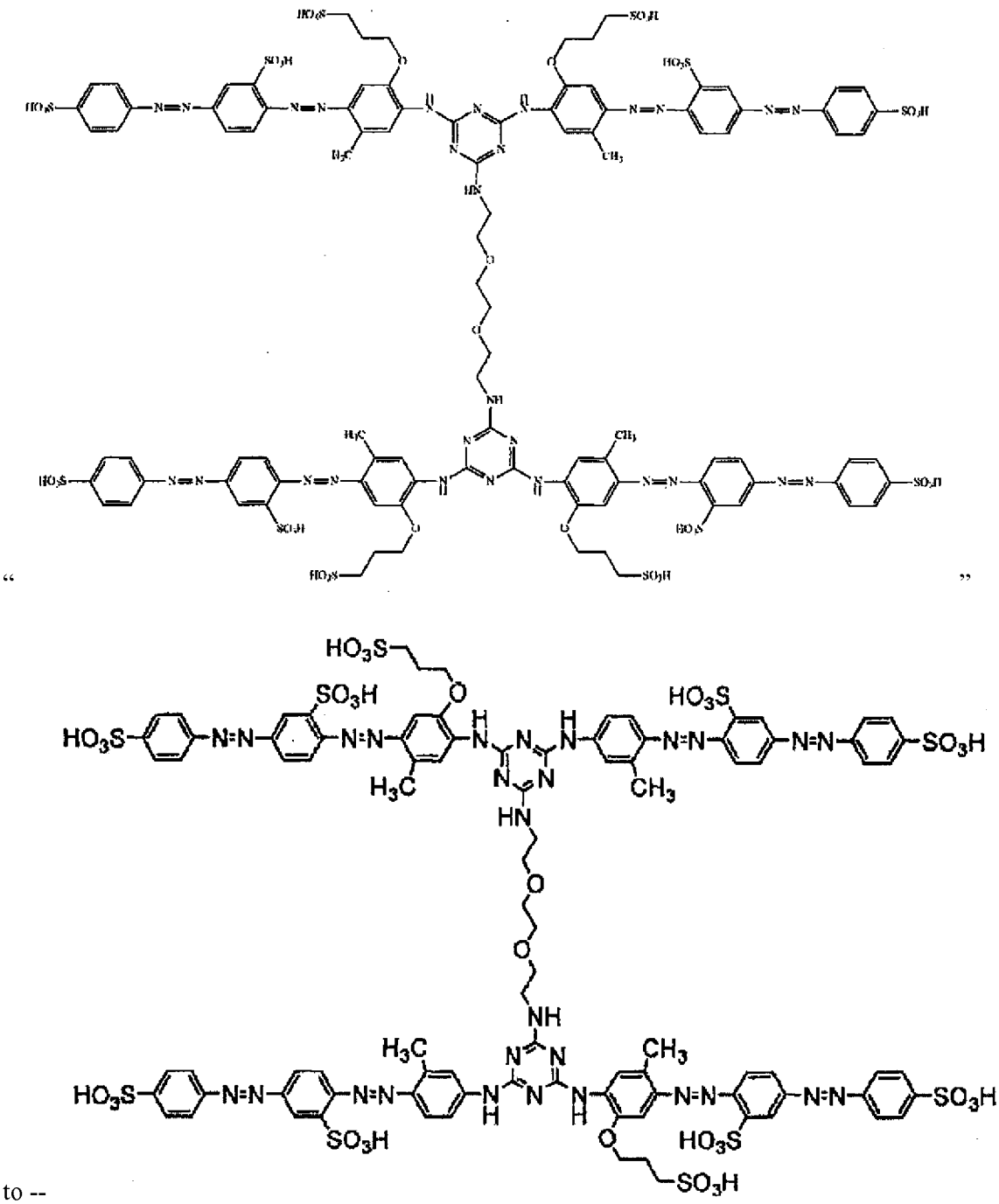

"    " to --    --.

At Column 144, Line 14, Change "pm" to --µm--.

CERTIFICATE OF CORRECTION (continued)
U.S. Pat. No. 8,512,462 B2

At Column 161-162, Lines 10-55 (Approx.) (Structure), Change

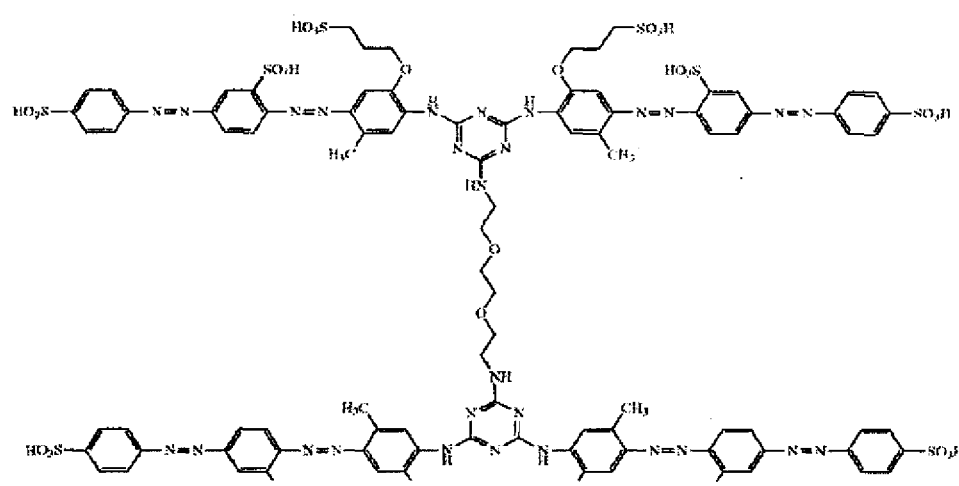

"  "

to --

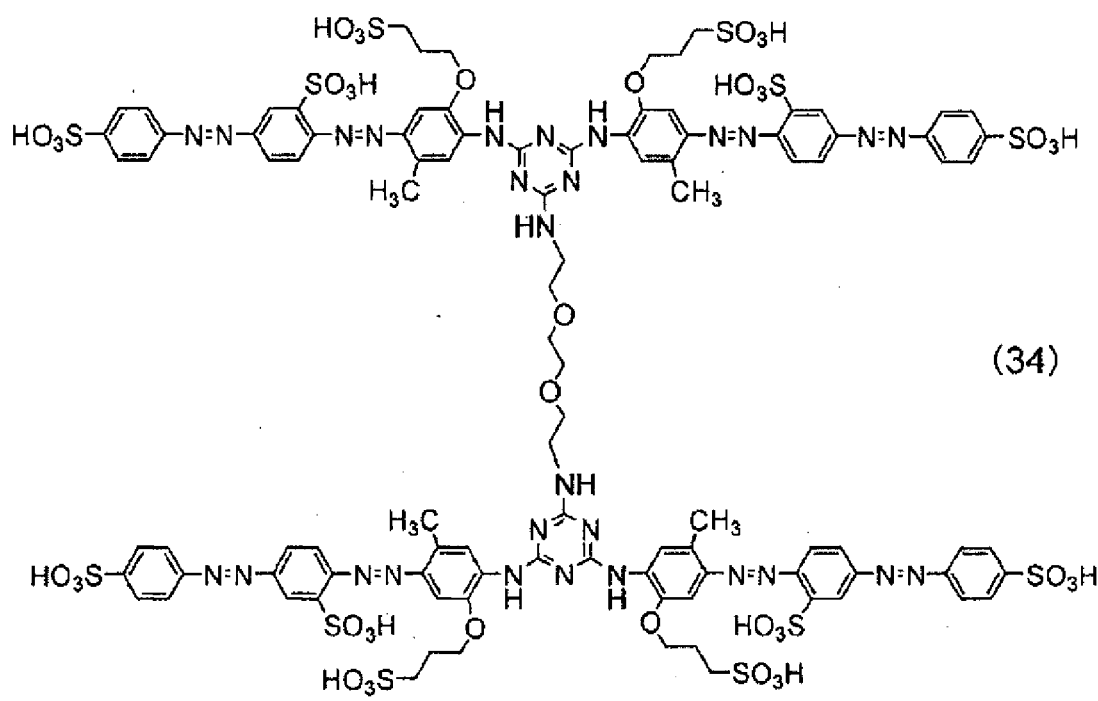

(34)

--.

In the Claims:

At Column 170, Line 22, In Claim 12, Change "using" to --utilizing--.